(12) United States Patent
Hertel et al.

(10) Patent No.: US 11,507,985 B2
(45) Date of Patent: *Nov. 22, 2022

(54) PLATFORM FOR PROVIDING CUSTOMIZABLE USER BRAND EXPERIENCES, SPONSORSHIP JUNCTIONS, AND CONVERSION ATTRIBUTION

(71) Applicant: Xperiel, Inc., Sunnyvale, CA (US)

(72) Inventors: Alexander Hertel, Sunnyvale, CA (US); Philipp Hertel, Belmont, CA (US); Marc Tedder, Menlo Park, CA (US)

(73) Assignee: Xperiel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,821

(22) Filed: Sep. 8, 2020

(65) Prior Publication Data

US 2020/0410554 A1  Dec. 31, 2020

Related U.S. Application Data

(63) Continuation of application No. 15/888,694, filed on Feb. 5, 2018, now Pat. No. 10,769,680, and a
(Continued)

(51) Int. Cl.
*G06Q 30/00* (2012.01)
*G06Q 30/02* (2012.01)
(Continued)

(52) U.S. Cl.
CPC ....... *G06Q 30/0277* (2013.01); *G06Q 20/047* (2020.05); *G06Q 30/0261* (2013.01); *G06Q 30/0267* (2013.01); *G06Q 30/08* (2013.01)

(58) Field of Classification Search
CPC ............. G06Q 30/0277; G06Q 20/047; G06Q 30/0261; G06Q 30/0267; G06Q 30/08;
(Continued)

(56) References Cited

U.S. PATENT DOCUMENTS 5,974,398 A  10/1999  Hanson et al.
8,515,875 B1 *  8/2013  Murray .............. G06Q 30/0279
                                                              705/329
(Continued)

FOREIGN PATENT DOCUMENTS

WO    WO 2015/160713 A2   10/2015

OTHER PUBLICATIONS

Ubitem: a framework for interactive marketing in location-based gaming environment. IEEE. 2005. (Year: 2005).*
(Continued)

*Primary Examiner* — Maria V Vanderhorst
(74) *Attorney, Agent, or Firm* — Sunstein LLP

(57) ABSTRACT

A computer-readable medium that, when executed on a server, establishes processes for providing a brand sponsorship environment, the processes including providing a computer-implemented platform establishing a sponsorship junction involving, in case 1, a set of trigger-monitorable activities defined by a set of sponsoring brands or, in case 2, a subset of the trigger-monitorable activities defined by the set of sponsoring brands.

14 Claims, 61 Drawing Sheets

Related U.S. Application Data continuation-in-part of application No. 15/291,309, filed on Oct. 12, 2016, now Pat. No. 9,886,720.

(60) Provisional application No. 62/484,077, filed on Apr. 11, 2017, provisional application No. 62/241,113, filed on Oct. 13, 2015.

(51) Int. Cl.
  *G06Q 20/04* (2012.01)
  *G05B 19/418* (2006.01)
  *G06Q 30/08* (2012.01)

(58) Field of Classification Search
  CPC .. G06Q 20/306; G06Q 20/308; G06Q 20/321; G06Q 20/384
  See application file for complete search history.

(56) References Cited

U.S. PATENT DOCUMENTS

| | | | |
|---|---|---|---|
| 8,813,125 B2* | 8/2014 | Reisman | H04N 21/440263 725/110 |
| 9,218,609 B2 | 12/2015 | Hertel et al. | |
| 2002/0095333 A1 | 7/2002 | Jokinen et al. | |
| 2010/0114661 A1 | 5/2010 | Alderfer et al. | |
| 2012/0166260 A1 | 6/2012 | Steelberg et al. | |
| 2013/0217333 A1 | 8/2013 | Sprigg et al. | |
| 2013/0218640 A1 | 8/2013 | Kidder et al. | |
| 2014/0032294 A1 | 1/2014 | Donlan et al. | |
| 2014/0085077 A1 | 3/2014 | Luna et al. | |
| 2014/0143856 A1 | 5/2014 | Wu et al. | |
| 2014/0358666 A1 | 12/2014 | Baghaie et al. | |
| 2015/0081417 A1* | 3/2015 | Golden | G06Q 30/0269 705/14.41 |
| 2016/0283967 A1 | 9/2016 | Mitchell | |

OTHER PUBLICATIONS

"Online games and e-business: Architecture for integrating business models and services into online games". IEEE. Jan. 1, 2006. (Year: 2006).*

Aggarwal et al., "Database-centric Development of Menus and Graphic User Interfaces," Defence Science Journal, vol. 57, No. 1, pp. 133-138, Jan. 2007.

Coronado et al., "Context-awareness in Task Automation Services by Distributed Event Processing," Web Information Systems Engineering—WISE 2014 Workshops, WISE 2014, Lecture Notes in Computer Science, vol. 9051, 14 pages, 2014.

Gegner, "Flow-Design and Event-Based Components: A New Approach in Designing Software Compared to Established Procedures," FHWS Science Journal, vol. 1, No. 1, pp. 59-73, 2013.

Hertel, "Applications of Games to Propositional Proof Complexity," A Thesis Submitted in Conformity with the Requirements for the Degree of Doctor of Philosophy, Graduate Department of Computer Science, University of Toronto, 174 pages, 2008.

Hertel, "Clause Learning, Resolution Space, & Pebbling," A Thesis Submitted in Conformity with the Requirements for the Degree of Doctor of Philosophy, Graduate Department of Computer Science, University of Toronto, 170 pages, 2008.

Pottebaum et al., "Event definition for the application of event processing to intelligent resource management," Proceedings of the 8th International ISCRAM Conference, Lisbon, Portugal, pp. 1-10, May 2011.

Tanenbaum et al., "Distributed Systems: Principles and Paradigms," Second Addition, Pearson Prentice Hall, Vrije Universiteit Amsterdam, The Netherlands, 87 pages, 2007.

Wikipedia, "Datenverarbeitung," Retrieved from the Internet: https://de.wikipedia.org/w/index.php?title=Datenverarbeitung&oldid=129347329, dated Apr. 9, 2014, 7 pages, Retrieved on Nov. 20, 2015.

Wikipedia, "Datenverarbeitung," Retrieved from the Internet: https://en.wikipedia.org/wiki/Data_processing, 4 pages, Retrieved on Apr. 20, 2017 (*English Translation*).

Wikipedia, "Finite-state machine," Retrieved from the Internet: https://en.wikipedia.org/w/index.php?title=Finite-state_machine&oldid=604022382, Apr. 13, 2014, 13 pages, Retrieved on Nov. 20, 2015 (Older Version).

Wikipedia, "Object hyperlinking," Retrieved from the Internet: https://en.wikipedia.org/w/index.php?title=Object_hyperlinking&oldid=595038998, Feb. 11, 2014, 4 pages, Retrieved on Aug. 5, 2015 (Older Version).

Wikipedia, "UML Tool," Retrieved from the Internet: https://en.wikipedia.org/w/index.php?title=UML_tool&oldid=601810558, Mar. 29, 2014, 4 pages, Retrieved on Nov. 20, 2015 (Older Version).

Wikipedia, "Visual programming language," Retrieved from the Internet: https://en.wikipedia.org/w/index.php?title=Visual_programming_language&oldid=604190547, Apr. 14, 2014, 5 pages, Retrieved on Nov. 20, 2015 (Older Version).

Windley, "The Live Web: Building Event-Based Connections in the Cloud," Course Technology PTR, ISBN 9781133686682, Chapter 1, 18 pages, Dec. 21, 2011.

International Search Report—International Application No. PCT/US2016/056577, dated Jan. 24, 2017, together with the Written Opinion of the International Searching Authority, 12 pages.

International Search Report—International Application No. PCT/US2015/025592, dated Dec. 1, 2015, together with the Written Opinion of the International Searching Authority, 15 pages.

A Research on the Key Criteria for Selecting Olympic Sponsors Based on Text Mining, Published in: 2007 International Conference on Management Science and Engineering (pp. 85-90), Beijing Univ, of Technol., Beijing (2008).

\* cited by examiner

Fig. 20
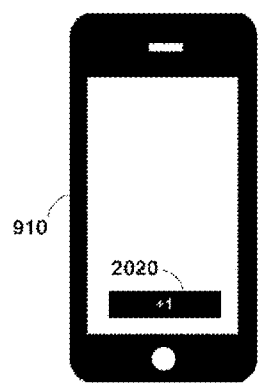
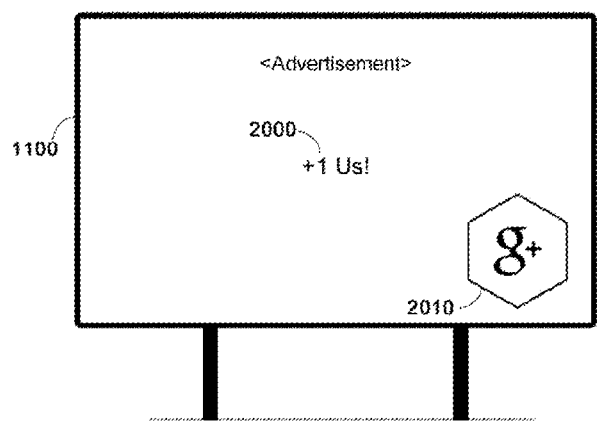

Sponsor Selector Screen

Game Results Screen

User Notification

Fig. 54

| | List of Triggers | Season Ticket Holders | Soccer Moms | Males Age 13-22 | |
|---|---|---|---|---|---|
| Team 1 | Mint The Action Jackson Card | $0.75 | $0.65 | $0.75 | Bid |
| | Upgrade Action Jackson from Bronze to Silver | $0.60 | $0.70 | $0.20 | Bid |
| | Upgrade Action Jackson from Silver to Gold | $0.22 | $0.90 | $0.40 | Bid |
| | Mint Player Y | $0.90 | $0.22 | $0.54 | Bid |
| | Upgrade Player Y from Bronze to Silver | $0.95 | $0.15 | $0.89 | Bid |
| Experience Provider X | Trigger X1 | $0.12 | $0.62 | $0.04 | Bid |
| | Trigger X2 | $0.70 | Free | Free | Bid |
| | Trigger X3 | Free | $0.10 | $0.84 | Bid |

PLATFORM FOR PROVIDING CUSTOMIZABLE USER BRAND EXPERIENCES, SPONSORSHIP JUNCTIONS, AND CONVERSION ATTRIBUTION

CROSS-REFERENCE TO RELATED APPLICATION(S)

The present application is a continuation of U.S. application Ser. No. 15/888,694, filed on Feb. 5, 2018 and issuing on Sep. 8, 2020 as U.S. Pat. No. 10,769,680, which claims priority to U.S. Provisional Application No. 62/484,077, filed Apr. 11, 2017, and is also a continuation-in-part of U.S. application Ser. No. 15/291,309, filed Oct. 12, 2016, now U.S. Pat. No. 9,886,720, which claims the benefit of U.S. Provisional Application No. 62/241,113, filed Oct. 13, 2015, for an invention having the same title as above and by the same inventors; each of which is hereby incorporated herein by reference in its entirety. The subject matter of the present application also may be related to U.S. application Ser. No. 14/253,621, filed Apr. 15, 2014, now U.S. Pat. No. 9,218,609, which is hereby incorporated herein by reference in its entirety.

TECHNICAL FIELD

The present invention relates to the area of server-based software services, and more particularly to computer-implemented methods for providing customizable brand experiences in relation to usage of computer devices such as mobile smart phones.

BACKGROUND ART

Since the presently described invention touches on several fields, it is useful to discuss prior art in these separate areas.

MIT has produced an educational programming language called "Scratch," which is meant to make it easier to program computers so that children can understand it.

Google and other companies have built mapping services which are based on a combination of tile servers as well as vector graphics. Google has integrated its mapping services with its "Street View" fleet of cars with cameras on the roofs in order to create a further ground-level view of the world's streets.

There are several advertising networks which specialize in mobile advertising, including AdMob, iAd, InMobi, and others. Their strategy is to advertise in existing apps and on mobile web pages using technology such as banners and interstitials.

Pebbling is an advanced topic in computer science, and an overview can be found in the Ph.D. theses of the inventors. For example, see Applications of Games to Propositional Proof Complexity. A. Hertel, University of Toronto, 2008, or Clause Learning, Resolution Space, & Pebbling. P. Hertel, University of Toronto, 2008.

SUMMARY OF THE EMBODIMENTS

In one embodiment of the present invention, there is provided a computer-implemented method of providing a brand sponsorship environment. The method of this embodiment includes providing a computer-implemented platform establishing a sponsorship junction involving a first set of trigger-monitorable activities defined by a set of audience providers.

The platform of this embodiment implements a set of three over-all processes. The first over-all process includes providing a computer-implemented platform establishing a sponsorship junction involving a first set of trigger-monitorable activities defined by a set of audience providers. The platform implementing processes include:

for each audience provider of the set of audience providers:

serving over a network, by a server, the server coupled to a storage system and coupled to the network, data defining a screen on a client computer of an audience provider representative by which the audience provider representative can specify at least a specified subset of the first set of trigger-monitorable activities, the specified subset being monitored by corresponding triggers; and receiving over the network and storing by the server data from the client computer of such audience provider representative defining the specified subset of trigger-monitorable activities;

for each sponsoring brand of the set of sponsoring brands:

serving over the network: by the server, data defining a screen on a client computer of a sponsoring brand representative by which the sponsoring brand representative can specify a reward that can be offered to a participating end user; and receiving over the network and storing by the server data from the client computer of such sponsoring brand representative defining the reward;

wherein at least one of all of the trigger-monitorable activities in the specified subset utilizes a Physical Trigger.

The second over-all process includes storing, by the server, for each given sponsoring brand, a sponsor selection that establishes a set of linkages, each linkage defining a correspondence between at least one member of the specified subset of trigger-monitorable activities and the reward applicable to the given sponsoring brand, so as to define sponsorship by the given sponsoring brand of the at least one activity of an audience provider in the set of audience providers. The third over-all process includes receiving, by the server, over a period of time, a set of triggers, applicable to the participating end-user, and, responsive to the stored sponsor selection of such brand's set of linkages, associating, by the server, the set of triggers with the account of a pertinent one of the set of audience providers and relaying the set of triggers to the corresponding set of sponsoring brands.

In a further related embodiment the method includes, before storing by the server the sponsor selection, applicable to the participating end-user, receiving the sponsor selection by the server over the network from a computing device of the participating end-user. Alternatively or in addition, the method further includes, before storing by the server the sponsor selection, applicable to the participating end-user, making the sponsor selection by the server. Optionally, making the sponsor selection by the server includes evaluating by the server data characterizing bids received from an auction.

In a further related embodiment, (i) for each sponsoring brand, the reward that can be offered to the participating end user is participation in a second set of trigger-monitorable activities defined by such sponsoring brand, and (ii) each linkage, defining a correspondence between at least one trigger monitorable activity attributable to a member of the set of audience providers and at least one trigger, attributable to such sponsoring brand, that is a conversion trigger that is fired when the participating end-user performs an action targeted by the sponsorship. In this embodiment, the method further includes providing to the participating end-user, when and only when the participating end-user shall have performed the targeted action, a token coded uniquely for a one-time use, wherein a reward for the targeted action is conditioned on interaction of the participating end-user's computing device with the token so as to cause sending a conversion trigger message to the server, so that the conversion trigger message is produced only once and only after the targeted action has been performed by the participating end-user. In a further related embodiment, the targeted action is visiting by the participating end user of an identified physical location. In another related embodiment, the targeted action is purchasing by the participating end user of an item. Optionally, the token is implemented in a receipt given to the end user for making a purchase. Alternatively, the targeted action is visiting by the participating end user to an identified digital location. Optionally, the digital location is identified by a URL.

In another embodiment of the invention, there is provided a computer-implemented method of providing a brand sponsorship environment. This embodiment implements a set of three over-all processes.

The first over-all process includes providing a computer-implemented platform establishing a sponsorship junction involving a second set of trigger-monitorable activities defined by a set of sponsoring brands. This platform implements processes including:

for each audience provider of the set of audience providers:
serving over a network, by a server, the server coupled to a storage system and coupled to the network, data defining a screen on a client computer of an audience provider representative by which the audience provider representative can specify a reward that can be offered to a participating end user; and
receiving over the network and storing by the server data from the client computer of such audience provider representative defining the reward;
for each sponsoring brand of the set of sponsoring brands:
serving over the network, by the server, data defining a screen on a client computer of a sponsoring brand representative by which the sponsoring brand representative can specify at least a specified subset of the second set of trigger-monitorable activities, the specified subset being monitored by corresponding triggers; and
receiving over the network and storing by the server data from the client computer of the sponsoring brand representative defining the specified subset of trigger-monitorable activities;
wherein at least one of all of the trigger-monitorable activities in the specified subset utilizes a Physical Trigger.

The second over-all process includes storing, by the server, for each given sponsoring brand, a sponsor selection that establishes a set of linkages, each linkage defining a correspondence between at least one member of the specified subset of trigger-monitorable activities and the reward applicable to the given sponsoring brand, so as to define sponsorship by the given sponsoring brand of the at least one activity of an audience provider in the set of audience providers. Finally, the third over-all process includes receiving, by the server, over a period of time, a set of triggers, applicable to the participating end-user, and, responsive to the stored sponsor selection of such brand's set of linkages, associating, by the server, the set of triggers with the account of a pertinent one of the set of sponsoring brands and relaying the set of triggers to the corresponding set of experience providers.

In a further related embodiment the method further includes before storing by the server the selection, applicable to the participating end-user, of a set of sponsoring brands for which a sponsorship has been established, receiving the selection by the server over the network from a computing device of the participating end-user. Alternatively, the method further includes before storing by the server the selection, applicable to the participating end-user, of a set of sponsoring brands for which a sponsorship has been established, making the selection by the server. Optionally, making the selection by the server includes evaluating by the server data characterizing bids received from an auction.

In another related embodiment, one of the linkages, defining a correspondence between at least one trigger attributable to a set of audience providers and at least one trigger attributable to a set of sponsoring brands, relates to a conversion trigger that is fired when the participating end-user performs an action targeted by the sponsorship. In this embodiment, the method further includes providing to the participating end-user, when and only when the participating end-user shall have performed the targeted action, a token coded uniquely for a one-time use, wherein a reward for the targeted action is conditioned on interaction of the participating end-user's computing device with the token so as to cause sending a conversion trigger message to the server, so that the conversion trigger message is produced only once and only after the targeted action has been performed by the participating end-user.

Optionally, the targeted action is visiting by the participating end user of an identified physical location. Also optionally, the targeted action is purchasing by the participating end user of an item. As a further option, the token is implemented in a receipt given to the end user for making a purchase. Optionally, the targeted action is visiting by the participating end user to an identified digital location. As a further option. the digital location is identified by a URL.

In another embodiment, there is provided a computer-implemented method of providing a brand sponsorship environment. The method of this embodiment includes providing a computer-implemented platform establishing a sponsorship junction involving a first set of trigger-monitorable activities defined by a set of sponsoring brands. In this embodiment, the platform implements a series of processes. The processes include, for each sponsoring brand of the set of sponsoring brands, serving over a network, by a server, the server coupled to a storage system and coupled to the network, data defining a screen on a client computer of such sponsoring brand representative by which the sponsoring brand representative can specify at least a specified subset of the first set of trigger-monitorable activities and a corresponding offer, the specified subset being monitored by corresponding triggers. The processes also include receiving over the network and storing by the server data, from the client computer of such sponsoring brand representative, defining the specified subset of trigger-monitorable activities and the corresponding offer. In these processes, at least one of all of the trigger-monitorable activities in the specified subset utilizes a Physical Trigger. The processes further include causing display, by the server, over the network, of data characterizing the offer for the trigger-monitorable activity, on client computers of a set of audience provider representatives. The method further includes storing, by the server, for each audience provider representative accepting the offer of a given sponsoring brand, an audience provider selection that establishes a set of linkages, each linkage defining a correspondence between at least one member of the specified subset of trigger-monitorable activities and such audience provider, so as to define sponsorship by the given sponsoring brand of such audience provider in the set of audience providers. Also the method includes, for each audience provider representative accepting the offer of the given sponsoring brand, receiving, by the server, over a period of time, a set of triggers, each trigger applicable to a participating end-user associated with such audience provider, and, responsive to the stored selection by such audience provider, associating, by the server, the set of triggers with the account of the given sponsoring brand and relaying the set of triggers according to instructions provided on behalf of such audience provider.

In yet another embodiment, there is provided a computer-implemented method of providing a brand sponsorship environment. The method of this embodiment includes providing a computer-implemented platform establishing a sponsorship junction involving a trigger-monitorable activity defined by a given sponsoring brand. The platform implements a series of processes that include serving over a network, by a server, the server coupled to a storage system and coupled to the network, data defining a screen on a client computer of a sponsoring brand representative by which the sponsoring brand representative can specify the trigger-monitorable activity and a corresponding offer, the specified trigger-monitorable activity being monitored by corresponding triggers. The processes also include receiving over the network and storing by the server data, from the client computer of such sponsoring brand representative, defining the trigger-monitorable activity and the corresponding offer. In these processes, the trigger-monitorable activity utilizes a Physical Trigger. The processes further include causing display, by the server, over the network, of data characterizing the offer for the trigger-monitorable activity, to client computers of a set of audience providers. The method further includes storing, by the server, for any audience provider accepting the offer, an audience provider selection that establishes a linkage defining a correspondence between the trigger-monitorable activity and such audience provider, so as to define sponsorship by the given sponsoring brand of such audience provider. The method also includes receiving, by the server, over a period of time, a set of triggers, each trigger applicable to a participating end-user associated with such audience provider, and, responsive to the stored selection by such audience provider subsets of trigger-monitorable activities, associating, by the server, each trigger with the account of the given sponsoring brand and relaying the trigger according to instructions provided on behalf of such audience provider.

BRIEF DESCRIPTION OF THE DRAWINGS

The foregoing features of embodiments will be more readily understood by reference to the following detailed description, taken with reference to the accompanying drawings, in which:

FIG. 20 is a diagram including a representation of a display presenting a mobile user interface, for use by an end-user, in accordance with an embodiment of the present invention, for interacting with a Google+ trigger.

FIG. 54 shows the sponsor interface, in accordance with an embodiment of the present invention, for setting a maximum price to bid for triggers from an experience provider.

DETAILED DESCRIPTION OF SPECIFIC EMBODIMENTS

Definitions

Figure 1:
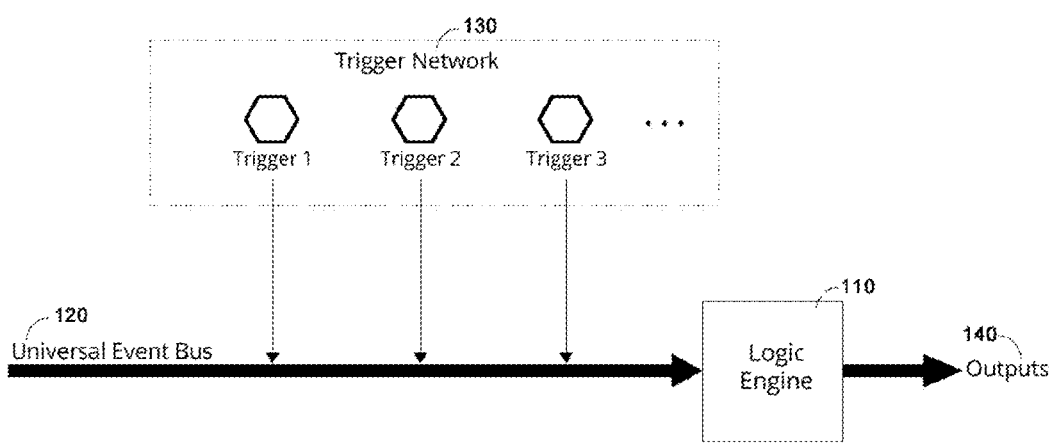
FIG. 1 is a diagram of high-level system architecture of an embodiment of the present invention.

As used in this description and the accompanying claims, the following terms shall have the meanings indicated, unless the context otherwise requires:

A "server" includes a hardware-implemented server, a cluster of computers configured to operate as a hardware-implemented server, and a set of logical processes configured to perform functions associated with a hardware-implemented server.

A "set" includes at least one member.

A "brand" is a trademark or an affinity group.

An "affinity group" is a grouping of individuals having a shared interest, which may, for example, be (1) an interest in goods or services from a particular source, which in turn may be identified by a trademark, (2) an interest in celebrating the birthday of a particular child, or (3) an interest in a program of a school in rewarding performance or participation by students in some activity, such as a spelling bee, an athletic competition, academic achievement, etc.

A "module" is a program, created using the embodiment of the present system that provides a customized user brand experience. Specifically, a module when deployed runs on the server, and portions of the module run on a device of a user have the customized brand experience. Contrast this definition with that of the definition for "application".

"Source code" for a program is human readable code, that, when compiled or interpreted, can be executed by a device "source code" therefore includes a module written in our Pebbling Language.

A "trigger message" is a message that encodes and communicates the occurrence of an event previously defined and stored by a brand in the Logic Engine as a trigger event. The message is transmitted either (1) over a network from an Internet-connected device or server to the Universal Event Bus 120 of FIG. 1 and thereafter to the Logic Engine 110 of FIG. 1, or (2) from within the Logic Engine 110 as an inter-process message to another part of the Logic Engine 110. Although a first brand typically has possession of its own trigger messages, a second brand may subscribe to the first brand's trigger messages, in which case the resulting stream of trigger messages is said to be "sourced". See definition of "trigger".

A "trigger" is a configuration of an apparatus to cause generation and sending of a trigger message on the occurrence of a trigger event. (See "trigger message".) A trigger is typically configured by a brand in connection with development of at least one module by the brand. However, once a brand has configured a set of triggers, the resulting stream of trigger messages may be made available to another brand by subscription, in which case the resulting stream of trigger messages is termed a stream of "sourced trigger messages".)

A "Physical Trigger" is a trigger that can be deployed in the real world, and includes a trigger that is implemented through physical activity in augmented reality or virtual reality, as indicated in the next paragraph. Physical Triggers are described in further detail below.

A "trigger-monitorable activity" is an activity wherein events in the course of the activity can be monitored according to machine state of a relevant set of monitoring devices, so that, among the events, a trigger may be associated with each type of event. One such trigger-monitorable activity is a web-based electronic game. Another is wherein an individual has traveled to a specific geolocation and confirmed the geolocation with the individual's mobile device. Yet another includes participation in a virtual reality or augmented reality experience or game, in which certain actions cause triggers to be fired. In effect, a trigger-monitorable activity is any type of activity in which participation or action by an end user, can be detected by a trigger created so that its being fired by an end-user indicates that the end-user is indeed participating in that activity or performing that action. It is not necessary that the end-user be aware that a specific trigger-monitorable activity is in fact being monitored by a trigger, even though the end-user might be purposefully engaged in the activity. As an example, a user may intentionally use a credit card by swiping it while being unaware that the swiping action also fires a trigger. As another example, an end-user may purchase a specific brand of beverage at a kiosk and a camera may be harnessed to a computer system by which the end-user is identified by facial recognition, so that the purchase by the end-user of the specific brand of beverage may be employed as an activity that fires a trigger. As such, any type of trigger can be used to monitor an activity, and additional trigger-monitorable activities are discussed below.

An "end-user" is a consumer using any device which can send and/or receive trigger messages created with the embodiment of the present system by a brand.

A "programmable pattern" is a pattern of trigger messages that form a condition for the generation of an outcome message. A programmable pattern may be determined when the module is itself programmed or otherwise built into the Logic Engine; alternatively the programmable pattern may be defined separately from programming of the module or of the Logic Engine.

An "outcome message" is a message, provided as an output of a module, made available to an outcome destination client, wherein the output is conditioned on a change in end-user data pertinent to a given one of the end-users with respect to at least one brand.

An "outcome destination client" is a device coupled over a network to the Logic Engine and configured to receive outcome messages.

"End-user data" is data, providing, for each of n end-users, a value of each of a set of attributes, but the data for any given end-user may lack values for some of the attributes.

A "brand representative" is an individual acting on behalf of a brand in configuring a customized module to provide, to a set of end-users, an outcome message in connection with the brand.

A "module template" is the definition of a module which is not associated with any particular end-user. By contrast, a "module instance" is the product of instantiating a module template for a particular end-user, so there can be only one template, but many instances of it.

The act of "minting" a module or other digital object is the process of instantiating an instance of that module's template.

An "audience provider" is an entity that provides events, performances, games or other environments drawing an audience, such as such a baseball team, theme park, video game maker, movie studio, musician, cruise line, hotels, golf course, etc.

An "experience provider" is a user of an embodiment of the present technology platform who embeds triggers or the ability to receive triggers in end-user experiences which are created using the platform or independently of it, and therefore can be understood as a "brand" that is using an embodiment of the platform described herein.

A "conversion" occurs when a participating end-user performs an action targeted by sponsorship by a sponsoring brand of a set of trigger-monitorable activities.

A "conversion trigger" is a trigger that is fired when a participating end-user performs an action targeted by sponsorship by a sponsoring brand of a set of trigger-monitorable activities.

An "application" is a program that is written for deployment on a device running in its regular native mode.

A "device" is a machine or product, containing a CPU and memory that can execute programs. A "mobile device" is a device that is readily portable. A "client computer" is a "device" as defined herein. A "server" includes a server system.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "splice" is a utility program that can be incorporated, using an API, into a stand-alone application, which runs on an end-user device, in order to configure the stand-alone application to provide a brand experience to the end-user.

Overview

The present application concerns certain improvements to the invention described in U.S. Pat. No. 9,218,609, issued on Dec. 22, 2015, on an application filed Apr. 15, 2014, entitled Platform for Providing Customizable Brand Experiences, which patent is incorporated herein by reference in its entirety.

FIG. 1 is a diagram of high-level system architecture of an embodiment of the present invention. As shown in FIG. 1, at the highest level, this embodiment provides a cloud-based operating system with universal Internet event bus 120 for transmitting trigger messages from heterogeneous sources 130 to a sophisticated Logic Engine 110, operating on a server, that executes programs called "modules" and contains module and end-user data. These messages are then received as inputs by the modules in order to produce outputs for a variety of end-users, stores, brands, companies, etc., thereby connecting them within a rich, new, interactive ecosystem. Because the Logic Engine 110 controls and executes modules, this embodiment of the present invention can be viewed as an operating system, albeit one which resides and executes these modules in the cloud. The Logic Engine 110 is quite different from a traditional operating system which resides and executes applications on individual machines, and which are not necessarily even network-connected. Similarly, a large component of this embodiment is its Universal Event Bus which spans the entire Internet, receiving trigger messages from any Internet-connected device, computing and processing them in the Logic Engine 110 within the context of the previously-mentioned modules, and then optionally sending output messages and data 140 to any arbitrary Internet-connected devices, computers, or servers. In that sense, this embodiment can also be viewed as a communications platform. The embodiment is designed to enable a plurality of programmers to create a plurality of modules to be used by many different end-users. The embodiment in turn provides all of the facilities and user interfaces necessary for creating and hosting these modules and trigger messages, and it can therefore similarly be viewed as a programming platform for the creation of not just modules, but also the ecosystems in which the modules interact.

This ecosystem creation platform is in many ways much more powerful than any previously envisioned compiler or integrated development environment (IDE). It can be used by brands, companies, stores, or even individuals to create simple but compelling applications, programs (i.e. modules), and games which can be deployed via a wide variety of devices including, but not limited to smart phones, tablet computers, laptops, desktop computers, smart watches, optical head-mounted displays and other wearable computers, onboard vehicle computers, gaming platforms, and so forth. However, unlike typical IDEs which are only capable of creating software applications, the embodiment of the presently-described platform also creates the ecosystems in which they will operate.

For instance, present system can be used to create or augment a mobile app as well as creating and deploying a broad set of heterogeneous real-world triggers with which that app will interact. In that sense, this embodiment of the presently-described invention is a universal Internet event bus and programming platform, but can also be viewed as a marketing platform which is capable of tying together all existing advertising channels. For instance, by creating and deploying triggers to a wide variety of standard advertising channels such as print, television, bus stops, billboards, radio, and digital mediums, the embodiment of this invention upgrades all traditional advertising to become digital and interactive, in effect creating a rich ecosystem in which the end-user of a brand's app can interact with that brand's sophisticated marketing campaign that spans both cyberspace as well as the real world.

The embodiment of the presently-described programming platform differs radically from previous and existing programming environments and IDEs in several respects described immediately below, and then in much greater detail later in this exposition:

1. IDE vs. Ecosystem Creation Platform: One key difference between traditional IDEs and this embodiment of the presently-described invention is that the former consist almost entirely of compilers or interpreters, with peripheral services such as Eclipse's Android simulator, and Microsoft Visual Studio's Azure cloud deployment functionality. These are used mostly to create, debug, test, and deploy software applications. By contrast, the embodiment of the present invention has all of this standard functionality for creating modules, but also has the ability to create the ecosystem in which these software modules will be used. For instance, in one embodiment, the presently-described platform provides a web-based programming environment which can be used through any web browser. It not only provides tools for the creation, deployment, and hosting of applications as well as their support services, but also for building the components of the real-world ecosystem (i.e. triggers) in which those applications will function. In addition, once a module has been deployed and is operating, the platform provides the analytics tools for reporting both vital and subtle usage details through charts, graphs, heat maps, and so on. It exposes all of these powers and functionality within one unified and integrated service in which the parts are joined seamlessly and efficiently. Although a portion of the present invention can also be implemented as a stand-alone application like Microsoft Visual Studio or Eclipse, the preferred embodiment is for it to be implemented as a cloud-based service, providing further differentiation from existing means of creating programs.

Traditional programming environments and IDEs typically allow for the creation and manipulation of applications whose inputs reside on devices such as desktop computers, and end-users typically interact with these applications while indoors, most often seated in front of these devices. More recently, the same programming environments have made it possible to create mobile applications which are instead deployed to devices such as smart phones, allowing end-users to run these applications outdoors. However, the predominant input mode on mobile devices is still largely identical to that of laptops and desktop computers in that in all of these cases, end-users input their wishes and commands into a screen. The means of input (e.g., keyboard vs. mouse vs. touch screen) may vary greatly, but the paradigm of inputting commands directly into a graphical user interface remains the same.

By contrast, the presently-described programming platform enables the creation and manipulation of modules which, in addition to having standard graphical user interfaces, also have an additional new set of possible inputs called triggers. These input/interaction points are also created and hosted using the embodiment of the presently-described platform, and they can be situated in the physical (real) world, although they can also exist on servers or in cyberspace. Previous IDEs of course also make it possible to access a device's sensors, but what they do not do, and what is unique to the embodiment of the presently-described platform, is the high-level ability to easily create and deploy an entire network of heterogeneous triggers so that programmers don't have to write low-level code every time they want to create a real-world interaction. In that sense, previous attempts to adapt traditional programming languages, compilers, and methodologies to the new mobile world have completely failed to recognize the importance of a mobile device's multitude of sensors in order to greatly extend the input signals available to applications. They make it possible to access and use a device's sensors, but they fail to bring them to the forefront where it becomes easy to create and use them.

The embodiment of the present invention therefore creates a new paradigm of ecosystem-centric computing. Rather than depending on inputs being located mostly within the software and hardware user elements of a device, the embodiment of the present system is characterized by also easily exposing and providing many more inputs (triggers), many of which can be located in the physical world. In order to get inputs from the triggers in the physical world, the end-user interacts with them using a computing device so that rather than end-user inputs being initiated internally from within the device, they exist outside of it and are triggered externally using the device's sensors. In addition, other types of triggers can be located in software or in cyberspace rather than in the real world. This creates a universe in which modules running on a variety of devices have vastly more and vastly richer opportunities for interaction.

2. User-Friendliness: In one embodiment, the system's most unexpected characteristic which differentiates it from existing programming environments is its user-friendliness. This is achieved by a surprising and radical departure from the core feature of traditional programming languages in that ours does not have a grammar or syntax. Standard programming languages, such as Java, C, C++, C#, etc. each have a syntax defined by a context-free grammar that can be captured using Backus-Naur form, which means that these are all text-based programming languages. By contrast, the embodiment of the presently-described new programming "language" is entirely visual, and not text-based at all. Rather than being based on syntax and grammar, the presently-described language at its core is based on an entirely different concept from unrelated area of computer science: Pebbling Games. An interested reader is referred to the Ph.D. theses of the inventors. For example, see Applications of Games to Propositional Proof Complexity. A. Hertel, University of Toronto, 2008, or Clause Learning, Resolution Space, & Pebbling. P. Hertel, University of Toronto, 2008. Unlike programming languages, which comprise their own distinct area of computer science, pebbling games are an advanced topic which come from the areas of graph theory and computational complexity. They are simple one-player games that are typically used to prove logical results in these areas, and are of interest to us because they have two very useful properties: The first is that they are games which are so simple that even a child can quickly understand and master the rules. The second is that pebbling is immensely powerful from a computational complexity point of view and is particularly good at capturing the notion of state. This contrast is important because it goes against the typical trend in nature that power and flexibility usually come at the expense of simplicity, but in this case we find them entwined together and are able to exploit this remarkable fact by using pebbling as the basis for building a unique graphical programming language which is Turing-Complete.

In one embodiment of the presently-described graphical programming language, the programmer uses the embodiment's web-based interface to build graphical diagrams that encode the workings of a computer module. The key characteristic of this new way of programming is that it is extremely visual, intuitive, and requires little or no prior training in computer science. This stands in stark contrast with traditional syntax/grammar-based programming languages which require a great deal of expertise, education, and experience before programmers are able to achieve proficiency. In other words, using the embodiment of the presently-described Pebbling-based Programming Language, even people without technical backgrounds can use it to create sophisticated and compelling modules. This Pebbling Language is only one embodiment, and of course it is possible to use a more traditional language such as Java (or any other programming language) instead.

3. Additional Components: In addition to the core functionality and characteristics described above, the embodiment of the present system also contains several additions to this core functionality which are deeply-integrated and will also be described in greater detail below. In brief, they are:

Sponsorship Junctions: Since the embodiment of the present system can been used to build rich ecosystems of applications and triggers, the question then becomes how to construct the most efficient ecosystems to achieve certain goals. For instance, brands might build a trigger-based ecosystem in order to create more compelling interactive experiences for customers using their apps. Similar ecosystems can be built in order to allow brands to sponsor people for doing normal everyday activities such as playing video games or visiting theme parks. In this type of relationship, an experience provider such as a video game maker or theme park owner may wish to create a Sponsorship Junction in which this owner defines a number of triggers, and then invites various brands with their apps to sponsor that event. These brands define logic that makes use of the incoming triggers from the game to offer sponsorship benefits in the form of rewards and in-app state changes to end-users who are participating in the experience. The end-user then selects his/her favorite sponsor from those who have signed up, and receives rewards from that sponsor as he/she plays the video game or goes on rides at the theme park. Part of the Sponsorship Junction's role is to facilitate the mechanics of sponsorships and rewards, linking the event's triggers to events in a brand's app, but the other main function is to simplify the required business development so that rather than having, say, every game developer have to make a separate deal with every sponsor, each entity only makes one deal with the Sponsorship Junction, thereby drastically reducing the business complexities involved. The overall embodiment of the presently-described system includes these Sponsorship Junctions and their functionalities as a sub-component.

Loyalty Points Exchange: One standard type of loyalty program involves brands awarding loyalty points to customers, and since the presently-described programming language is Turing-Complete, it can easily implement this type of program for many brands, all within the same system. Because of this, and unlike current brand loyalty points systems, which are siloed from each other, the embodiment can enable new functionality in the form of a Loyalty Points Exchange. This is a service which acts something like a currency exchange, except for loyalty points. For instance, an end-user might have accounts and loyalty points with both Brand 1 and Brand 2 within the embodiment of the present system, and wants to redeem points from Brand 1 in order to receive some kind of reward, but doesn't quite have the required number of points. This end-user can then convert points from Brand 2 to those of Brand 1 according to the system's current exchange rate in order to then be able to afford the reward. The system does this in a way such that both brands as well as the end-user end up profiting from the transaction. The overall embodiment of the present invention includes a Loyalty Points Exchange and its functionality as a sub-component.

Trigger Streams: In the same way that Twitter allows individual users to broadcast messages, there is value in the ability for individuals or entities to broadcast triggers, and the embodiment of the present invention contains a sub-component enabling this functionality which we call "Trigger Streams". For instance, a company or information provider can use the embodiment of the present system to broadcast a stream of triggers to which brands or other information consumers using the embodiment can subscribe, and then react to some or all of the triggers in that stream.

Detailed Architecture

Figure 2:
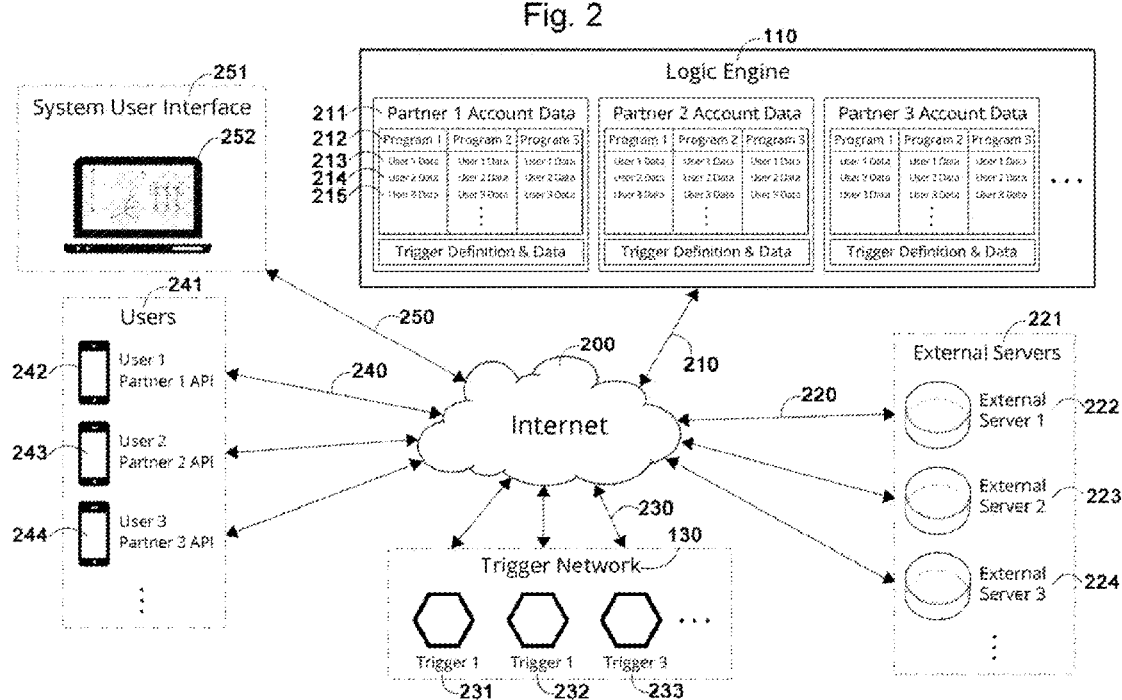
FIG. 2 is a more detailed diagram of the system architecture of the embodiment of FIG. 1.

FIG. 2 is a more detailed diagram of the system architecture of the embodiment of FIG. 1. Instead of showing the Universal Event Bus 120 from FIG. 1, we have illustrated an embodiment of its components, namely the presently-described system's main medium of communication, which is the Internet 200, and various Internet connections 210, 220, 230, 240, and 250 joining the system's Logic Engine 110 to the other components of the system. Of these components, the system's triggers 130 were previously shown, whereas external servers 221, end-user devices 241-244, and the System User Interface 251 were not shown in the previous figure.

The system's Logic Engine 110 is the nerve center of the embodiment of the present invention and includes database tables 211 containing account data for one or more partners (brands, companies, individuals, etc.) who use this system. This embodiment is used to define a module template, which in turn is then used to instantiate an instance of the module for an individual end-user. This allows different end-users' modules to be in different states. Each account contains the logic and data for one or more modules 212 as well as end-user data 213, 214, 215 for each of their end-users in the context of each module. This feature saves the system's partners from having to host and manage all of their own end-user data, and will also help them to decrease latency. Note that every end-user does not necessarily have an account with every partner, and within each partner, each end-user does not necessarily have data associated with every module, since every end-user might not even have each of the modules.

The system's Logic Engine 110 is connected via the Internet to various partner servers 221 which are running software allowing data to be shared with the present system such that individual partner servers 222, 223, and 224 are associated with their corresponding account data within the Logic Engine. This allows partners who for privacy or other reasons require that the end-user data be stored on their own systems to work with us.

The system Logic Engine is also connected to its Trigger Network 130. Much like module and end-user data, trigger definitions are stored with a partner's account data 211 in the system's Logic Engine. Triggers are heterogeneous in that there are many diverse types which can work in various different ways. More information on these different trigger types will be given later in this exposition, but their commonality is that they all define a data message which can be sent from various different sources to the system's Logic Engine 110, where one or more modules are registered to listen for them and in turn change state or react to that message. Some trigger types consist largely of data and exist in the Logic Engine, with a low-tech representation such as a QR code in the real world. When the end-user interacts with that representation, the module being run on the end-user's device causes the logical aspect of that trigger to be found and fired. In that sense, the visual call-to-action associated with triggers does not necessarily have a technological hardware component. However, in some cases they do, and in other cases they can exist as software on third party servers 221. In many cases, triggers are user-initiated, but in some they are not. One aspect that they all share is that they help to create the ecosystem in which a module 212 has many interaction points. Triggers can contain metadata such as the geolocation or IP address from where they originated. They can also have restrictions on them indicating that they cannot be fired from certain locations or under certain circumstances such as outside of specific time windows.

The system's Logic Engine is also connected by way of the Internet 200, 240 to individual end-user devices 241. These devices run applications created by the system's partners, and these applications can be partially programmed by them using traditional IDEs, but can also be entirely defined using the embodiment of the present system. In the hybrid case, we make an API available to them which can be spliced into their native applications 242, 243, 244 in order to run the modules 212 which they created in the system's Logic Engine, and to the end-user this will all seamlessly appear as native code. In this manner of creating sophisticated modules using the system and then splicing them into their native applications, even partners without strong technical expertise can very easily add the system's powerful functionality to their apps.

Finally, the system's Logic Engine is connected via the Internet 210, 250 to a user-friendly graphical interface 251 running in a web browser on an ordinary computer 252. This user interface has different access levels and is used to control all aspects of the system's Logic Engine. For instance, it is used to define modules as well as triggers, launch them, provide analytics data regarding their usage, and so on.

System User Interface

Figure 3:
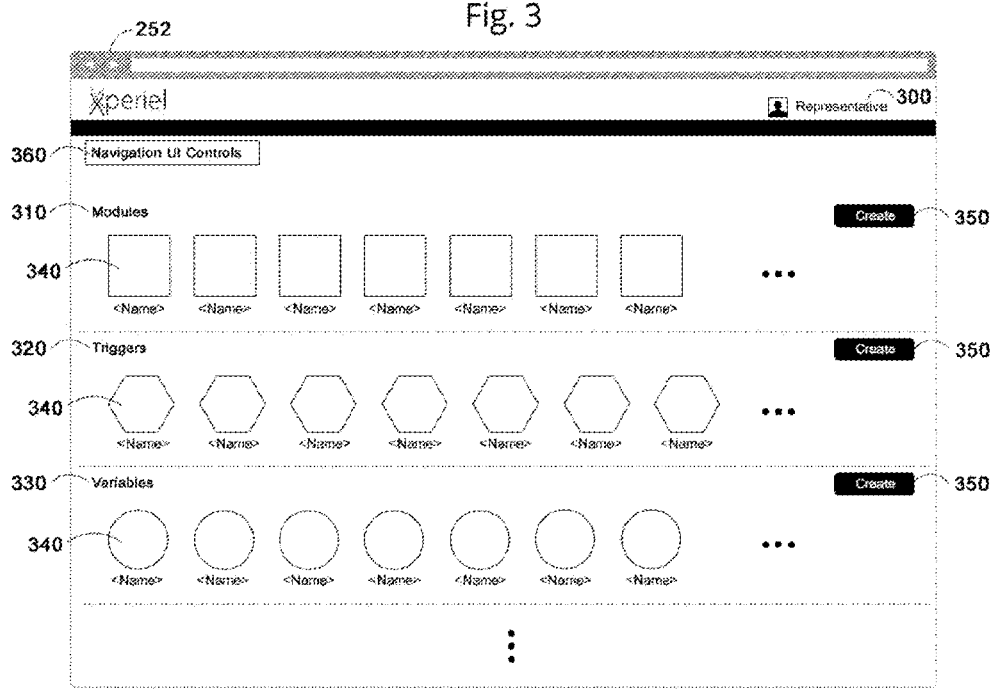
FIG. 3 is a representation of a display presenting a main user interface menu for use by a brand representative with an embodiment, such as that of FIG. 1, of the present invention.

The system's Pebbling-based Programming Language is best described together with its user interface. FIG. 3 is a representation of a display presenting a main user interface menu for use by a brand representative with an embodiment, such as that of FIG. 1, of the present invention. In various embodiments, the main user interface is accessible through any standard web browser 252, but is readily implemented by other means, such as a stand-alone application. The system of this embodiment contains standard user account management and login facilities 300 which implement common functionality and therefore don't require further exposition.

In one embodiment, the system uses an extreme version of object-oriented programming in which a programmer creates self-contained atomic objects 340 such as Modules 310, Triggers 320, and Variables 330, which are respectively shown as squares, hexagons, and circles in this view. The system also supports many other types of objects which are not shown, such as, but not limited to receivers. The system has facilities for defining the scope and visibility of each object.

Each of these objects performs a different function, and objects of similar type are grouped together, arranged in horizontal bands. In order to create one of these objects, the programmer clicks on a creation button 350 located in the appropriate band, at which point a wizard walks that programmer through steps appropriate to the creation of the object for that band, requesting information when necessary.

Although these objects are created independently and are self-encapsulated, they act as building blocks, which can be combined and used by other objects. For instance, as has already been described in previous sections, Triggers 320 form the ecosystem of inputs through which the final modules(s) created within an account using the embodiment of this system will interact. First they are created independently, and then they are referenced by the modules(s). Similarly, Variables 330 act very much like variables in typical programming languages and have types such as integers, Booleans, strings, dates, and so on. Much like Triggers, Variables are first created independently, and then referenced by the modules(s). Receivers can similarly be created independently and then be referenced by modules. The purpose of receivers is to allow a module to register to listen for specific triggers.

Modules 310 are the most important and complicated objects in the system, and as already mentioned, they are the system's equivalent of programs. They are created within the present embodiment of the system and then deployed to end-user devices such as smart phones, tablets, web pages, and so on. Modules are the entities within the system that are programmed using the system's Pebbling Language, or some other equivalently expressive programming language. In order to program a module using the system's Pebbling Language, a programmer clicks on the square icon of a module and opens the Module Editor. The system's Pebbling Language is based on state-diagrams, and pebbles are placed on these diagrams in order to record which state the modules written using this language are in.

Figure 4:
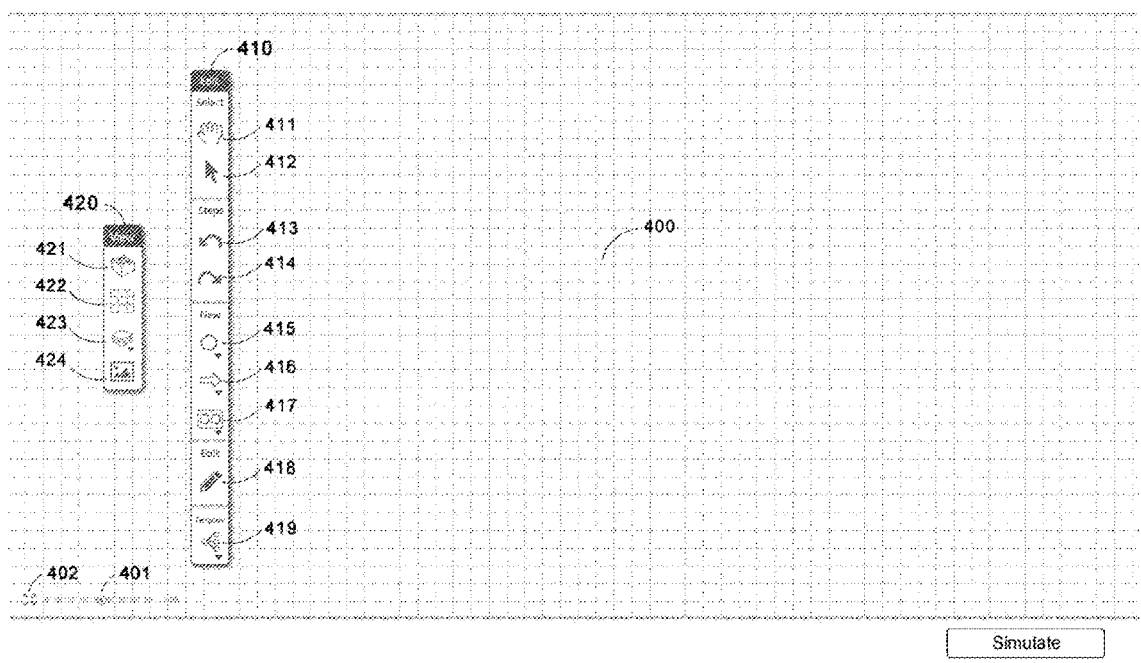
FIG. 4 is a representation of a display presenting a user interface (here in blank), for use by a brand representative, in accordance with an embodiment of the present invention for a visual editor for creating a module for use in the embodiment of FIG. 2.

FIG. 4 is a representation of a display presenting a user interface (here in blank), for use by a brand representative, in accordance with an embodiment of the present invention for a visual editor for creating a module for use in the embodiment of FIG. 2. This Module Editor allows a programmer to define the details of a module using an embodiment of the system's Pebbling Language or, in other embodiments using non-traditional programming languages. Regardless of which programming language is used, it can be implemented as being interpreted by the system or compiled, with the explicit understanding of the system's implementers that an interpreted version would probably be easier to engineer, but that a compiled version would probably produce modules which execute faster. This editor has access to and makes use of previously-created objects such as Triggers and Variables which are in the same scope as the module being edited.

The Module Editor is a mouse-driven graphical user interface which implements an editor for creating pebbling state diagrams. It contains a gridded canvas 400 on which the programmer places different components in order to create a state diagram. The canvas has standard controls on the lower left corner such as a zoom slider 401 and a full-screen mode toggle 402.

In order to create pebbling state diagram components, the programmer uses the controls in floating edit menu 410. These controls include standard tools such as a grabber 411, which is used to grab and scroll the canvas using the mouse as well as a selection tool 412 which is used to select an existing component. This menu also includes an undo tool 413 for undoing the last action performed, and a redo tool 414 for undoing an undo.

Below those tools we find the tools for creating the components of the pebbling state diagram. The node creation tool 415 is used to place a generic pebbling node anywhere on the canvas. It has a dropdown menu which allows the programmer to first select a specific rather than a generic type of node to place. Next we find an edge creation tool 416 which is used to create a standard edge between two or more nodes. Its dropdown menu acts similarly to the one previously mentioned, and allows the programmer to create a specific type of edge rather than a generic one. Finally, below this we have a group creation tool 417, which is used to create a default group out of two or more nodes. It also has a dropdown menu, allowing the programmer to select a specific type of group to be created.

These three types of components—nodes, edges, and groups—constitute the main building blocks of a pebbling state diagram, and after they are created, their properties can be changed by using the edit tool 418. How these components function together in order to create a module will be described in greater detail below in FIG. 5.

The final tool in the edit menu is a template selector tool which allows the programmer to quickly and easily create useful common pebble state diagram patterns in order to save time.

The Module Editor's floating view menu 420 is used to change the view of the pebbling state diagram. For instance, 421 is the component list view, and clicking on it will open a dialog box which provides an interactive list of all of the existing components. Below that we have the grid view controls 422, which allow the programmer to toggle the grid on and off, change grid spacing, toggle snap-to-grid functionality, and so on. Next we find the layer tool 423, which is used to create and select layers in the editor so that the programmer can better organize the components being created. Each component has a z-order field, which can also be used for the purpose of hiding components within the layer tool's controls. Finally we have the image toggle tool 424, which is used to toggle Image Nodes to show and hide the images that they contain.

Figure 5:
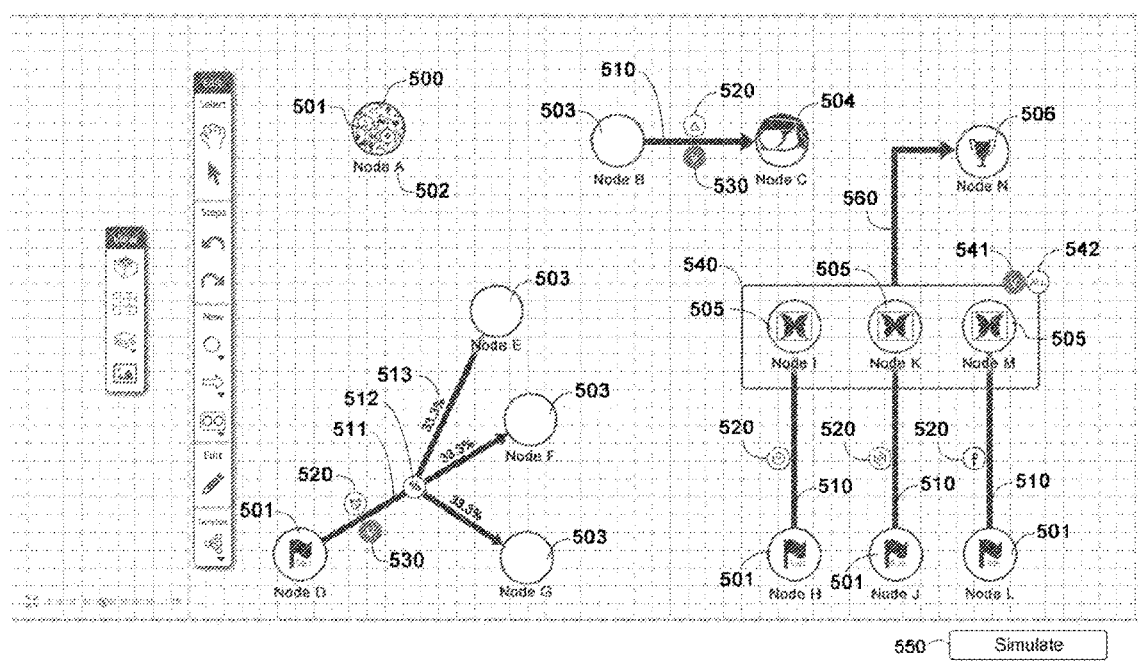
FIG. 5 is a representation of a display presenting the visual editor of FIG. 4, here showing creation of a state diagram of the module of FIG. 4.

FIG. 5 is a representation of a display presenting the visual editor of FIG. 4, here showing creation of a state diagram of the module of FIG. 4 with several components. For instance, in accordance with standard graph theory practice, nodes are shown as circles 500. There are many types of nodes, and they contain an icon 501 showing the node's type. In this instance, it is a Multi-Attribute Node with both start and image properties, which means that a pebble will be placed on it as soon as the program (module) is run, and that it contains an image which will be displayed in the end-user's device once that pebble is placed. Nodes can be given names, which appear below them 502. State Nodes 503, which do not perform any function other than to create intermediate states for holding pebbles, are another type of node. Similarly, System Trigger Nodes 504 fire a trigger when a pebble lands on them, and Image Nodes 505 display an image in the end-user's device when they are pebbled. When pebbled, prize Nodes 506 mint prizes for the end-user. There are many other types of nodes which will be described later.

Edges 510 constitute the second major class of components which make up pebbling state diagrams, and they form the paths along which pebbles may move from node to node. Edges always lead to at least one node, and their point of origin may be a node or a group. Edges may lead to more than one node, as is the case with edge 511, which splits into three. The split is based on a probability, which is illustrated by the icon 512 at its split point. When a pebble moves down this edge, it has a certain probability 513 of taking any one of the three paths. In addition to probability edges 511, the system also has other types of split edges, which will be described later.

Edges may have receivers 520 associated with them. Receivers capture the messages which are sent by triggers, and they contain icons indicating the type of trigger to which they are bound. A receiver capturing a message from a trigger is the impetus which causes a pebble to move across the edge with which it is associated. Receivers on edges are therefore the mechanism that ties the Pebbling Programming Language to the system's external triggers out in the real (as well as virtual) world, and they are what cause pebbles to move and to change in state. An edge may also have no receivers on it, in which case a pebble will simply move across that edge as soon as it arrives at the node constituting the edge's start point. Edges may also have variable conditions 530 associated with them. These allow the programmer to define additional conditions based on previously-created variables which must be satisfied before a pebble can move along that edge. So, for instance, it is possible for a receiver on an edge to capture a message from a trigger, but for the pebble at its start point not to move because the variable condition on that edge has not yet been met. Similarly, it is possible for a pebble to arrive at an edge without a receiver on it but not cross it since its variable condition has not yet been met.

The final type of component in this embodiment of the system's Pebbling Programming Language is a group 540. Groups contain two or more nodes, and can have two conditions on them. The first is the group condition 542, which defines how many nodes in the group must have pebbles on them in order for the group to be satisfied. In this case, the group condition is an "AND", which means that the group is satisfied only when all nodes in the group have pebbles on them. Other types of group conditions include "OR", which means that the group is satisfied when any one of the nodes in the group has a pebble on it, and yet another type of group condition is a threshold, in which, say, any two out of the three nodes would have to have pebbles on them in order to be satisfied. Other types of group conditions are described later. In addition to group conditions, groups can also have variable conditions 541 on them which perform the same function as variable conditions on edges 530, as well as edges leaving them 560.

Located at the bottom of the Pebbling State Editor screen is a button 550, which starts the system's Simulator.

Figure 6:
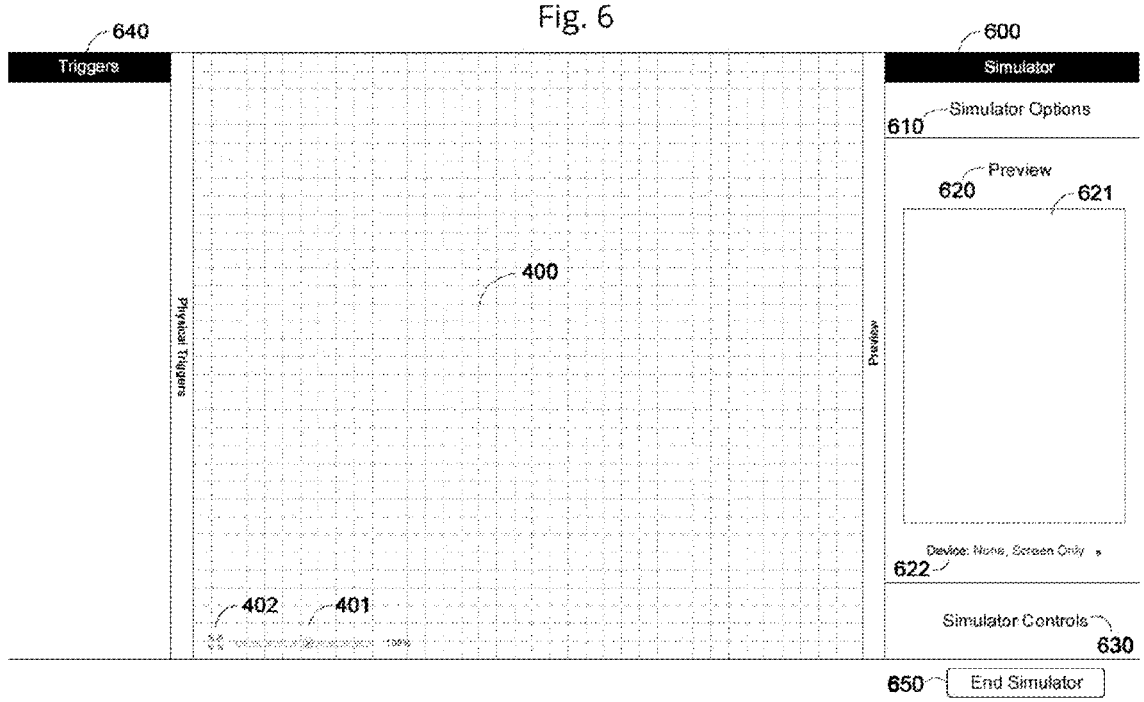
FIG. 6 is a representation of a display presenting a user interface (here, in blank), in accordance with an embodiment of the present invention, for a simulator for testing and running a module created using the editor of FIG. 4.

The Simulator's purpose is to provide the programmer with a means of running and testing a module that was created using the Pebbling Language. FIG. 6 is a representation of a display presenting a user interface (here, in blank), in accordance with an embodiment of the present invention, for a simulator for testing and running a module created using the editor of FIG. 4. In many ways, the Simulator resembles the Pebbling State Editor from FIGS. 4 and 5, and is divided into three panes. The center pane contains the same gridded canvas 400, as well as all pebbling state diagram components on that canvas in precisely the same configuration that they were arranged in the editor. It similarly contains zoom 401 and full-screen 402 controls.

The Simulator screen additionally contains two other panes. On the left is the Triggers pane 640 which provides an interactive list of all triggers which are associated with any receivers within the pebbling state diagram. The right-hand pane 600 contains the actual Simulator screen and controls. At the top are Simulator options 610 which allow the programmer to select a fake test user for this simulation and to perform all relevant actions on that end-user such as resetting the user's data, create another fake user, and so on. In the center of the Simulator pane we find the preview area 620, which is dedicated to providing a graphical software simulation of a device such as a mobile smart phone or tablet 621. This simulated screen will show the running module, and preview exactly what an end-user with a real device would see if the module were deployed in earnest. Below this we find a menu 622 for selecting from many different devices and screen resolutions so that the module can be tested exhaustively on all hardware that is relevant to the market at that time. Next, we find the actual Simulator controls 630, which allow the programmer to proceed through the computational steps of the module by resetting, stepping through, or stepping over the sequence of pebble movements relevant to the execution of the module, as is common in standard compilers. In addition, the Simulator allows the programmer to drag and drop pebbles to set up the state diagram in any desired configuration. Finally, the button in the bottom right-hand corner of the screen 650 lets the programmer end the simulation and return to the editor.

Figure 7:
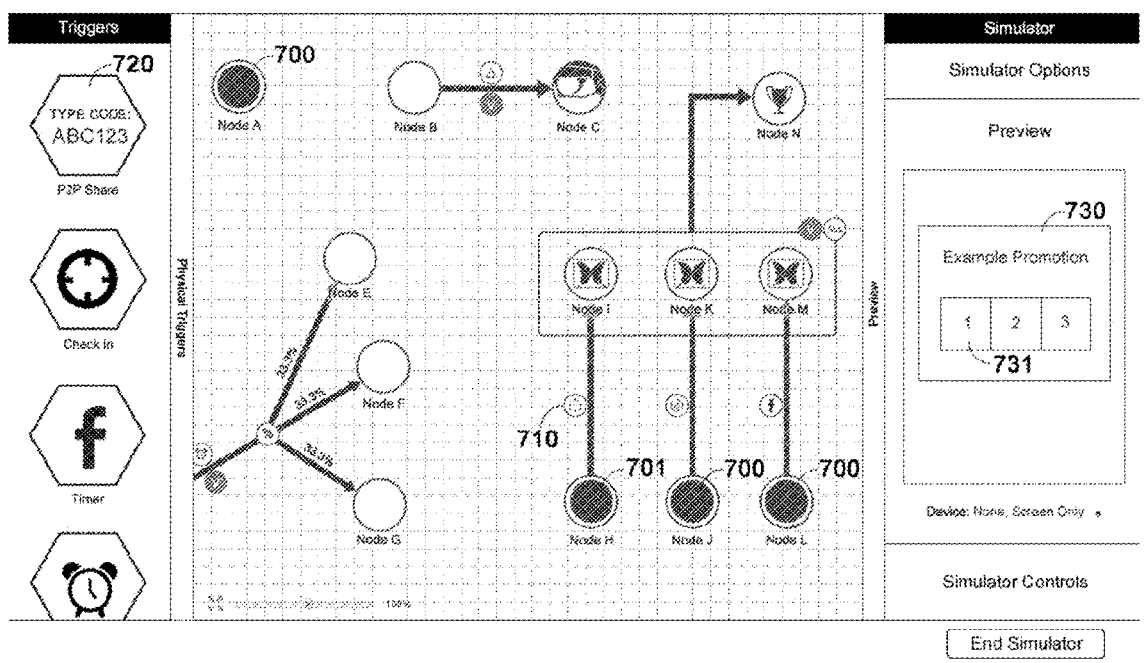
FIG. 7 is a representation of a display presenting the user interface of FIG. 6, wherein the Simulator is running a specific module, in a particular state, created using the system's editor.
Figure 8:
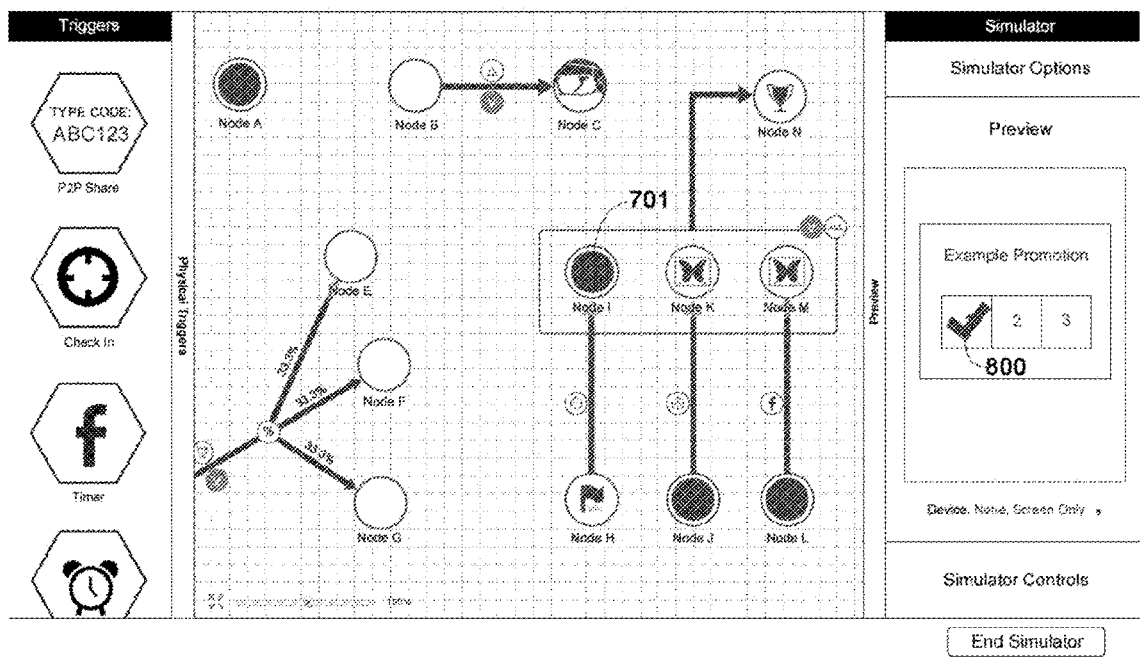
FIG. 8 is a representation of a display presenting the user interface of FIG. 6, wherein the system's Simulator is running the same module as in FIG. 7 except that it has progressed to a different state.

FIG. 7 is a representation of a display presenting the user interface of FIG. 6, wherein the Simulator is running a specific module, in a particular state, created using the system's editor, and FIG. 8 is a representation of a display presenting the user interface of FIG. 6, wherein the system's Simulator is running the same module as in FIG. 7 except that it has progressed to a different state. Since the middle pane of the Simulator is smaller than the editor canvas, part of the Pebbling State Diagram is cut off. The Simulator starts by placing a pebble 700, 701 onto each Start Node. If a pebble is on an Image Node, then that image will be displayed in the Simulator. Node A is both a Start Node as well as an Image Node, and it contains a "game board" graphic 730, which is displayed in the Simulator because pebble 700 is on it. The way this simple game works is that it requires the end-user to complete three actions (a codeword entry, a physical check-in, and a Facebook like), and for each action, the end-user will receive a check mark on his/her game board. These check marks will be displayed on the game board in the squares labeled "1", "2", and "3". These check mark graphics are respectively contained in Image Nodes I, K, and M. In order to test whether the module is working correctly, the programmer can simulate trigger events and then watch the Simulator to see if the desired graphical reaction has occurred, so for instance, he/she might want to make sure that the end-user will receive a check mark in square 731 for performing a codeword entry. This should happen if pebble 701 travels to node I, and the edge between them has the codeword receiver 710 on it which is associated with trigger 720. The programmer therefore clicks on trigger 720, which simulates that trigger event.

The results of this action are shown in FIG. 8. Pebble 701 has moved to node I, thereby causing check mark 800 to appear on the game board. The remaining components of the module are tested in a similar manner, with the programmer clicking on triggers, which in turn gives nodes the impetus to move. The programmer then views the Simulator to make sure that the desired result has occurred, therefore verify that it will also occur in the end-user's application.

Device User Interface

Ultimately, embodiments of the present invention, with their triggers and Pebbling Language, have one main purpose: To create applications that can be deployed to the devices of end-users. These may be stand-alone applications, or they can come in the form of utility programs that can be spliced into existing stand-alone applications using an API. We refer to these utility programs as "Splices".

We have already seen the system's Simulator, which allows programmers to test and debug their modules written using the system's Pebbling Language. In addition to the Simulator, the system provides another tool for debugging called the "Sandbox App". The Sandbox App is a native application which can run on an end-user's device. It is meant for debugging or demonstrating a module written using the system's Pebbling Language in the same type of environment that an end-user will use the application. Whereas the Simulator is a virtual device and has virtual triggers which are clicked using a mouse, the Sandbox App operates on a real device interacting with real triggers. For instance, the Sandbox App can run on a smart phone, and allow the end-user to interact with physical, real-world triggers. The system can therefore deploy modules written with its Pebbling Language to physical devices in three different ways: (1) Being run by the native Sandbox App, (2) as a stand-alone application, and (3) as a splice in an existing application.

Figure 9:
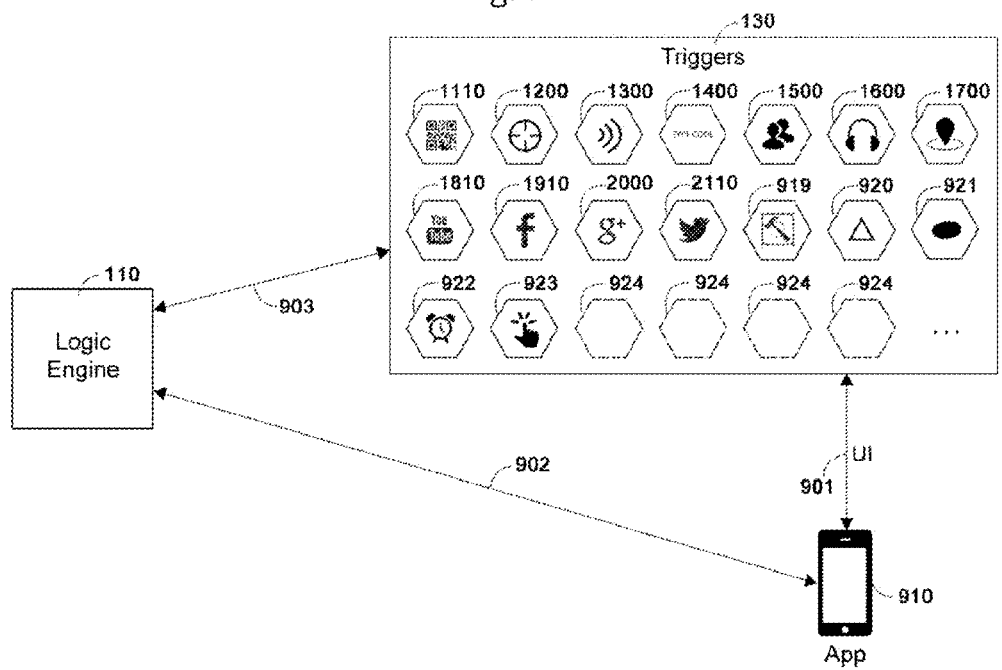
FIG. 9 is a diagram illustrating high-level communication architecture of an embodiment of the present invention, for use with an embodiment such as shown in FIG. 2, including a non-exhaustive list of the system's trigger types.

In all of these cases, the application contains functionality for interacting with triggers, and this ability is shown in FIG. 9, which is a diagram illustrating high-level communication architecture of an embodiment of the present invention, for use with an embodiment such as shown in FIG. 2, including a non-exhaustive list of the system's trigger types. The end-user's device 910 running an application created using the system interacts with triggers from trigger set 130 using a user interface 901, and that interaction is sent to the system's Logic Engine 110 via its event bus. This message contains all of the relevant information required to uniquely identify the trigger with which the end-user interacted. The Logic Engine receives this message and determines which module is listening for it. Once a relevant module has been identified, the Logic Engine 110 determines which edge or edges should receive it, and then causes the appropriate pebbles to move and module state to change. There are many different types of triggers, several of which are low-tech and have no Internet connectivity or ability to communicate directly with the Logic Engine. In these cases, the successful trigger interaction is reported back to the Logic Engine directly from the app 910 using channel 902, which is often over the Internet. In other cases, the trigger itself is sophisticated enough and has its own ability to report an interaction directly to the Logic Engine 110 over channel 903, also often over the Internet. In this description, the end-user's app has been running on a mobile device, but this example is not meant to be limiting, as this can just as easily have been a different device such as a desktop computer.

An important point of note is that the system is able to deploy an immensely diverse range of triggers. It is useful for all triggers to have some visual similarity to each other, and in this case they are shown as hexagons, although this is not strictly necessary.

Some of the triggers can be deployed through physical activity in the real world or in augmented reality or virtual reality. These "Physical Triggers" include, but are not limited to: (a) Vision triggers 1110, which are recognized using a device's camera, (b) Geo triggers 1200, which are recognized using a device's GPS, (c) NFC triggers 1300, which are recognized by a device's near-field communications sensors, d) Codeword triggers 1400, which are recognized when an end-user types a certain string into the device, (e) Peer-To-Peer triggers 1500, which are recognized when an end-user interacts with another end-user's device, (f) Sound Recognition triggers 1600, which are recognized by a device's microphone, (g) Proximity triggers 1700, which activate when an end-user comes within a specific range of a location, person, or other object, (h) augmented reality triggers, which are activated by real physical activity performed in relation to an augmented reality experience or game and (i) virtual reality triggers, which are activated by real physical activity performed in relation to a virtual reality experience or game. Triggers need not contain any high technology such as a CPU, and in some cases they are as simple as ink on paper.

The system can also deploy several "Third Party Triggers", which make it possible to integrate with existing social media platforms. These include, but are not limited to: (a) YouTube triggers 1810, which are recognized when an end-user watches a particular YouTube video, (b) Facebook triggers 1910, which are recognized when an end-user likes or follows a particular person, brand, or other entity on Facebook, (c) Google Plus triggers 2000, which are recognized when an end-user+1s, follows, or adds a particular person, brand, or other entity to a circle on the Google Plus platform, (d) Twitter triggers 2110, which are recognized when an end-user tweets a particular message or follows a particular person, brand, or other entity on Twitter, and (e) Custom API triggers 919. These are a particularly powerful type of trigger which consist of code that can be run anywhere such as a server, making it possible for any business to start sending trigger events to the system's Logic Engine. The system also supports an additional implementation of the system's custom triggers without the use of an API in that any Internet-connected device can send a trigger event to the present system using an HTTP POST message which encodes trigger information which uniquely identifies it, along with its data and parameters.

Finally, the Logic Engine 110 also contains several internal "System Triggers" which make it possible to send trigger events that are not a direct result of an end-user interaction. For example, these include, but are not limited to: (a) Variable Change triggers 920, which fire when the value of one or more variables change or reach specific thresholds, (b) Pebble-Initiated triggers 921, which fire when a pebble lands on a specific node, and (c) Timer triggers 922 which fire at a specific time. One type of system trigger that is a response to an end-user interaction is the In-App Click Trigger 923, which fires when an end-user interacts with a UI element in the app such as a button.

The trigger system is completely flexible and extensible, so that any future triggers 924 can be easily added without a great deal of effort. For instance, it would be a trivial matter to include virtual reality or augmented reality triggers in which an end-user's avatar, or the end-user him/herself can walk into a graphical representation of a trigger in a virtual world or augmented reality scene, and thereby cause it to fire. In one sense, because of their immense flexibility, the Custom API triggers can be used to implement any future trigger, although the system can also be upgraded to contain specific new types.

All of these diverse triggers create a universe around the Logic Engine. The Logic Engine is used to create and deploy modules as well as triggers, and then the triggers create the ecosystem in which those modules will be used. Because the triggers are heterogeneous, this is very powerful because they can be deployed in all genres of advertising. All types of triggers may have metadata associated with them indicating the geolocation or IP address from where they originated, information about the identity of the person or entity that fired the trigger, the time at which they were fired, and so on. When defining triggers, it is also possible to place restrictions upon them such as geographic areas in which they can or can't be fired, time windows inside (or outside) of which they can or can't be fired, and so on. These restrictions are useful for entities such as national brands, who only want triggers to be usable in a particular state or country or during certain hours to render them inoperable outside of those regions or times. The system can also have many other types of metadata and restrictions imposed on its triggers, and these examples are not meant to be limiting.

Figure 10:
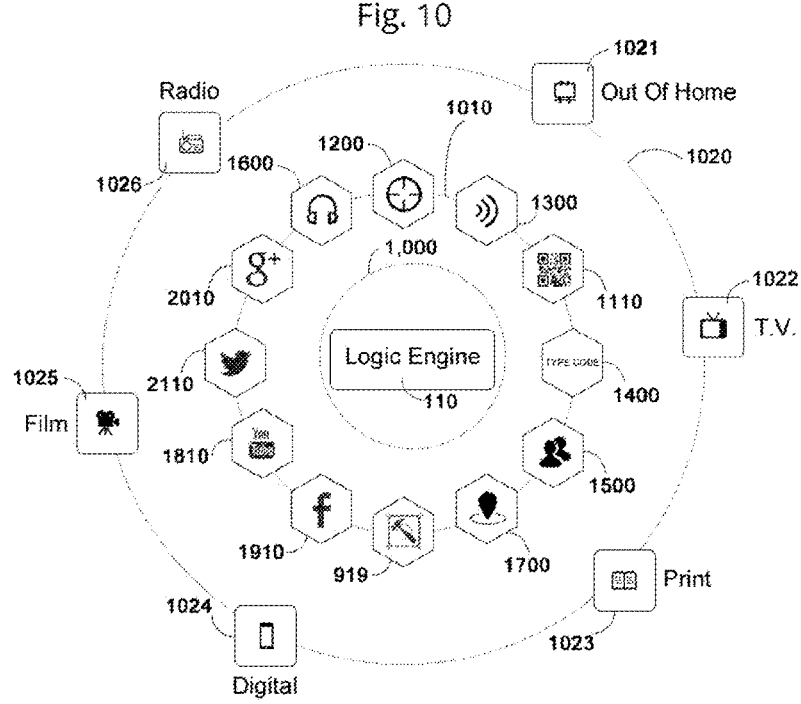
FIG. 10 is a diagram illustrating how the heterogeneous Trigger Network, of the embodiment of FIG. 9, allows it to integrate with existing heterogeneous ad networks.

FIG. 10 is a diagram illustrating how the heterogeneous Trigger Network, of the embodiment of FIG. 9, allows it to integrate with existing heterogeneous ad networks. At the center, we have the system 1000 including its Logic Engine 110. Around it on the image labeled 1010, we have an ecosystem of triggers. On the outermost ring 1020 are all of the heterogeneous ad network genres that marketers currently use to reach the public. This includes out-of-home advertising 1021 such as billboards and bus stops, television 1022, print advertising 1023, digital advertising 1024, film 1025, and radio 1026. Appropriate triggers can be embedded in compatible advertising in order to upgrade all traditional low-tech ad networks to become digitally interactive. Previously, the only thing tying together these siloed ad networks across a marketing campaign has been thematic, and there has been virtually no technology connecting them. By contrast, this system creates a layer of technology across all ad networks. In that sense, this system constitutes a marketing network which ties together all of the existing ad networks.

Figure 11:
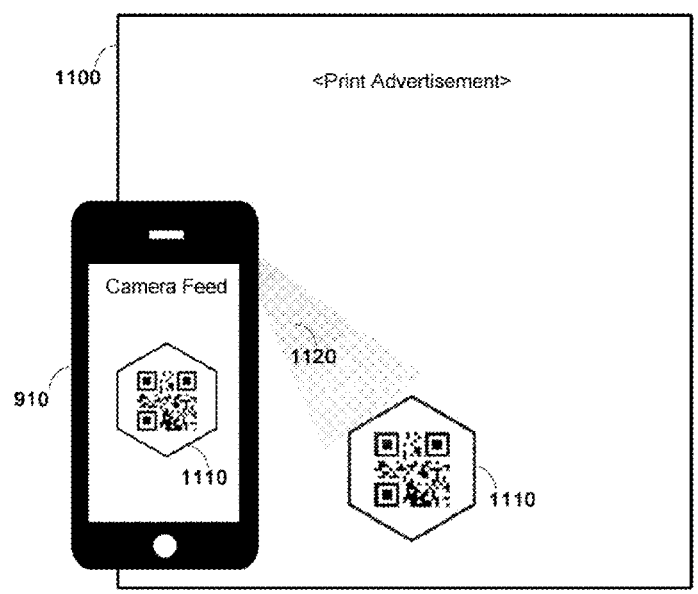
FIG. 11 is a diagram including a representation of a display presenting a mobile user interface, for use by an end-user, in accordance with an embodiment of the present invention, for interacting with a visual trigger that is also represented in the diagram.

Because they are heterogeneous, the various triggers require different end-user interface configurations and actions on the part of the end-user;

FIG. 11 is a diagram including a representation of a display presenting a mobile user interface, for use by an end-user, in accordance with an embodiment of the present invention, for interacting with a visual trigger that is also represented in the diagram. The end-user sees a print advertisement 1100 with a vision trigger 1110 on it. The end-user then launches the relevant app, and selects this type of trigger from a menu on his/her mobile device 910, which shows a feed from the device's camera. The end-user aligns the vision trigger shown in the camera feed with the center of the device's screen, at which point it automatically takes a picture 1120, and sends the appropriate message along the system's event bus to report that the trigger has been fired. This will cause changes such as pebble movement in the Logic Engine, and any resulting graphical changes in the module will be shown on the end-user's screen. It is important to note that a vision trigger is not limited to QR codes, but rather can also make use of any type of image that can be uniquely identified by computer vision technology.

Figure 12:
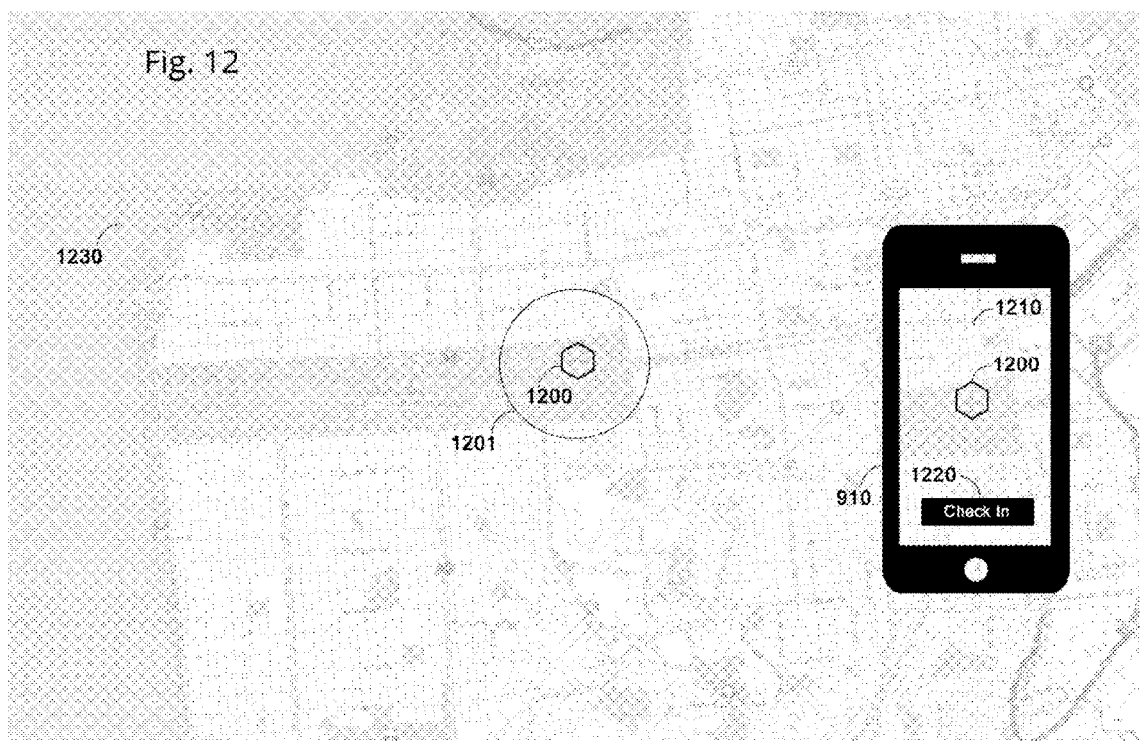
FIG. 12 is a diagram including a representation of a display presenting a mobile user interface, for use by an end-user, in accordance with an embodiment of the present invention, for interacting with a geo-location trigger that is also represented in the diagram.

FIG. 12 is a diagram including a representation of a display presenting a mobile user interface, for use by an end-user, in accordance with an embodiment of the present invention, for interacting with a geo-location trigger that is also represented in the diagram. In the system's user interface for creating triggers, a programmer creates a geo trigger 1200 with radius 1201 on a map 1230. The end-user of this module uses his/her device 910, launches the appropriate app, and selects the geo trigger type from a menu. This shows a map 1210 to the end-user and points out where nearby triggers such as trigger 1200 can be located. Using the interactive map as a guide, the end-user then physically visits the location of this trigger, and once he/she is within radius 1201, a button 1220 becomes visible or usable, allowing the end-user to interact with this trigger. This sends an event along the system's event bus to its Logic Engine, which responds as before.

Figure 13:
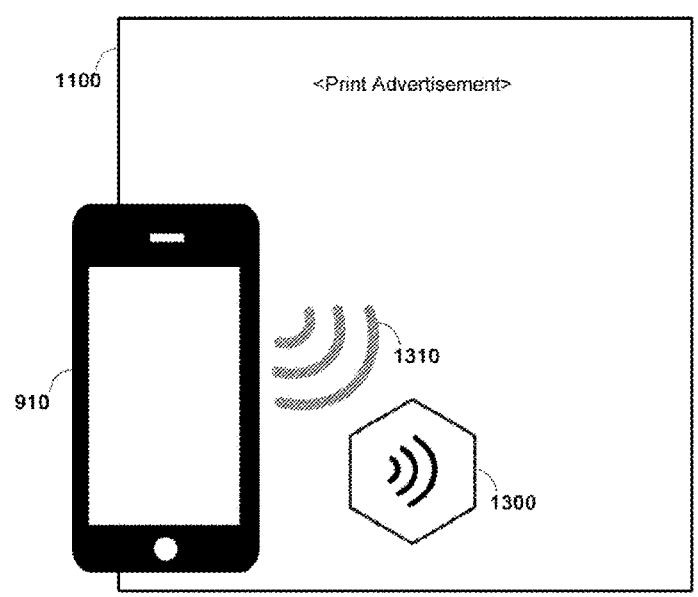
FIG. 13 is a diagram including a representation of a mobile user interface, for use by an end-user, in accordance with an embodiment of the present invention, for interacting with a near-field communication (NFC) trigger.

FIG. 13 is a diagram including a representation of a mobile user interface, for use by an end-user, in accordance with an embodiment of the present invention, for interacting with a near-field communication (NFC) trigger. The end-user sees a print advertisement 1100, possibly on a wall or in a bus shelter with an NFC trigger 1300 on it. On the opposite side of the poster, hidden from view, is an NFC tag that has been programmed with the relevant data to enable the trigger. The end-user brings his/her NFC-enabled device 910 close enough to the trigger/tag, at which point an NFC burst transmission 1310, occurs, sending the data from the tag to the device, which then relays it via the system's event bus to the Logic Engine. The system then responds as before.

Figure 14:
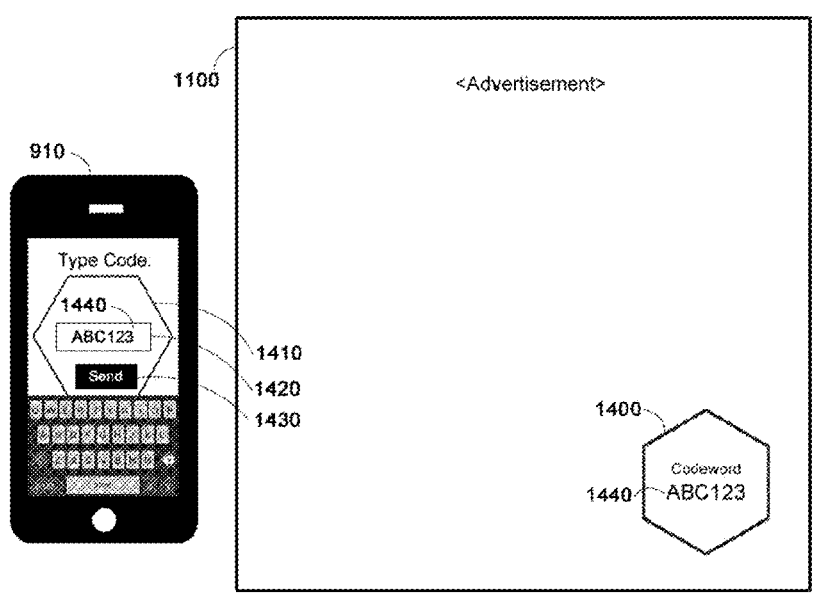
FIG. 14 is a diagram including a representation of a display presenting a mobile user interface, for use by an end-user, in accordance with an embodiment of the present invention, for interacting with a codeword trigger.

FIG. 14 is a diagram including a representation of a display presenting a mobile user interface, for use by an end-user, in accordance with an embodiment of the present invention, for interacting with a codeword trigger. The end-user sees an advertisement 1100 containing a codeword trigger 1400, which itself contains codeword 1440. The end-user launches the appropriate app on his/her device 910, selects the codeword trigger interface 1410, types codeword 1440 into text field 1420, and then presses button 1430. This sends the appropriate trigger event along the system's event bus to its Logic Engine, which responds appropriately.

Figure 15:
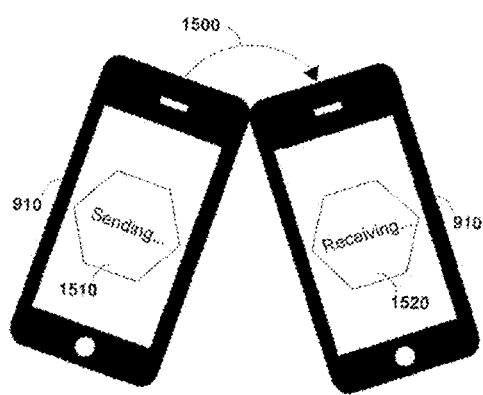
FIG. 15 is a diagram including a representation of a display presenting a mobile user interface, for use by an end-user, in accordance with an embodiment of the present invention, for interacting with a peer-to-peer (P2P) trigger.

FIG. 15 is a diagram including a representation of a display presenting a mobile user interface, for use by an end-user, in accordance with an embodiment of the present invention, for interacting with a peer-to-peer (P2P) trigger, which is initiated by having two or more end-users, each with a device 910. One end-user launches the relevant app and selects to initiate a peer-to-peer share from the menu. The remaining end-user or end-users also launch their copies of the app on their devices, and select to receive a peer-to-peer share from the menu. The end-users then perform a specific action 1500 (if required) while standing together. This can be implemented in many ways, such as bumping devices (which uses the devices' accelerometers), an NFC tap (using the devices' NFC sensors), geo-location (using the devices' GPS facilities), Bluetooth (which has a range of at least 32 feet), or any other reasonable means of assuring that phones are co-located. This action sends one (or more, if there are more people) peer-to-peer trigger events along the system's event bus to its Logic Engine, which responds appropriately.

Figure 16:
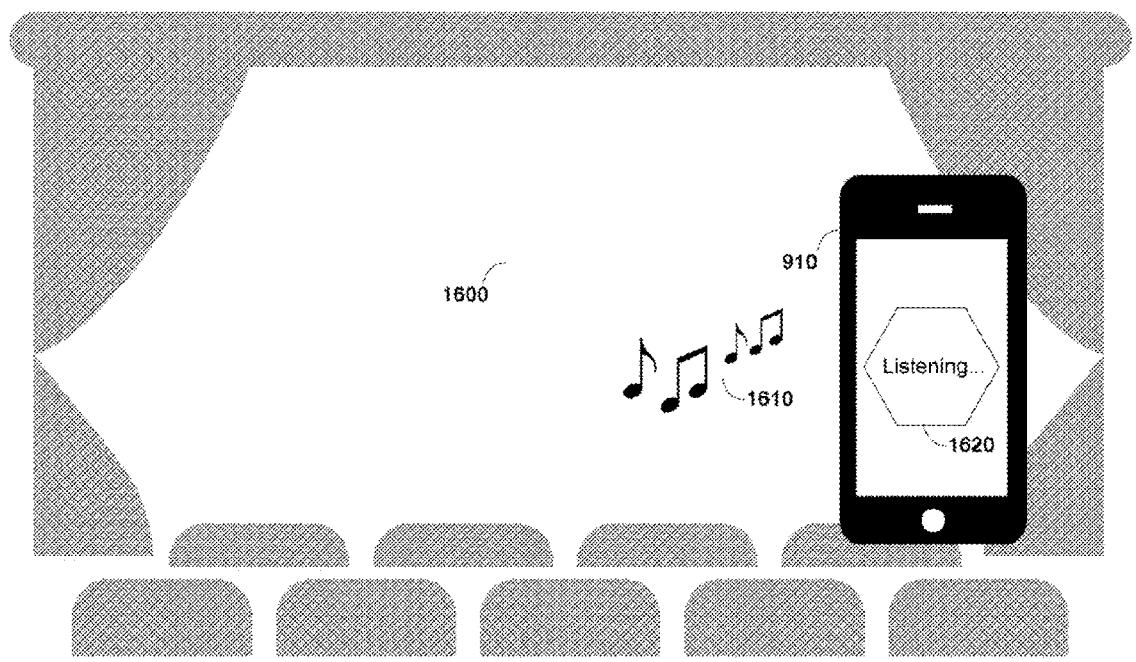
FIG. 16 is a diagram including a representation of a display presenting a mobile user interface, for use by an end-user, in accordance with an embodiment of the present invention, for interacting with a sound recognition trigger.

FIG. 16 is a diagram including a representation of a display presenting a mobile user interface, for use by an end-user, in accordance with an embodiment of the present invention, for interacting with a sound recognition trigger. The end-user hears an advertisement on television, in a movie, on the radio, or from some other source indicating that a sound trigger is present. The end-user then launches the appropriate app on his/her device 910, and selects sound recognition from the menu. The app then shows a screen 1620 indicating that it is listening. It records and analyzes the sound 1610 that is coming from the advertisement. This sound may be in the audible, sub-audible, or even super-audible range. The end-user's application sends the appropriate trigger event along the system's event bus to its Logic Engine, which responds appropriately.

Figure 17:
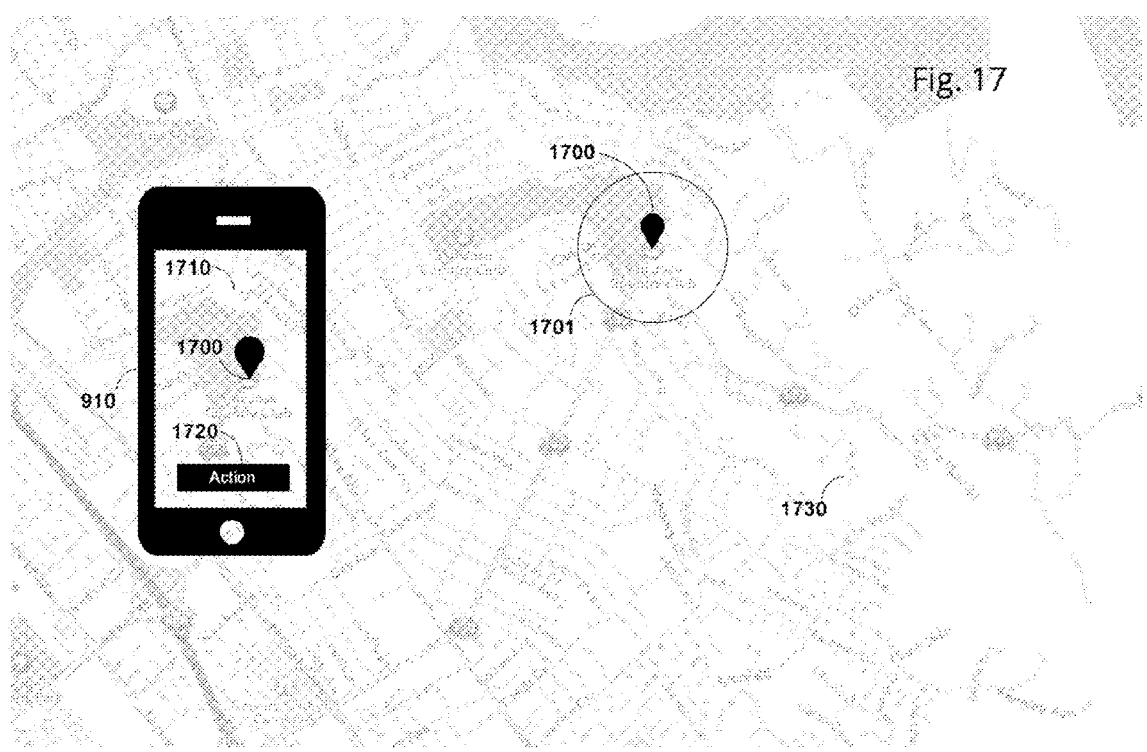
FIG. 17 is a diagram including a representation of a display presenting a mobile user interface, for use by an end-user, in accordance with an embodiment of the present invention, for reporting interaction with a proximity trigger.

FIG. 17 is a diagram including a representation of a display presenting a mobile user interface, for use by an end-user, in accordance with an embodiment of the present invention, for reporting interaction with a proximity trigger. Proximity triggers are similar to geo-location triggers, except that the actual point of interaction isn't necessarily stationary, since it can be centered on a device, including those of other end-users. As with the geo-location trigger, a programmer creates a proximity trigger using the system's trigger editor, in which he/she selects a location 1700 on a map 1730, or a device on which the proximity location will be centered. In the case of the proximity trigger being located on a device, this allows the programmer to create "hot potato"-type games where end-users are shown on the map, and a game token changes hands when an end-user comes too close to an "infected" player. In either case, the programmer defines the radius 1701 around the proximity trigger. In order to see a proximity trigger, an end-user loads an appropriate app on device 910 and uses the appropriate in-app buttons and navigation to find the proximity screen 1710 which shows a map together with one or more proximity triggers. This trigger may fire automatically when the end-user steps within the radius 1701, or it may require an action, such as button 1720 to occur. Once the trigger is fired, an appropriate event is sent along the system's event bus to its Logic Engine, which responds appropriately.

Figure 18:
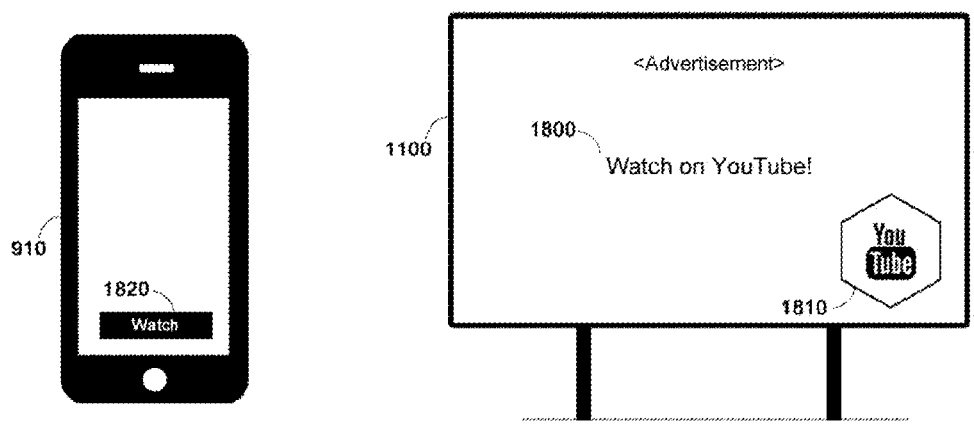
FIG. 18 is a diagram including a representation of a display presenting a mobile user interface, for use by an end-user, in accordance with an embodiment of the present invention, for interacting with a YouTube trigger.
Figure 19:
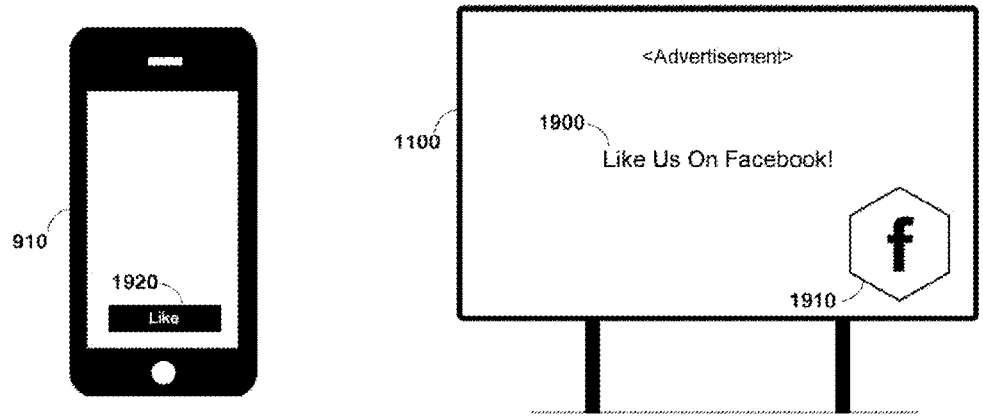
FIG. 19 is a diagram including a representation of a display presenting a mobile user interface, for use by an end-user, in accordance with an embodiment of the present invention, for interacting with a Facebook trigger.
Figure 21:
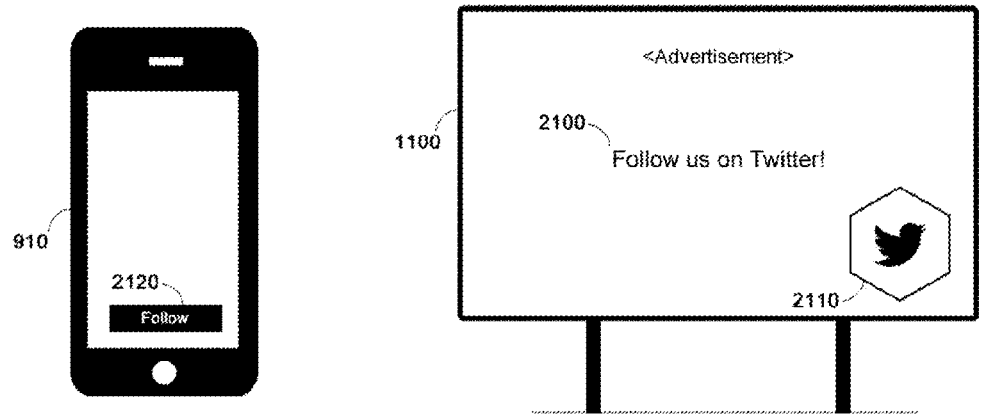
FIG. 21 is a diagram including a representation of a display presenting a mobile user interface, for use by an end-user, in accordance with an embodiment of the present invention, for interacting with a Twitter trigger.

The next group of triggers is important because they allow the present system to be integrated with existing social media channels. We shall use YouTube, Facebook, Google Plus, and Twitter as examples, but these by no means constitute an exhaustive list of compatible third parties. The purpose of these triggers is for them to be fired when an end-user interacts with these third party services in the regular way. The end-user experience for interacting with these third-parties is illustrated in FIGS. 18, 19, 20, and 21, and the pattern in all cases is very similar. FIG. 18 is a diagram including a representation of a display presenting a mobile user interface, for use by an end-user, in accordance with an embodiment of the present invention, for interacting with a YouTube trigger. FIG. 19 is a diagram including a representation of a display presenting a mobile user interface, for use by an end-user, in accordance with an embodiment of the present invention, for interacting with a Facebook trigger. FIG. 20 is a diagram including a representation of a display presenting a mobile user interface, for use by an end-user, in accordance with an embodiment of the present invention, for interacting with a Google+ trigger, and FIG. 21 is a diagram including a representation of a display presenting a mobile user interface, for use by an end-user, in accordance with an embodiment of the present invention, for interacting with a Twitter trigger. For instance, an end-user may see an advertisement 1100 in the real world, online, or in an app which contains a third party trigger 1810, 1910, 2010, 2110, together with a call to action 1800, 1900, 2000, 2100 that explains to the end-user what the advertiser would like him/her to do. In the case of YouTube, this might be to get the end-user to watch an online video. For Facebook, this might be to get the end-user to Like or follow the advertiser on that platform. For Google Plus, this might be to get the end-user to +1, follow, or add the advertiser to a circle. Finally, for Twitter, this might be to get the end-user to follow the advertiser or tweet a message containing a specific phrase or hashtag. In all of these cases, the end-user uses his/her mobile device 910 to interact with the relevant social media platform, which can happen in two major ways. The first way is through the advertiser's app, which contains the present system's API and functionality. The end-user performs the required action 1820, 1920, 2020, 2120 in this app, which fires the corresponding third-party trigger, sending an appropriate event along the system's event bus to its Logic Engine, which responds as before.

Alternatively, this action can be performed in the relevant social media company's app or website, in which case the present system must know that a specific end-user performed that specific action, and then make sure that the correct end-user receives the benefit of the ensuing trigger event. The system can identify the end-user in question because the end-user has previously entered his/her identifying information or credentials from the relevant social media platform into his/her instance of the advertiser's application. The system then learns that the end-user has performed the desired action, and this can be done in three ways: 1) By implementing an API from the social media platform which specifically performs this service, 2) By working with the social media platform to implement an API from the present system on their end which performs this service, or 3) (When appropriate) by using other means such as monitoring social media channels or otherwise "scraping" Internet data and firing the appropriate event when the desired end-user has performed the desired action.

Figure 22:
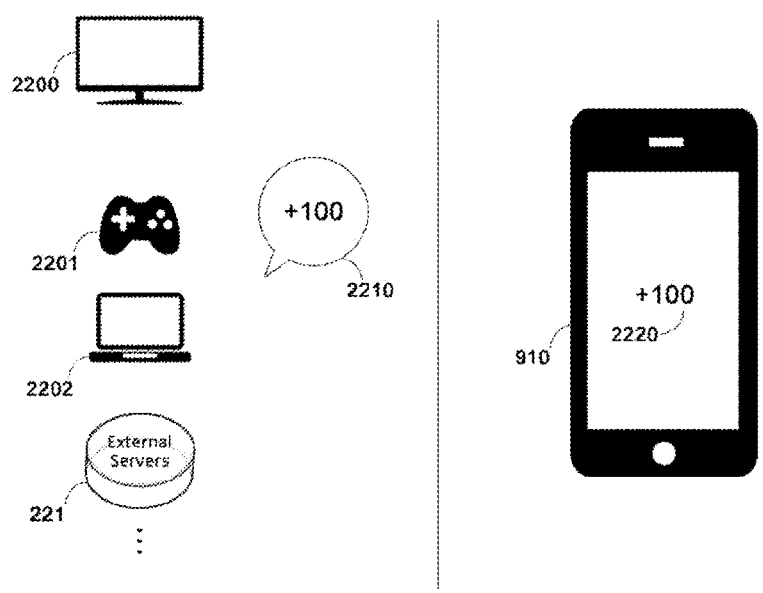
FIG. 22 is a diagram including a representation of a display presenting a mobile user interface, for use by an end-user, in accordance with an embodiment of the present invention, for reporting interaction with a custom API or custom HTTP POST trigger.

FIG. 22 is a diagram including a representation of a display presenting a mobile user interface, for use by an end-user, in accordance with an embodiment of the present invention, for reporting interaction with a custom API or custom HTTP POST trigger. This aspect is possibly the system's most flexible and powerful type of trigger, and it is so flexible, powerful, and versatile because it is a piece of code that can be placed on any machine, including a brand's server 221, a smart T.V. 2200, a video game console 2201, a hotel or airline reservation system, any web page, or any other computer or device which is connected to the Internet 2202. This trigger's purpose is to generate events from any arbitrary third party system, which can then travel to the system's Logic Engine and provide an input to a module created using the present system. In some cases, these triggers are not fired in direct response to an end-user's action, but rather to some other occurrence, such as the weather changing or a sports team winning a game. However, in other cases, such as the one depicted in FIG. 22, the trigger is fired in direct response to what the end-user is doing. For instance, an end-user may be using a device such as a smart television 2200, a game console 2201, website, or computer game 2202 which has implemented the present system's custom API or custom HTTP POST trigger. The end-user has provided his credentials to this device as well as an application programmed using an embodiment of the system's Pebbling Language running on device 910, therefore allowing the system to conclude that it is the same end-user using both. The end-user interacts with a device and performs some action or achieves some goal which fires a trigger. This device may report 2210 that this action has been noted, for instance by indicating that he/she has received 100 points from the brand that created the application running on device 910. The end-user's phone then buzzes, and the brand's application reports 2220 that he/she has earned 100 points. This cross-pollination between systems forms the basis for sponsorship of normal activities, such as a brand sponsoring a video game player for playing games, and receiving rewards when certain achievements are attained. It also provides the basis for second-screen advertising, rewards, and loyalty programs in an unobtrusive way which doesn't interrupt the end-user's activity on his/her primary screen.

FIGS. 9-22 illustrated the device end-user interfaces for interacting with the system's many types of triggers. It is important to note that these triggers are simply examples, and the system's architecture is fully extensible, allowing for more triggers to be easily added, and in all cases, these trigger interfaces reflect the end-user experience in the system's Sandbox App, as well as any standalone app or splice created using the system.

Figure 23:
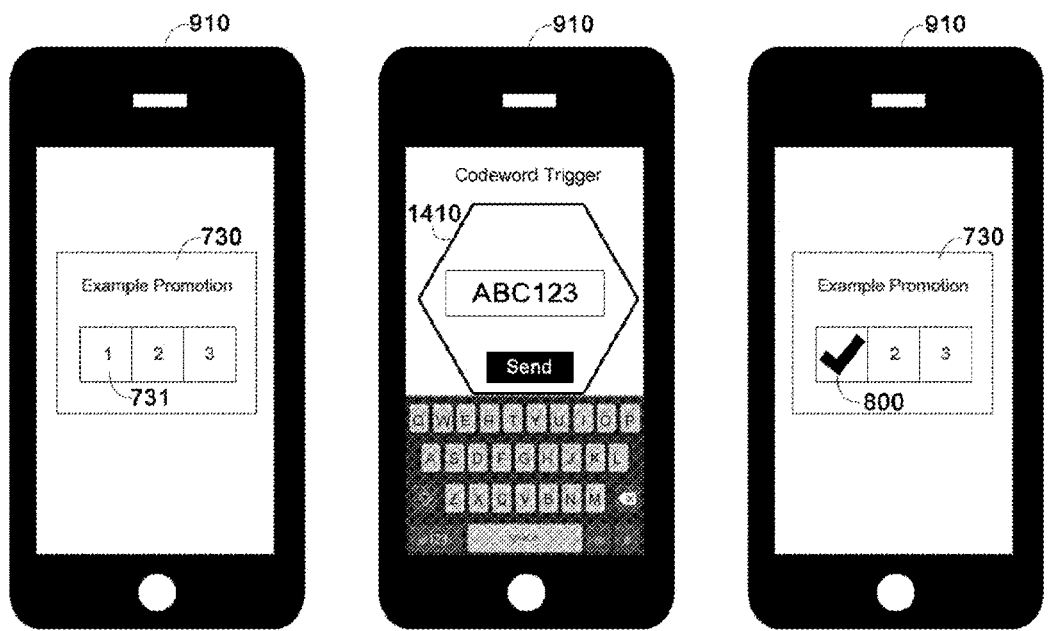
FIG. 23 is a diagram including representations of displays presenting mobile user interfaces, for use by an end-user, but showing such representations as a result of running the module of FIGS. 6 and 7 in a sandbox application, as a stand-alone application, or as a splice in accordance with an embodiment of the present invention, wherein the module's output display is identical to that from the Simulator.

However, trigger interfaces are only one type of screen that the system can create and deploy to different devices. Another important type of screen that can be created and deployed is the pebbling module screen. A pebbling module screen's purpose is to allow an end-user to interact with a module created using the system's Pebbling Language within an application that has been deployed to the end-user's device. FIG. 23 is a diagram including representations of displays presenting mobile user interfaces, for use by an end-user, but showing such representations as a result of running the module of FIGS. 6 and 7 in a sandbox application, as a stand-alone application, or as a splice in accordance with an embodiment of the present invention, wherein the module's output display is identical to that from the Simulator. At the start of the interaction in FIG. 23, the game board 730 does not have a check mark on square 731. The end-user then interacts with codeword trigger 1410, types in the code "ABC123" and hits the "Send" button. This is analogous to clicking on corresponding trigger 720 in FIG. 7, except that in this case, the trigger event is real and not in the Simulator. This trigger event causes the relevant pebbles to move within the Logic Engine, and in FIG. 23 we see that the check mark 800 has appeared, just as in the Simulator of FIG. 8. Note that even when the module has been deployed to a real hardware device as in this case, the programmer can still watch the pebbles moving in the system's Simulator in real time as the device's end-users interact with triggers.

Figure 24:
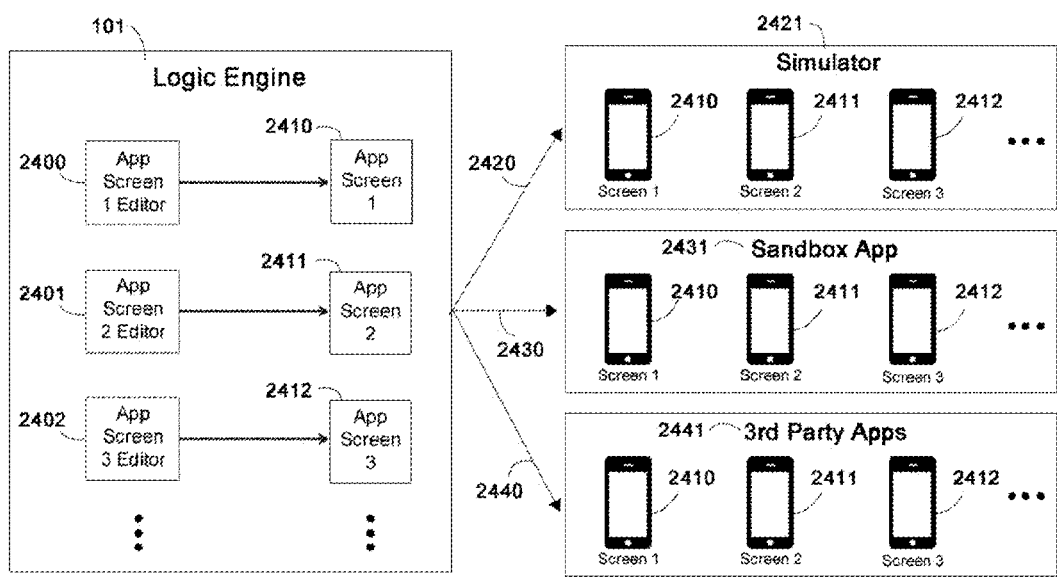
FIG. 24 is a diagram illustrating testing and development options available to a a brand representative in accordance with an embodiment of the present invention.

In addition to trigger interface and pebbling module screens, which themselves can be easily skinned and otherwise customized, the system also provides facilities such as user interfaces and wizards for easily creating many other types of customizable application screens, thereby greatly reducing the amount of time and effort required to create a useful application. These application screens are grouped together and comprise an application by defining them as well as how to navigate between them in the system's web-based editors. This allows a programmer to create a fully-functional application (or several screens to be inserted as a splice into a fully-functional application) without any advanced formal programming skills, and almost entirely using the present system. Once an application is thus defined, it can be deployed to the Simulator, the Sandbox App, as a splice, or as a stand-alone application. These steps are shown in FIG. 24, which is a diagram illustrating testing and development options available to a brand representative in accordance with an embodiment of the present invention. The programmer uses the system's web-based or stand-alone graphical user interface to create objects that are stored and processed by the system's Logic Engine 101. As we saw in FIG. 3, this includes modules, triggers, and variables, and in FIG. 24 we expand this list to include app screens and applications. The system has many pre-defined screens, each with an editor and/or wizard 2400, 2401, 2402 to aid in its creation. The programmer uses these editors to respectively create app screens 2410, 2411, 2412, and then uses another editor/wizard to combine them into an app. App screen editors can be used to create trigger interfaces, pebbling module screens, and many other types of custom screens which can be customized with different colors, background graphics, text, fonts, and so on. With this system it is possible to create applications that don't contain a module written in the system's Pebbling Language or any other language serving the same purpose, but the most powerful and useful applications that it builds will almost certainly contain pebbling module screens so as to surface these powerful custom programs to end-users.

Once an application has been created, it can be deployed along one of three paths: (1) Along path 2420 to the system's Simulator 2421, which will allow the programmer to access and debug the module's screens and triggers, (2) Along path 2430 to the system's Sandbox App 2431, which will allow the programmer to access, debug, and demonstrate the module's screens on a real hardware device and interact with real triggers, and 3) Along path 2440 as a stand-alone application or application splice which has been included in a $3^{rd}$ party app via the system's splice API; this is the system's way of launching a module in earnest once it is ready for production. Note that modules created using the Logic Engine's Pebbling Language editor are simply software that can be deployed to any device or Simulator that can run them.

Figure 25:
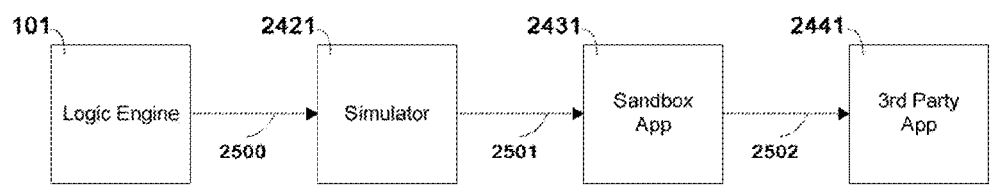
FIG. 25 is a flow diagram illustrating a typical order of testing and development through which a brand representative develops a module for use in an embodiment of the present invention.

These different ways of debugging, testing, demonstrating, and deploying an application built using its interface forms a natural "development pipeline", and is shown in FIG. 25, which is a flow diagram illustrating a typical order of testing and development through which a brand representative develops a module for use in an embodiment of the present invention. First, an application is created in Logic Engine 101. Once it is ready to be tested, the user deploys it 2500 to the Simulator 2421, where it is tested and debugged. Once it is ready to be tested on real hardware with real triggers, it is deployed 2501 to the Sandbox App 2431. Finally, after its programmers and testers are confident that it is ready for production, it is launched 2502 as a standalone application or as a splice in a 3$^{rd}$ party app 2441.

Pebbling Language Details

FIGS. 4-8 illustrated the programmer's user experience surrounding the use of the system's State Diagram Editor and Simulator, as well as the fundamentals of how the system's Pebbling Language works. However, it only showed a limited number of language elements, so the purpose of this section is to describe the Pebbling Language in more detail, through FIGS. 26-30, described below.

Figure 26:
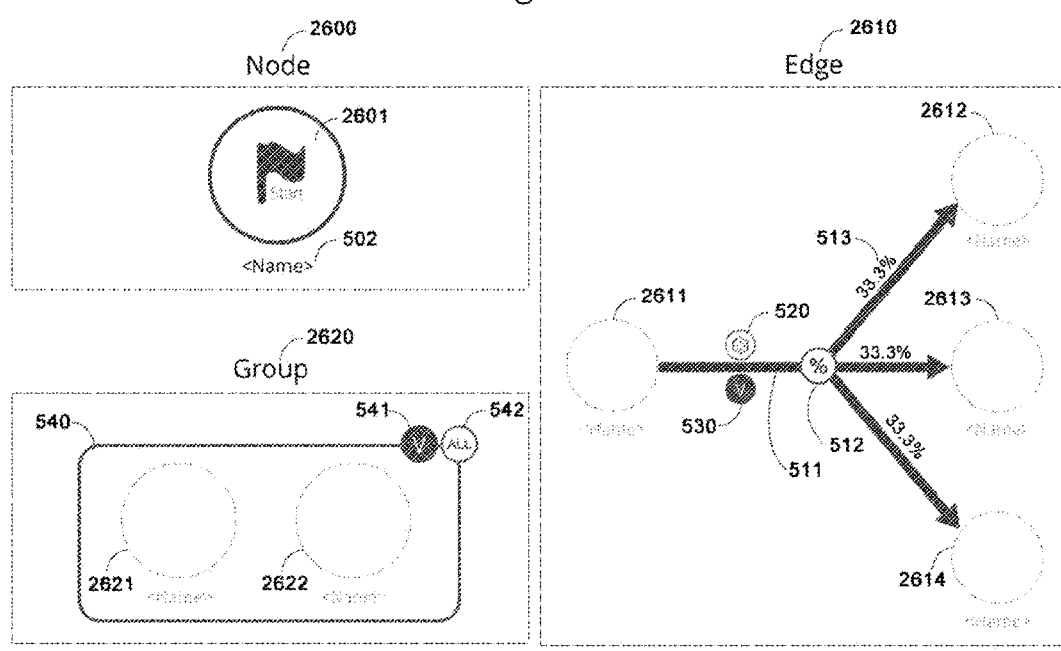
FIG. 26 is a diagram illustrating the main components of what we term "Pebbling Language", namely nodes, edges, and groups, used in writing source code that defines the module of FIGS. 7 and 8, in accordance with an embodiment of the present invention.

FIG. 26 is a diagram illustrating the main components of what we term "Pebbling Language", namely nodes, edges, and groups, used in writing source code that defines the module of FIGS. 7 and 8, in accordance with an embodiment of the present invention. The Pebbling Language components include nodes 2600, edges 2610, and groups 2620. Nodes 2601 are circular and contain an icon inside depicting the node's type. The language's many node types are described below and illustrated in FIG. 27, which is a diagram showing a non-exhaustive compilation of the Pebbling Language's node types, in accordance with an embodiment of the present invention. Nodes can be given names 502 which are displayed below them.

Edges 511 connect one node 2611 to one or more nodes and constitute the paths over which pebbles may move. In this case, the edge is a split edge which leads to nodes 2612, 2613, and 2614. Alternatively, instead of starting at a node, an edge's start point may be a group. If an edge leads to more than one node, it can have a type 512 which is located at the split point and shown as an icon in a circle. These edge types are described in more detail below and shown in FIG. 28, which is a diagram showing a non-exhaustive compilation of the Pebbling Language's edge types, in accordance with an embodiment of the present invention. In this case it is a probability edge, with the chances of the node traveling along any one fork in the edge shown as probabilities 513. In addition, edges can have trigger receivers 520 and can also have variable conditions 530 on them, both of which are round. The trigger receivers have icons in them indicating the type of trigger with which they are associated. An edge does not need to have a receiver nor a variable condition on it. If both are present, then the variable condition must be satisfied when a trigger is received in order for a pebble to move. If the variable condition is not satisfied and the trigger is received, then the pebble on node 2611 does not move but rather must wait for another trigger to be received. If both the receiver and variable condition are absent, then any pebble which arrives on node 2611 will immediately move. If only the receiver is present, then the pebble will move as soon as a trigger is received, and finally, if only the variable condition is present, then the pebble will move as soon as that condition is satisfied.

Figure 30:
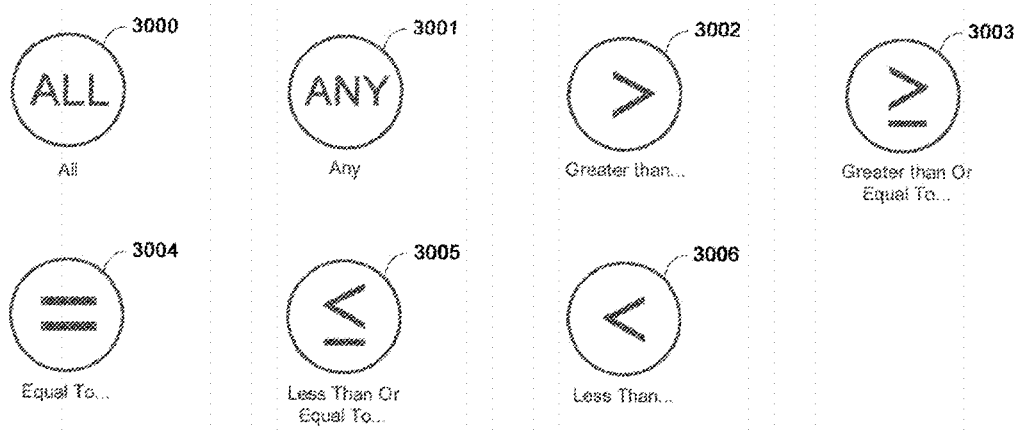
FIG. 30 is a diagram showing a non-exhaustive compilation of the Pebbling Language's group types, in accordance with an embodiment of the present invention.

Groups 540 contain two or more nodes 2621, 2622. Like edges, groups have types 542 as well as variable conditions 541, which are both also shown as circles. Like edges, the variable condition on a group is optional. A group's purpose is to create a group of nodes in which one or more must be pebbled according to the group's type in order for that group to be satisfied. A group's possible types are illustrated in FIG. 30 and described below. A group has one or more edges leaving it, and when a group is satisfied, then the pebble(s) in the group are ready to move along these edges to their destination nodes. In that sense, groups act very much like nodes. Any edge leaving a group may have a receiver and/or variable condition on it, but the group itself may also have a variable condition on it adding further constraints, and a group is not satisfied until both its main type condition as well as its variable condition are satisfied. If either of these is not the case, then pebbles will not move from the group.

Both nodes as well as groups can be set to retain their pebbles or not. If they retain their pebbles, then instead of moving, any pebble on them is first duplicated, and the duplicate is then moved. Otherwise, the pebbles themselves move without duplication, leaving the nodes that they came from empty, without pebbles on them.

Figure 27:
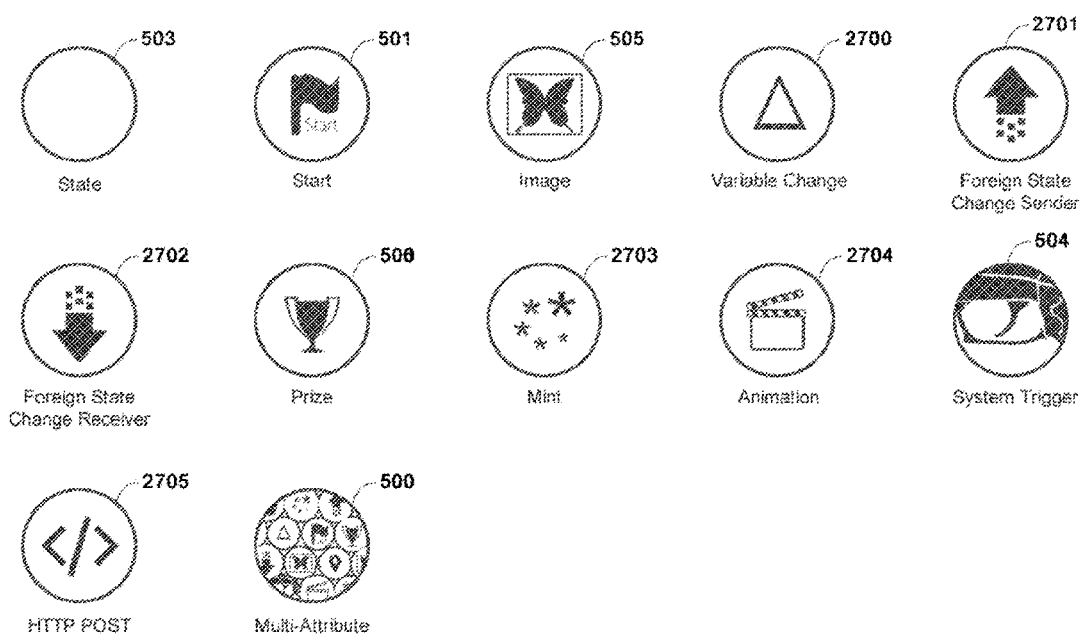
FIG. 27 is a diagram showing a non-exhaustive compilation of the Pebbling Language's node types, in accordance with an embodiment of the present invention.

FIG. 27 illustrates some examples of an embodiment of the system's Pebbling Language's many node types, all of which serve different functions. We have already seen nodes 503, 501, and 505, which respectively are State Nodes, Start Nodes, and Image Nodes. State nodes serve no functional purpose other than to provide intermediate places for pebbles to sit during a computation. Start nodes are where pebbles are placed when a module starts. Image nodes display an image in a pebbling module container screen when they are pebbled.

By contrast, variable change nodes 2700 act very differently by changing the value of a variable when a pebble arrives on it. Once the variable has been changed, the pebble can be deleted. Variables are one mechanism by which programs (modules) can communicate with each other, since many programs (modules) (depending on scope) can access the same variables. Images 2701 and 2702 respectively depict foreign state change senders and receiver nodes, and comprise another mechanism for programs (modules) being able to communicate with each other. For instance, a foreign state change sender node may be placed in module A, and a foreign state change receiver may be placed in module B, after which they are paired. These act as pebble teleporters in the following way: When a pebble arrives on the foreign state change sender node in module A, it is immediately teleported to the corresponding foreign state change receiver node in B.

Images 506 and 2703 respectively depict prize and Minting Nodes, and these can be used to issue awards to an end-user. When a pebble arrives on a Prize Node, it creates an award such as a coupon, digital song, game, or other digital entity which is issued to the end-user, whereas Minting Nodes create a new module for the end-user. Pebbles on these nodes can be deleted once they have performed their actions.

Animation nodes 2704 play an animation when pebbles arrive on them, after which these pebbles can be deleted.

System trigger nodes 504 fire an internal system trigger when pebbles arrive on them, after which these pebbles can be deleted.

HTTP POST nodes 2705 send an HTTP POST message with desired parameters to an external source such as a server or other Internet-connected device when pebbles arrive on them, and again these pebbles can be deleted after this message has been sent. This type of node provides the system with the ability to perform general output communications and send instructions or data to any device on the Internet, and is therefore very powerful.

Finally, Multi-Attribute Nodes 500 are nodes which combine the powers of two or more of the previous nodes.

These node types are just examples of possible types that can be included in the system's Pebbling Language and are not meant to constitute a complete list.

Figure 28:
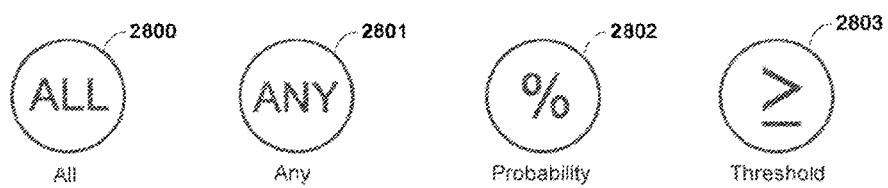
FIG. 28 is a diagram showing a non-exhaustive compilation of the Pebbling Language's edge types, in accordance with an embodiment of the present invention.

FIG. 28 illustrates several possible edge types in this embodiment of the system's Pebbling Language. As already explained, an edge leading from one node or group to another is a simple edge, and does not necessarily have a type. By contrast, split edges are more sophisticated in their behavior. For instance, an All Split Point 2800 will make copies of any pebble entering it and send them to all of the edge's end points. An Any Split Point 2801 will choose one endpoint uniformly at random and route the pebble to that destination node. By contrast, a Probability Split Point 2802 allows the programmer to assign a probability distribution to each edge in which the sum of the probabilities need to add up to 100%, as is the case for edge 511 in FIG. 26. This type of split point can also make use of independent probability, in which each edge fork has an independent probability between 0-100% of spawning a new pebble and sending it its endpoint. In this model, the probabilities across the edges do not need to add up to 100%, and unlike the others, there is no guarantee that any pebble will make it past the split point. Finally, a Threshold Split Point 2803 allows the programmer to assign a threshold of how many of the edge's endpoints should randomly receive a pebble. For instance, the edge may have seven endpoint nodes, and the programmer may assign a Threshold Split Point to randomly send pebbles to at least 3 of them. Alternatively, he/she may assign it to randomly send pebbles to exactly 5 or at most 4 endpoint nodes. These edge types are ideal for introducing randomness and random results into modules created using this Pebbling Language, but they do not constitute a complete accounting of all the edge types in the language.

Figure 29:
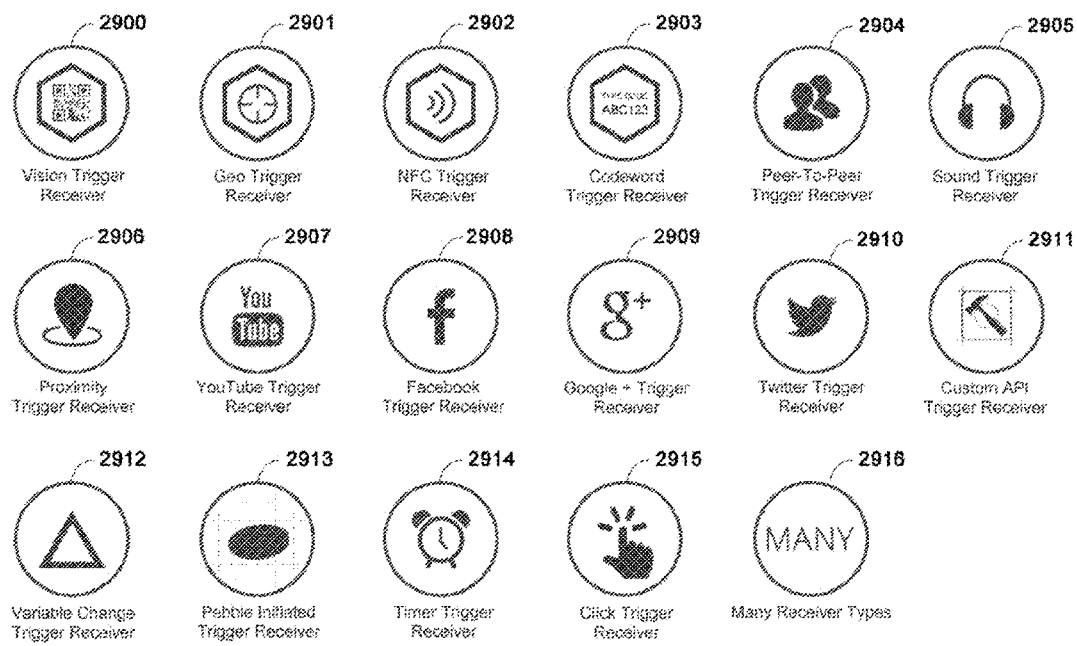
FIG. 29 is a diagram showing a non-exhaustive compilation of the Pebbling Language's receiver types corresponding to the trigger types in FIG. 9, in accordance with an embodiment of the present invention.

FIG. 29 is a diagram showing a non-exhaustive compilation of the Pebbling Language's receiver types corresponding to the trigger types in FIG. 9, in accordance with an embodiment of the present invention. It lists many of the types of edge receivers in this embodiment of the system's Pebbling Programming Language. They act as receivers for the corresponding triggers described in FIG. 9, so we shall not repeat those descriptions here. The one receiver which does not appear in FIG. 9 and therefore bears mentioning is receiver 2916 which is a Many Receiver. Its role is to receive messages from a list of more than one trigger, where these triggers are not necessarily of the same type. As before, this is not an exhaustive list of receivers.

FIG. 30 is a diagram showing a non-exhaustive compilation of the Pebbling Language's group types, in accordance with an embodiment of the present invention. It depicts many of the group types in the system's Pebbling Programming Language. Image 3000 shows an All Group, in which all of the nodes in the group have to be pebbled in order for the group to be satisfied. By contrast, image 3001 depicts an Any Group, in which any one of the nodes in the group must be pebbled in order for the group to be satisfied. Images 3002, 3003, 3004, 3005, and 3006 respectively depict different Threshold groups which are satisfied when greater than, at least, exactly, at most, or less than a certain number of nodes within the group are pebbled. Once again, this is not an exhaustive list of group types.

Technical System Details

In order to support the previously mentioned details and user interfaces, the embodiment of FIG. 2 as a system requires certain underlying technical functionality to be implemented, and this section describes one possible architectural embodiment.

Figure 31:
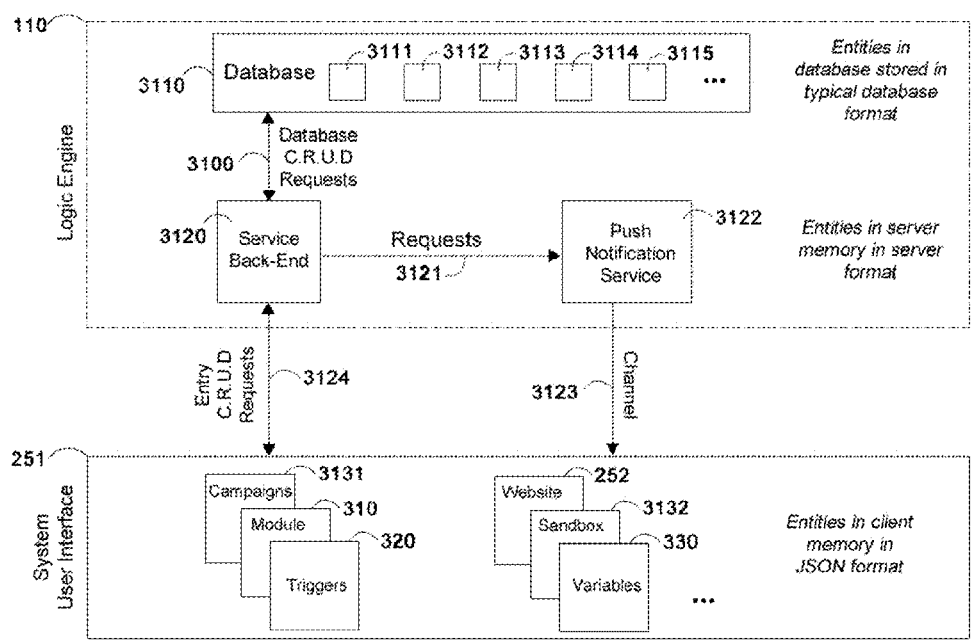
FIG. 31 is a diagram of the embodiment of FIG. 2, showing system architecture and information flow for creating and maintaining various types of entities used in the embodiment.

One of the most basic functions of the system is its ability to create and manipulate the various entities such as modules, triggers, variables, and so on, and this functionality is illustrated in FIG. 31, which is a diagram of the embodiment of FIG. 2, showing system architecture and information flow for creating and maintaining various types of entities used in the embodiment. As previously mentioned and shown in FIG. 3, a programmer accesses the system's Logic Engine 110 through System User Interface 251, which might be a stand-alone application or hosted in a web browser. This interface exposes the various entities in the system such as Campaigns 3131, Modules 310, Triggers 320, the Website 252, Sandbox 3132, Variables 330, and so on. These entities are stored in client memory in JSON (Javascript Object Notation), or some similar format.

The system's Logic Engine 110 has one or more servers which implement the basic functionality of conveying information from the system's database 3110 and its user interface 251. This is performed through C.R.U.D. (Create, Read, Update, and Delete) requests 3124 from the user interface in response to programmer actions. These requests are sent to the Logic Engine where they are received and processed by the Service Back-End 3120. It relays 3100 the appropriate C.R.U.D. commands to the database 3110 containing entries 3111-3115, which performs the appropriate action by either reading, writing, deleting, etc. the relevant data. When information needs to be updated or displayed in the programmer's interface 251, the service back-end sends a request 3121 to the Logic Engine's push notification service 3122, which in turn sends a push notification over channel 3123 back to the programmer's user interface 251, which then updates the programmer's view.

Figure 32:
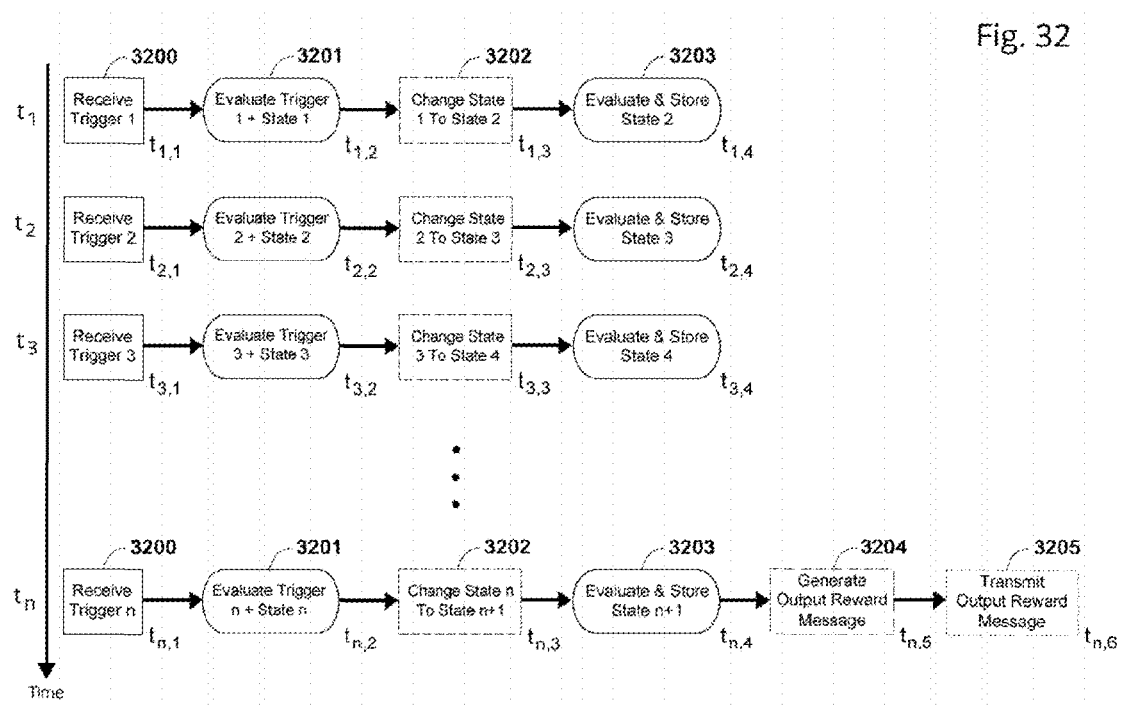
FIG. 32 is a block diagram illustrating the progressive flow of events pertaining to changes in state of a module for the embodiment of FIG. 2 as applied to a specific user instance, in response to specific triggers.

As already mentioned, the programming language used by the present system need not necessarily be based on pebbling, but rather can be a traditional language such as Java, C, C++, Python, or any other popular Programming Language. All of these as well as the system's Pebbling Language are expressive enough to allow programmers to create customized modules which change state based on trigger inputs. FIG. 32 is a block diagram illustrating the progressive flow of events pertaining to changes in state of a module for the embodiment of FIG. 2 as applied to a specific end-user instance, in response to specific triggers. It shows the changes in a module's state in response to trigger inputs that would occur regardless of which computer programming language the embodiment of the present system implements. This figure shows a series of trigger events being progressively received for a specific end-user's module by the system at times $t_1, t_2, t_3, \ldots, t_n$. For each of these trigger events, the system then reacts according to the logic of the module being run. For instance, at time $t_{1,1}$, the module is in state 1 when the system receives trigger 1 3200. At time $t_{1,2}$ the system evaluates trigger 1 in the context of state 1 3201, and as a result, at time $t_{1,3}$ the module changes from state 1 to state 2, as shown by 3202. Finally, at time $t_{1,4}$ the module evaluates and stores state 2, as per 3203. At this point, several more state changes can occur. In other words, it is not just triggers which can change a module's state. Its internal workings can also change the state. In the case of a pebbling module, a state is a unique pebbling configuration, and the difference of one pebble or variable value constitutes a separate state. Pebbles can move multiple times in a cascading manner in response to a single trigger, moving through many states, and the same can happen in a module written using a more traditional language such as Java, but for the sake of simplicity, we are assuming that each of the triggers in this example changes only one state.

Next, at time $t_2$, the module responds to the system's reception of trigger 2. It evaluates trigger 2 in the context of state 2, changes to state 3, and then evaluates and stores state 3. Similar sequences happen at times $t_3$, $t_4$, etc., until at time $t_n$, the module reaches an output state as follows: At time $t_{n,1}$, it receives trigger n 3200. At time $t_{n,2}$, the system evaluates trigger n in the context of the module being in state n 3201. At time $t_{n,3}$, the module changes from state n to state n+1 3202. State n+1 is evaluated and stored at time $t_{n,4}$ 3203. At this point, the system's evaluation of the module leads to time $t_{n,5}$ at which point the module generates an output reward message 3204, which is then transmitted 3205 at time $t_{n,6}$. After this, the module does not necessarily terminate, but rather can be ready to receive and react to more triggers.

Figure 33:
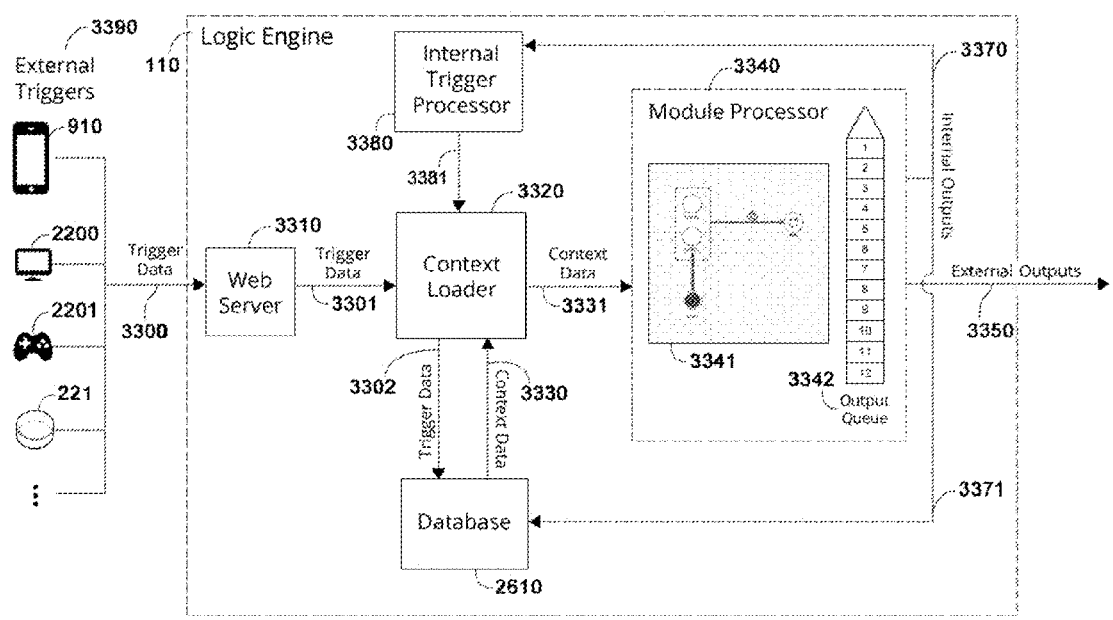
FIG. 33 is a block diagram illustrating the architecture and information flow associated with the Logic Engine 110 of FIGS. 1 and 2, in accordance with an embodiment of the present invention.

FIG. 33 is a block diagram illustrating the architecture and information flow associated with the Logic Engine 110 of FIGS. 1 and 2, in accordance with an embodiment of the present invention. At the start of this flow, we have external trigger sources 3390 which send trigger data 3300 to the present system's Logic Engine 110. These external trigger sources include, but are not limited to, many of the devices that have already been discussed, such as mobile devices 910, gaming consoles 2201, or smart televisions 2200, external third party servers 221, desktop computers, laptops, wearable computers, and so on.

Within the Logic Engine 110, incoming trigger data is received and processed by web server 3310. This data is then relayed 3301 to the system's context loader 3320. The context loader's role is to fetch and prepare all of the information, or context, which will be required to process a module's response to the incoming trigger. Context includes information such as the module's current state for the relevant end-user(s) as well as the module's logic, or rules for responding to triggers. In the case of this embodiment of the system's Pebbling Language, this includes the program's (module's) state diagram, trigger data, pebble locations, variable values, etc. The context loader fetches this information by sending the trigger data 3302 to the system's database 2610, which replies with the relevant context data 3330. If the module is unlocked, then a lock is placed on the relevant module so that it can be edited by at most one Module Processor at once, and this context data is then relayed 3331 by the context loader to the Module Processor 3340. If the module is locked, then the trigger is placed into a first-in-first-out queue within the context loader, and this will be processed when the module becomes unlocked.

The system's Module Processor 3340 is responsible for carrying out the computation resulting as a response to the trigger. In the case of this embodiment of the system's Pebbling Language, the Module Processor loads the module's state diagram 3341, applies the trigger, and updates the module by moving all relevant pebbles (if any) to their new locations. Some edges have no receivers on them, in which case pebbles can continue to move in a cascading fashion. The Module Processor moves all triggered and cascaded pebbles until they have come to a resting state and no more pebble movement is possible. In the meantime, pebbles which are moving can cause many different events to happen. For instance, among others, they can change the value of a variable, cause pebble-initiated trigger to fire, or cause an HTTP POST to be sent to an arbitrary server. These events are placed into an output queue 3342 in a first-in-first-out manner which can be overridden by programmer-flagged priority events that can jump to the front of the queue. Once the pebbles have come to rest, the Module Processor begins the task of dispatching the items in the queue one by one. There are two different types of items in this output queue: 1) Those which will initiate external outputs, and 2) Those which will initiate internal outputs. External outputs such as HTTP POSTS are sent from the Logic Engine using channel 3350. By contrast, internal outputs such as variable changes or internal triggers feed back into the Logic Engine. Variable change events are sent via channel 3371 to the system's database 2610, which performs the relevant update. When variables are changed, the system must check to see if any variable conditions have just become satisfied and if so, move the appropriate pebbles. This can be done by adding variable changes to the Context Loader's trigger queue as if it were a trigger. By contrast, internal triggers are sent via 3370 to the internal trigger processor 3380, and from there, via channel 3381 to the context loader, which will treat this as any incoming trigger by fetching the relevant context, checking to see if the corresponding module is locked, and proceeding as before. Once the Module Processor's output queue is empty, the module is unlocked, and any triggers waiting for it in the context loader's trigger queue are allowed to proceed in order.

Figure 34:
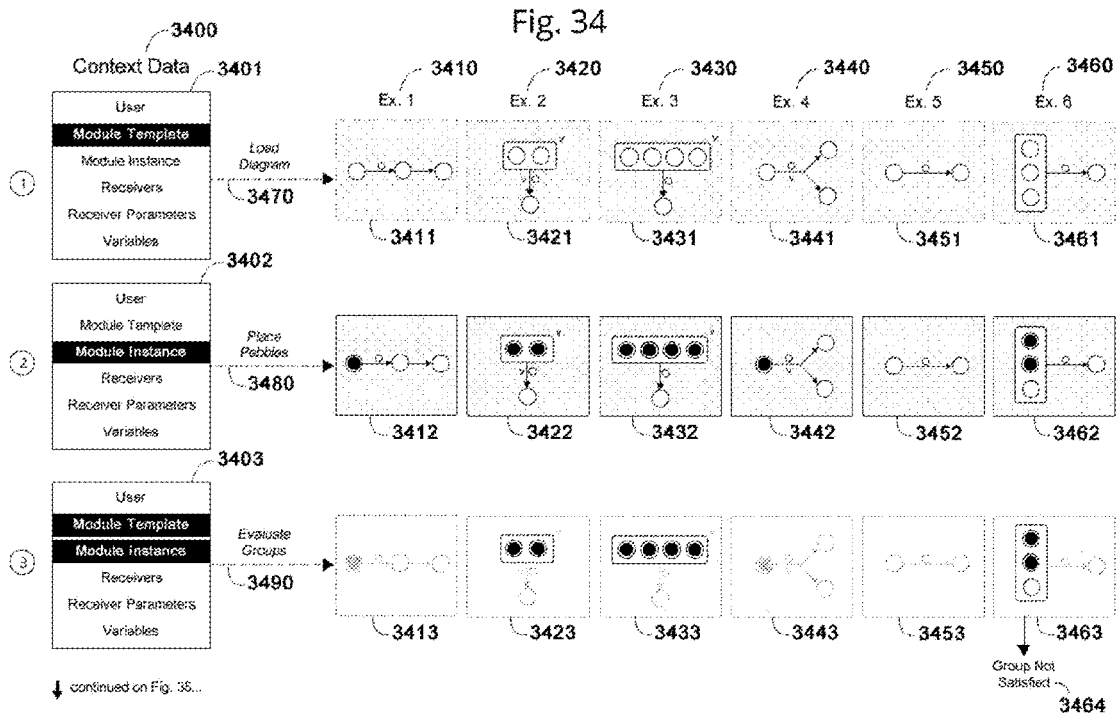
FIGS. 34-36 are block diagrams collectively showing the order of operations performed by the Module Processor 3340 of FIG. 33.
Figure 35:
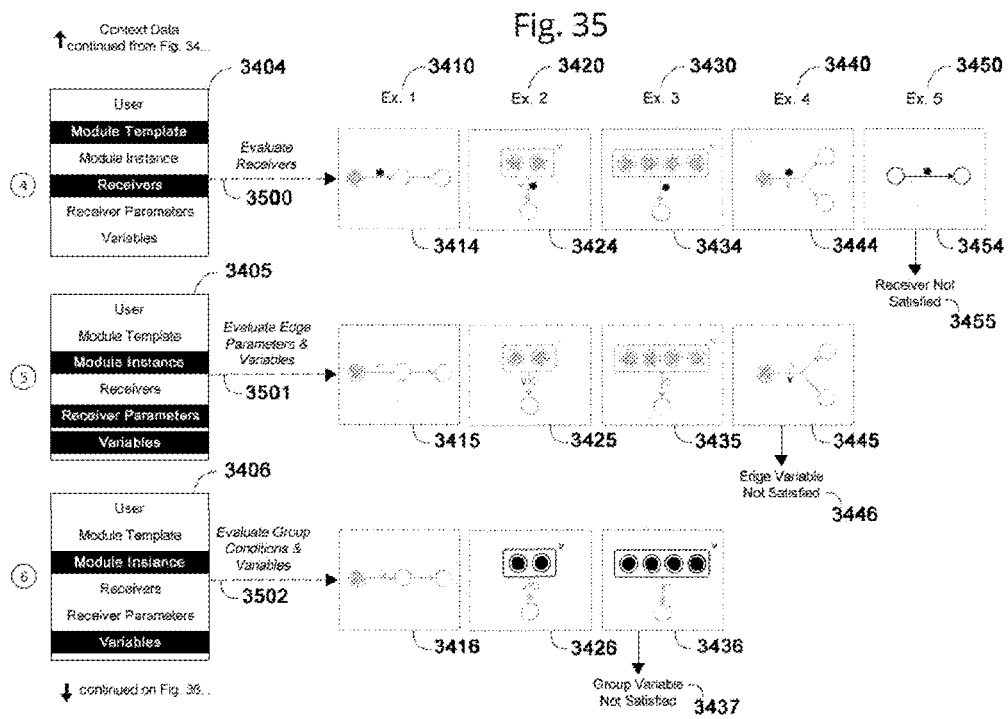
Figure 36:
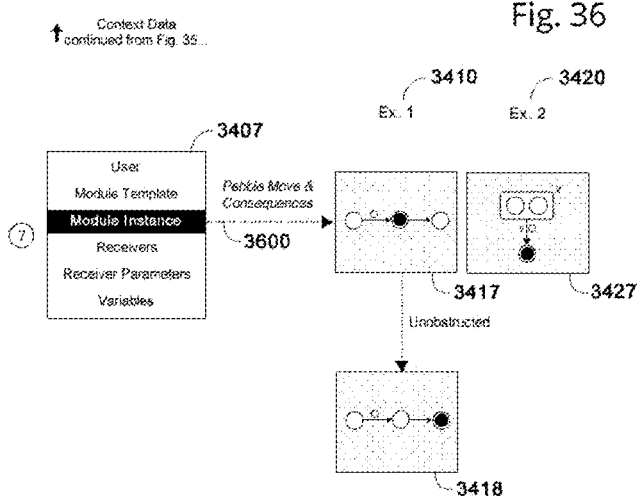

The most complicated part of the system shown in FIG. 33 is the Module Processor 3340, and this component of the Logic Engine 110 bears further explanation. FIGS. 34-36 are block diagrams collectively showing the order of operations performed by the Module Processor 3340 of FIG. 33. Although this diagram spans three figures, these are meant to be viewed together. FIG. 34 flows into FIG. 35, which in turn flows into FIG. 36. The Module Processor's main task is to apply a trigger to the relevant context data, move any relevant pebbles, and place any outputs on the output queue, which are then dispatched. Since the output queue and dispatching output queue items has already been described, we will now focus on how the Module Processor applies a trigger to context data in order to perform a computation and possibly change state.

Context data includes several pieces of information and is processed in a series of seven steps. In FIGS. 34-36 we illustrate these steps as being applied to a series of examples. These figures can be viewed as a large table in which these steps are the rows, and the examples are the columns. Example 1, described by column 3410, shows a path of three nodes whose first edge has a receiver on it, whereas the second edge does not. Example 2, described by column 3420, shows a group containing two nodes with an edge leaving that group and leading to a final node. Both the group and the edge contain variable conditions, and the edge also has a receiver on it. Example 3, described by column 3430, shows a group containing four nodes with an edge leaving the group and leading to a final node. This group has variable conditions, and the edge has a receiver on it. Example 4, described by column 3440, contains a node with a split edge leaving it and connecting it to two nodes. This edge contains a receiver as well as variable conditions, and has a 50% chance of sending a pebble to either one of the destinations. Example 5, described by column 3450, contains a single edge with a receiver between two nodes. Finally, Example 6 is described by column 3460 and contains a group with three nodes in it, and an edge with a receiver leaving that group to a final node.

Column 3400 illustrates the steps which the Module Processor is applying to the context data. It is important to note that the context data does not change, but rather remains static during all steps. In the first step, the context data 3401 is used to construct and load the state diagram 3470. This is done by inspecting the module's template within the context data. A module's template encodes the structure of the state diagram, and is common across all end-users who are running that module. Diagrams 3411-3461 respectively illustrate the templates of Examples 1-6 being loaded and depict their state diagrams.

In the second step, the context data 3402 is used to load module data which is specific to an end-user 3480. This is called a module's instance, and it contains specifics such as where a specific end-user's pebbles are placed as well as the values of variables. Diagrams 3412-2462 respectively illustrate the module instance data from Examples 1-6 being loaded, and show where pebbles have been placed on nodes.

Step three makes use of the module template and instance data within context data 3403 in order to evaluate groups to make sure that they are satisfied. In all of the present examples, the groups are of the "ALL" type, which means that every node in the group must be pebbled in order for the group to be satisfied. In Examples 2 and 3 (i.e., diagrams 3423 and 3433 respectively), this is the case, and both of these groups are satisfied. By contrast, the group in Example 6 (label 3463) is missing a pebble, and therefore is not satisfied, so we can stop evaluating this example.

Moving on to FIG. 35, in step four, the module template and receiver data within context data 3404 are used to evaluate receivers 3500. For the purposes of this exposition, we will assume that all receivers match the trigger to which the Module Processor is ultimately responding. In the cases of Examples 1-4 (respectively, labels 3414-3444), all of the nodes or groups at the start points of the edges containing the receivers have been satisfied, so these computations are allowed to proceed. However, the node in Example 5 (label 3454) is not pebbled, and therefore isn't satisfied, which means that the receiver also isn't satisfied 3455, terminating the computation for this example.

In step five, the module instance, receiver parameters, and variable values within context data 3405 are used by the Module Processor to evaluate edge parameters and variable conditions 3501. Although not necessary, triggers can contain additional parameter data, and conditions based on this data can be added to edges/receivers. This allows an even greater level of control, in that a receiver may be in all other ways satisfied, but then fail because the edge trigger parameters failed. Similarly, the variable conditions on an edge similarly allow for a greater level of control in that a receiver may be in all other ways satisfied, but then fail because the variable conditions failed. In Examples 1 and 3 (respectively labels 3415 and 3435), the edge parameters are satisfied, and there are no variable conditions, so they are vacuously satisfied, allowing these computations to proceed. Similarly, in Example 2 (label 3425) the variable condition is satisfied, allowing this computation to proceed. By contrast, in Example 4 (label 3445), the edge variable is not satisfied 3446, and the computation terminates. If this variable condition had been satisfied, the pebble would have moved along the edge and chosen a random fork to end up on one of the two destination nodes.

In step six, the module instance and variable values within context data 3406 are used to evaluate group conditions and variables 3502. Example 1 (label 3416) has no groups, and therefore vacuously proceeds. In Example 2 (label 3426), the group's variable condition is satisfied, allowing its computation to also proceed. Finally, Example 3's group variable condition fails (label 3436), and this example's computation terminates 3437.

Step seven is the final stage of the Module Processor's computation, and it uses the module instance information within the context data 3407 to move pebbles and process the consequences by placing them on the output queue as previously discussed. In Example 2 (label 3427), the two pebbles from the group merge into one and move along the edge to the destination node, thereby changing the module's state. Merging occurs because nodes cannot have more than one pebble on them. In Example 1 (label 3417), the pebble moves from the Start Node to the middle node, and because the next edge contains no receiver or variable conditions, it is unobstructed and continues to move to the final node 3418.

Cloud Operating System & Marketing Network

Figure 37:
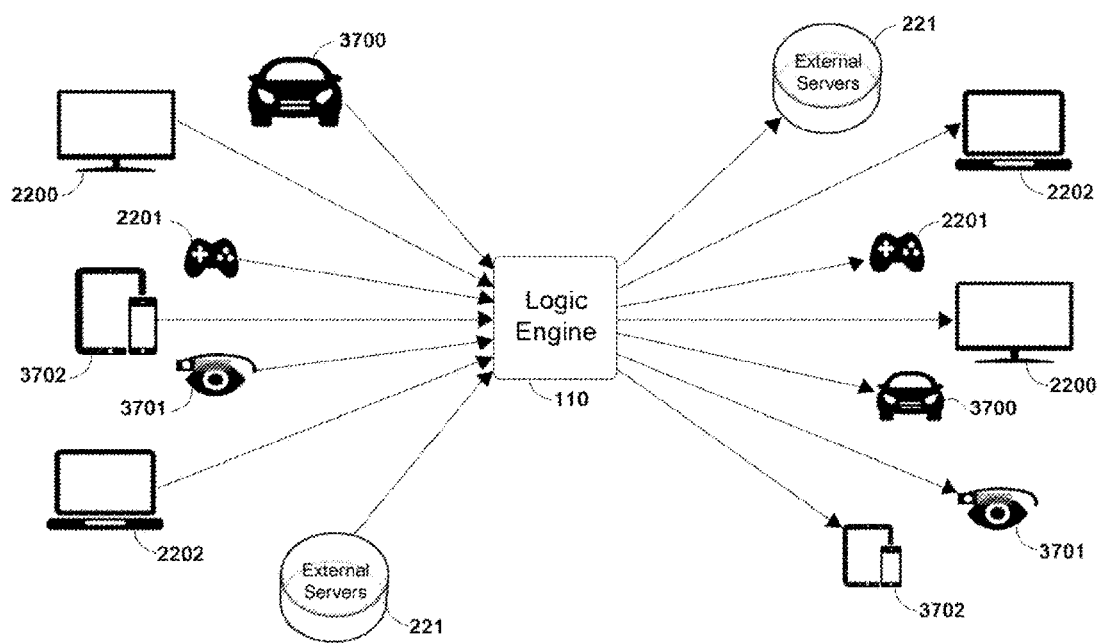
FIG. 37 is a logical flow diagram illustrating how the embodiment of FIG. 2 can be considered as a Universal Event Bus.

As previously mentioned, this system forms an "operating system in the cloud" in two major ways. The first is that it is capable of executing arbitrary computer modules, and the second is that it creates a Universal Event Bus and exposes this functionality to programmers in order to simplify the management and access of an extremely rich variety of input and output devices and signals. This Universal Event Bus can be used in extremely general ways, and this major functionality is illustrated in FIG. 37, which is a logical flow diagram illustrating how the embodiment of FIG. 2 can be considered as a Universal Event Bus. As can be seen, the system forms something of a "bow tie", with maximum flexibility on inputs, maximum computational expressiveness (Turing-Completeness) in the center, and maximum flexibility on the outputs. The system's Logic Engine 110 forms a nexus which can connect any device capable of sending a trigger on the left, to any Internet-connected device on the right. Devices capable of sending trigger messages include, but are not limited to modern cars with built-in computers 3700, smart televisions 2200, game consoles 2201, mobile devices such as smart phones or tablet computers 3702, smart eyewear or other wearable devices 3701, laptop or desktop computers 2202, any external Internet-connected server 221, and so on. Triggers from the myriad devices arrive at the Logic Engine 110 where they are processed according to a module written using the system's Pebbling Language or some other means of encoding computer processing instructions. This module reacts to the trigger being received and performs an appropriate action which can range from changing the state and graphics of a module to sending a message to an arbitrary Internet-connected device. In all of these cases, the list of output devices on which the output is displayed, or the output device to which this message is sent is again extremely flexible and diverse, and is shown on the right-hand side of the "bow tie". Since the present system allows for a message to be sent from any device, processed arbitrarily, and then relayed to any other arbitrary device, it is appropriate to refer to the system as a cloud-based operating system together with a Universal Event Bus.

One powerful application of this event bus is to the realm of digital marketing. Advertising networks are currently siloed from each other and come in many "genres" such as radio, television, print, out-of-home, digital, and so on. In order for a brand to launch a marketing campaign, it must create and launch an ad campaign on several of these different types of ad networks. In that sense, a marketing campaign is simply the union of several ad campaigns, but in today's world with current technologies or lack thereof, the connections between these ad campaigns is largely thematic rather than technological. Since the presently-described embodiment of this system forms a Universal Event Bus and has so many different types of heterogeneous triggers, they can be deployed across the world's heterogeneous ad networks in order to create the world's first "marketing network". Together with the system's ability to easily create modules and splice them into existing applications using an embodiment of the system's visual Pebbling Programming Language, this is a potent combination because it allows brands as well as their agencies to take charge and control the orchestration of a digital marketing campaign across many ad networks. Because the system's Pebbling Language is so simple and visual, it can be mastered by creative individuals who have no technical backgrounds or experience, thereby empowering them to control the entire execution pipeline of a campaign without having to rely on technical vendors to build apps, thereby saving time, money, and the risk of ideas being lost in translation.

However, embodiments of this invention have applications that clearly go far beyond the realm of marketing. There has been much talk about the so-called 'Internet of Things', in which the whole world will become connected to the Internet. Everything from watches to microwaves to cars, our clothing, our homes and much more will all have IP addresses or some other way of being referenced, located, or connected to the Internet, even if only in a semantic rather than a technological sense. That new world will require key tools and infrastructure to help connect devices with each other together with the ability to easily set up and perform intermediate computations. We therefore see this embodiment of the present invention as being a key technology to help create and manage the new Internet of Things.

Sponsorship Junctions

With the addition of another component to the system, we can enable some powerful functionality that can be built on top of previously-described system abilities. This component is not necessarily dependent on the rest of the system, and can be integrated with any similar platform. This component is called the system's "Sponsorship Junction Controller", and it enables Sponsorship Junctions, which provide the system with the ability for end-users to be sponsored by brands for doing things that they already do but for which they are currently not receiving any rewards. Sponsorship Junctions bring together the creators of experiences with brands/sponsors in a seamless way.

Sponsorship junctions can be created for any "trigger-monitorable activity", that is, any type of activity for which an end-user's participation or action can be measured by creating a trigger that, if fired by an end-user, would imply that he/she is indeed participating in that activity or performing that action. These experiences can include almost any activity, such as people playing video games, visiting a theme park, or running a marathon, and the purpose of a Sponsorship Junction is to make it easy for the creators of the video games, the owners of theme parks, and the organizers of marathons to invite brands to respectively sponsor game players, theme park visitors, and marathon runners for participating. For each activity genre such as video games, theme parks, and marathons, there is a separate Sponsorship Junction. It is not necessary that an end-user be aware that a specific trigger-monitorable activity is in fact being monitored by a trigger, even though the end-user might be purposefully engaged in the activity Examples of such a trigger-monitorable activity include credit card swipes, which fire triggers and cause a state to change in an account associated with the end-user, or even facial recognition technology which is used to identify an end-user in a specific context and then automatically fire a trigger, causing state to change in a security module associated with the end-user. However, for many brands, the most exciting possibilities for sponsorship junction are the ones which involve sponsorship of activities in which the end-user is aware of the presence of triggers.

For instance, with the video game Sponsorship Junction, let us assume that 100 different game developers connect their games to the junction, and then another 100 different brands connect to the junction as sponsors. Normally, this would require every game developer to make a separate deal with every sponsor, so that would require an astronomical 10,000 business deals to be struck. However, Sponsorship Junctions are designed to considerably decrease this burden, and instead of requiring 10,000 deals, the present system requires that each game developer and sponsor only make one deal—with the Sponsorship Junction, thereby reducing the required business development from a quadratic 10,000 to a linear 200. This is achieved by setting up a standard set of default triggers for each Sponsorship Junction so that each game implements these triggers, as does every sponsor. This set of default triggers is highly-specific to the genre of the Sponsorship Junction, so for instance, in the case of video games, the set would include triggers for common events that happen in video games, such as completing a level, killing a boss, leveling up, winning the game, and so on. By contrast, a theme park might have a completely different set of default triggers for events such as visiting the park, going on a ride, eating at the concession, going on five rides in a day, a fifth visit to the park, and so on. For each experience genre, there is a separate Sponsorship Junction, and each one has a different set of default triggers which is highly customized for that genre. Each experience creator need not necessarily implement every default trigger, but they must implement some minimum number of them, and the same goes for sponsors, although it is in their best interests to implement as many as possible.

Figure 38A:
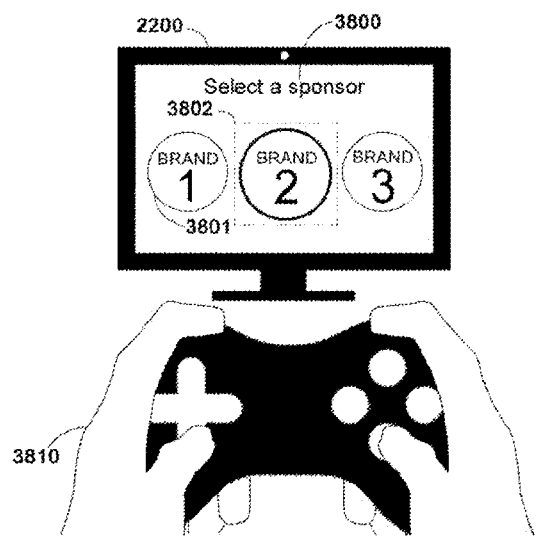
FIGS. 38A, 38B, and 38C are representations of Sponsorship Junction end-user experiences, including display screens, respectively associated with sponsor selection, results of game play, and user outcome messaging.
Figure 38B:
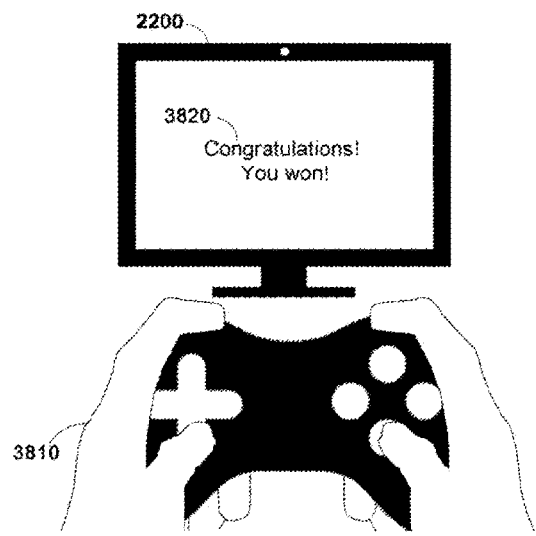
Figure 38C:
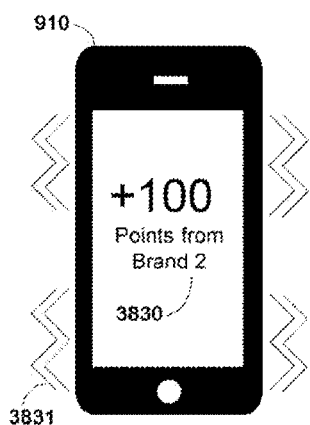

An end-user's experience of participating in a Sponsorship Junction is shown in FIGS. 38A, 38B, and 38C, which are representations of Sponsorship Junction end-user experiences, including display screens, respectively associated with sponsor selection, results of game play, and user outcome messaging. We shall use the Sponsorship Junction for video games as an example in which an end-user is playing a game on a controller-based game console 3810, such as an Xbox, Playstation, Nintendo, and so on, although this example should not be construed as limiting. The first stage of the process is shown in FIG. 38A and involves the end-user's starting the relevant game on his/her game console and selecting a sponsor on the television 2200. The Sponsor Selector Interface 3800 lists a series of brands 3801, and the end-user moves a selector 3802 over the brand that he/she wishes to sponsor this session of the video game and selects it. This list of brands is populated only with brands for which the end-user has applications. This is determined by matching the end-user's credentials from the video game console with on his/her mobile device credentials from all brand accounts from the total list of sponsors. For those apps which the end-user has, but for which matches are not found (for example, if the end-user used different credentials to log into the app from those used to log into the game console), the end-user is given the opportunity to manually enter his/her credentials into that brand's representation in the game console's sponsorship list. FIG. 38B illustrates the next step of the process. Once the sponsor has been selected, the end-user plays the sponsored game on the console 3810 and television 2200, and if he/she achieves a result in the game for which there is a trigger, then a congratulatory message 3820 is displayed which may or may not contain specific information from the selected sponsor. Meanwhile, and as shown in FIG. 38C, the end-user's smart phone 910 buzzes 3831, and if he/she chooses to check it, the phone contains a notification message from the selected brand 3830 informing the end-user of his/her reward. This type of Sponsorship Junction represents a compelling way for brands to advertise within video games, something that has not been popular or even possible, and to do so in a way that does not offend or annoy the end-user because he/she is being rewarded by a brand that he/she selected, and also because the advertising happens entirely on a second screen, and therefore does not divert the end-user's attention from the enjoyment of his/her activity as is currently the case with in-game mobile advertising with banner ads, which cause a full-page redirect to occur when they are clicked, thereby frustrating end-users. Sponsorship Junctions for other genres work similarly.

Figure 39:
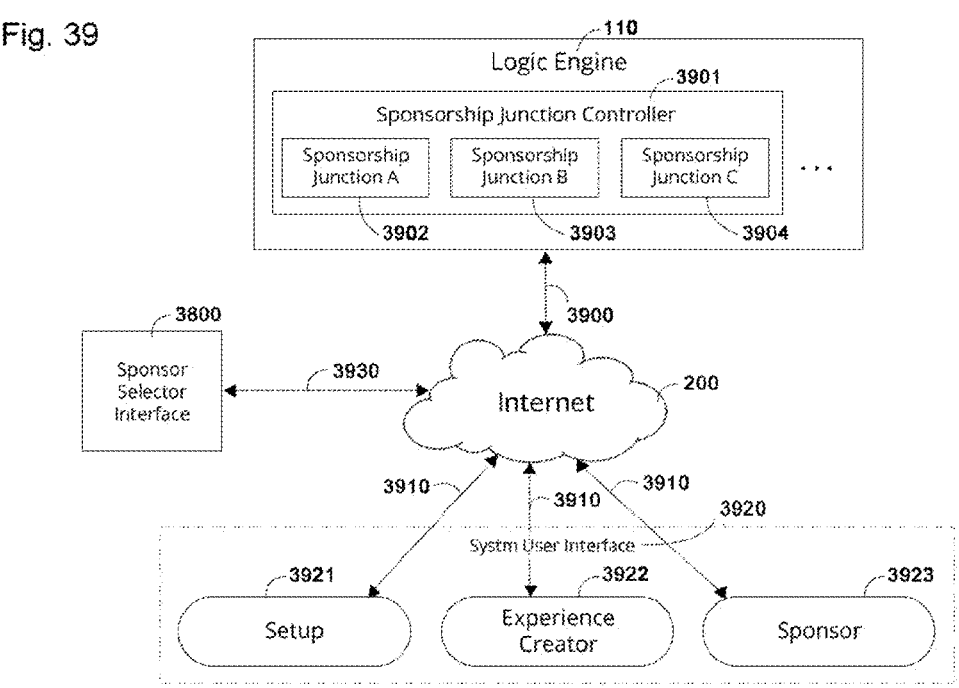
FIG. 39 is a block diagram illustrating how handling of Sponsorship Junctions is accomplished in the overall architecture of the embodiment of FIG. 2, in accordance with an embodiment of the present invention.

Sponsorship Junctions are an additional component within the present system's architecture and their relationship to the rest of the system is shown in FIG. 39, which is a block diagram illustrating how handling of Sponsorship Junctions is accomplished in the overall architecture of the embodiment of FIG. 2, in accordance with an embodiment of the present invention. The system can host an arbitrary number of Sponsorship Junctions 3902, 3903, 3904, etc., which themselves are managed by a Sponsorship Junction Controller 3901. This controller in turn resides within the system's Logic Engine 110. Sponsorship Junctions make use of previously-described system components and functionality such as triggers, receivers, etc., so we won't repeat those components here. Their main purpose is to connect end-users of experiences with sponsors. To that end, the system provides a Sponsor Selector Interface 3800 in the form of an API which can be included on any device such as a game console or mobile smart phone. The end-user selects his/her sponsor using this interface, which communicates over channels 3930, 3900 through the Internet 200 with the Sponsorship Junction Controller, thereby connecting a specific end-user participating in a specific experience with a specific sponsor. Of course, Sponsorship Junctions will also require several user interfaces 3920 to help with their management, including a user interface for them to be set up 3921 (this includes the creation of their default triggers) as well as user interfaces for Experience Creators 3922 and sponsors 3923 to join a junction. These user interfaces communicate through channels 3910, 3900 over the Internet 200.

Figure 40:
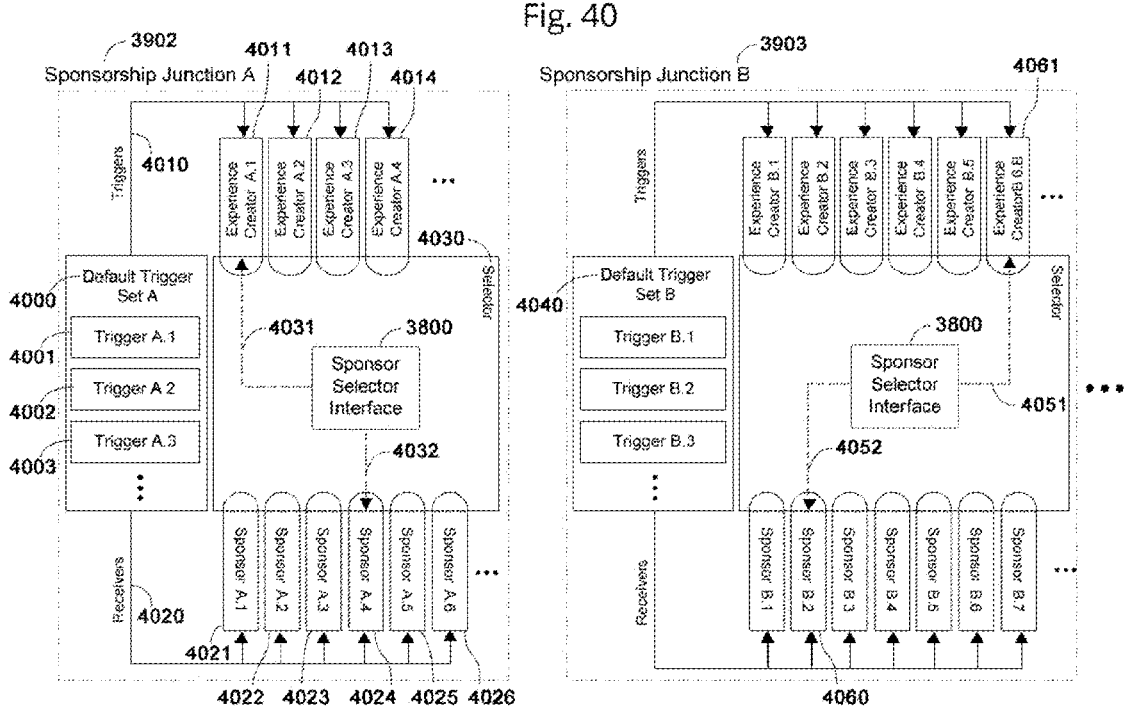
FIG. 40 is a block diagram showing the inner logical structure of Sponsorship Junctions.
Figure 41:
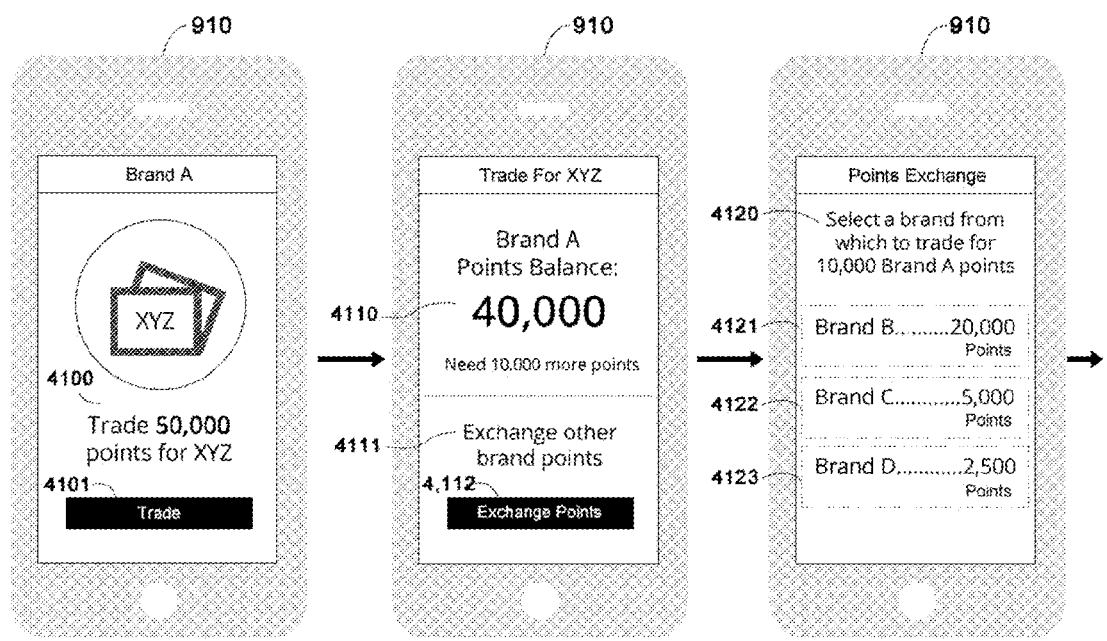
FIGS. 41 and 42 are diagrams including representations of displays presenting a mobile user interface, for use by an end-user, in accordance with an embodiment of the present invention, for utilizing a Loyalty Points Exchange, in accordance with an embodiment of the present invention.
Figure 42:
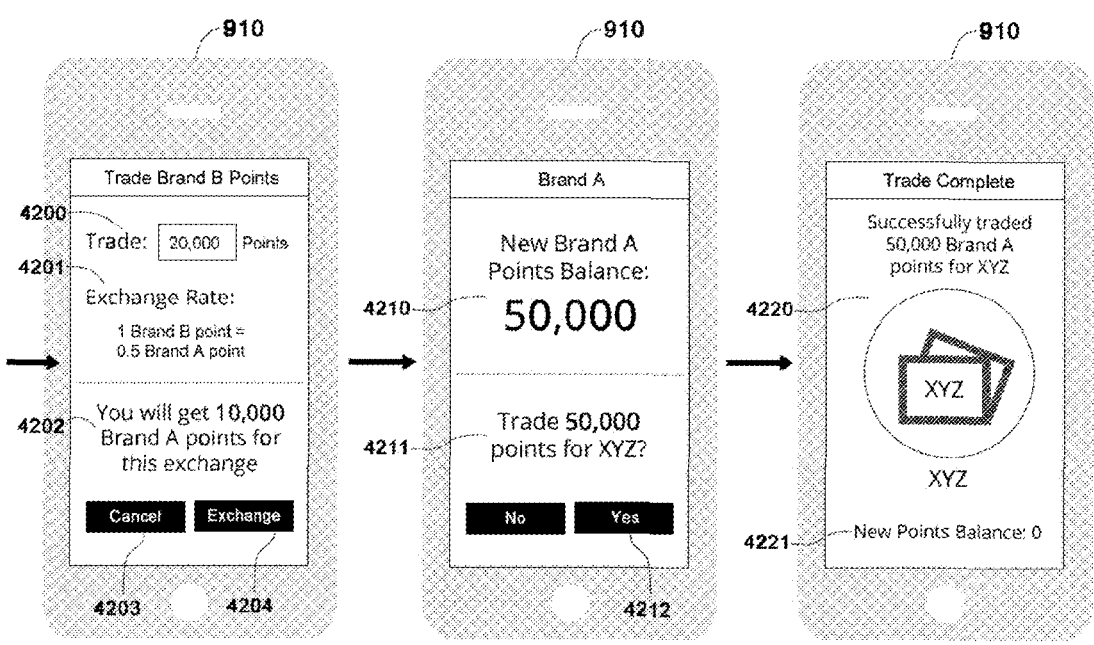
Figure 43:
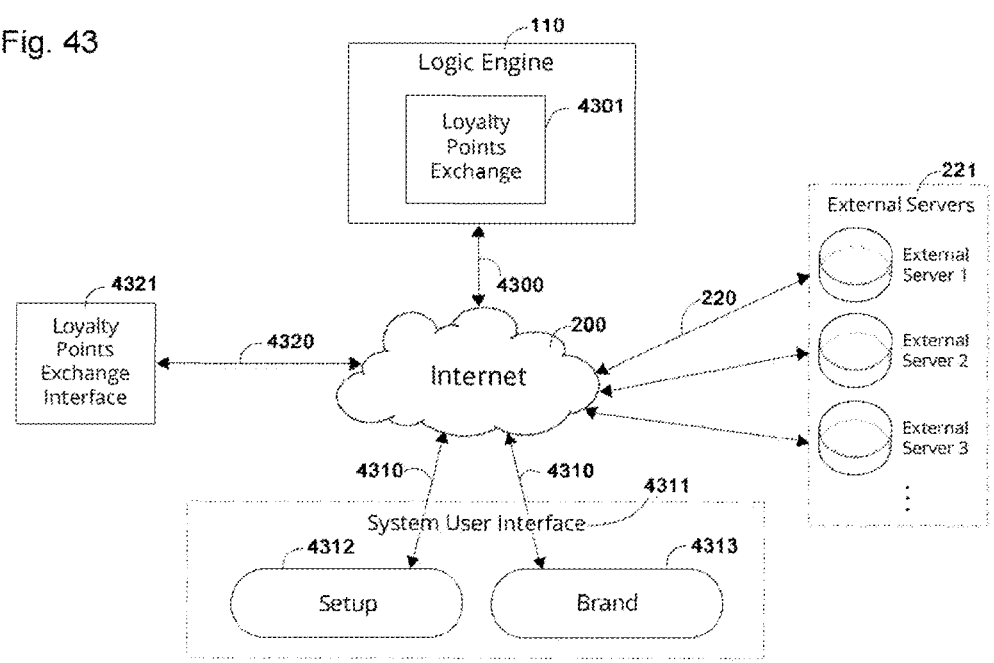
FIG. 43 is a block diagram illustrating how handling of the Loyalty Points Exchange of FIGS. 41 and 42 is accomplished in the overall architecture of the embodiment of FIG. 2, in accordance with an embodiment of the present invention.

The inner structure of Sponsorship Junctions is shown in FIG. 40, which is a block diagram showing the inner logical structure of Sponsorship Junctions. This diagram shows two different Sponsorship Junctions: Sponsorship Junction A 3902 and Sponsorship Junction B 3903. Let us assume that Junction A is for video game sponsorship, and that Junction B's purpose is to provide a means of sponsoring people for visiting theme parks. Junction A contains Default Trigger Set A 4000 which itself contains several default triggers 4001, 4002, 4003, etc. that were created using interface 3921 in FIG. 39. These triggers are highly-specific to video games. Sponsorship Junction A includes several Experience Creators, which in this case are video games 4011-4014. The programmers of these video games have implemented the triggers 4010 from Default Trigger Set A in their games. In addition, they can optionally create custom triggers above and beyond those in the default set, which are stored in their own accounts rather than with the default triggers. These video games as well as any custom triggers are registered with Junction A using user interface 3922 from FIG. 39. At the same time, Junction A also includes several sponsors, which in this case are brands that have their own mobile applications running modules from the present system. These modules are labeled 4021-4026, and in them their creators have implemented receivers 4020 for the triggers in Default Trigger Set A, as well as any previously-mentioned custom triggers from the video game programmers. The main role of the Sponsorship Junction is to connect a specific experience (in this case a video game) with a specific sponsor (in this case the sponsor's app), and that is the purpose of the Selector 4030. In addition to implementing triggers, the video game creators also implemented a graphical Sponsor Selector Interface 3800 in each of their games. Gamers use this interface after they have started the game in order to select a brand, as shown in FIG. 38. This act connects the game that they are already in 4011 with the sponsor that they have chosen 4024. The selector then routes triggers which are fired in the game being played to the sponsor's module via dynamic channel 4031, 4032.

In the case of Sponsorship Junction B, the experience might be quite different from video games since its purpose is to sponsor customers of theme parks for doing the normal things that they do at theme parks, but the underlying technology is robust enough to connect audience providers, in this case mobile applications belonging to theme parks such as Disneyland, Six Flags, Universal Studios, Sea World, Legoland, etc., with brand sponsors' apps/modules. The end-user of a theme park app 4061 starts it and via 3800 selects a sponsor 4060. The end-user then visits the theme park, goes on rides, eats at the concession, etc., and uses the theme park app 4061 to interact with various triggers from Default Trigger Set B which have been implemented in the app. Junction B's selector routes 4051, 4052 these triggers to the receivers of the end-user's app 4060 from the selected sponsor, which buzzes or notifies the end-user whenever he/she has earned points or other rewards for typical theme park activities captured by the triggers.

In an alternate embodiment, sponsor selection within a Sponsorship Junction is not performed explicitly by the end-user, but rather by automated or algorithmic means. For instance, instead of providing a user interface, the Sponsor Selector 3800 consists of code in the system which runs a real-time auction which can measure several inputs such as the nature of the experience, the end-user's profile, potential sponsors' profiles, as well as bids from potential sponsors. It then uses standard auction algorithms such as those used by current online advertisers such as Google to match the best sponsor with the right end-user while maximizing profit. Similarly, in another embodiment, sponsors are chosen algorithmically according to a schedule, with different sponsors being chosen at different times or according to different geographies. Yet another embodiment uses a hybrid approach, using algorithmic means such as an auction in order to rank the order of the sponsors, at which point the end-user selects the sponsor as before.

Generalized Sponsorship Junctions

The example above involving video game sponsorship represents only one case in a more general sponsorship junction framework. In this previous case, the video game creator is an experience provider who creates triggers using our system that the sponsorship junction relays to a brand sponsor. However, that relationship can also be reversed: the sponsoring brand creates triggers that the sponsorship junction relays to the experience provider. One example of this might involve a sponsor firing a trigger after an end-user performs some task in their app, such as viewing some content, purchasing an item, or merely installing the app in the first place, which is then relayed to the video game through the sponsorship junction, where the end-user might receive some reward in the game, for example additional points, in response to the trigger. In this case the sponsor uses the video game reward as an incentive to encourage behavior within their app, and is willing to pay for that privilege.

The video game example also demonstrates that neither the experience provider nor the sponsor needs to build their apps using the presently-described system. The video game creator in the example above creates triggers using our system, and then implements them in their game through an API we provide that interfaces with our system over the internet. The triggers relayed by the sponsorship junction can be received in external apps by creating a trigger or receiver in our system, and implementing those in the external app through our API in similar fashion. This is useful where either or both the experience provider and the sponsoring brand have an existing app they do not wish to visually modify. For example, a sponsoring brand might have an existing loyalty app where end-users are awarded points. The sponsoring brand may wish to start awarding points in response to triggers fired from a popular mobile application game, relayed through a sponsorship junction. It would be understandable if neither the loyalty app nor the mobile application game would want to modify their app beyond implementing the sponsorship junction. It is equally understandable the benefits to both parties of nonetheless participating in the sponsorship junction: the loyalty app encourages greater use and brand affinity by awarding points via a popular game, and the mobile application game is able to monetize its game in a way that rewards end-users merely for playing, something they would do already.

In summary, the generalized sponsorship junction covers two distinct cases: (1) experience provider fires triggers relayed to sponsoring brand; and (2) sponsoring brand fires triggers relayed to experience provider. Within each of these cases, either one or both the experience provider and sponsoring brand can use our system to build the app. Below we examine in detail the case in which the sponsoring brand provides the triggers but does not build their app using our system whereas the experience provider does.

For instance, a hypothetical major league sports team called Team 1 can use the presently-described system to create a digital trading card experience which is then spliced into its existing app. Team 1 creates a competition, implemented in its app, wherein a sports fan must collect the card of each player on the team, and cards are obtained by interacting with triggers. The team can distribute these triggers in and about its own stadium and stores, or publish them on its digital trigger real estate such as its website, Twitter feed, Facebook page, etc., but since not all triggered experiences are of equal value, it can also sell these triggers to its sponsors by auction via a Sponsorship Junction. Of course, trading cards are simply one example of an experience which can be built using this system, and it should by no means be construed as limiting, since a brand can instead build any experience (using the presently-described system or not), add triggers to it, and then submit those triggers to auction.

More generally, embodiments of the present technology can be particularly useful to entities (called "audience providers") that produce, host, or otherwise provide events, games, performances or other environments drawing an audience, such as baseball teams, theme parks, video game makers, movie studios, musicians, cruise lines, hotels, golf courses, etc. An audience provider can use an embodiment of the present technology platform with triggers to create experiences for participating end users. When the audience provider creates such experiences, then the audience provider becomes an "experience provider". When the experience provider creates experiences for participating end-users that are seen by such users to be valuable, then companies having physical or digital locations at which are sold products or services may wish to offer such experiences in order to attract foot traffic to their retail locations. When a company makes such an offer, we call it a "sponsoring brand". In various embodiments of the present invention, the sponsoring brand for a given experience provider is selected by auction. We will provide an overview of these processes first in discussing briefly FIGS. 47, 48, 53, 55, and 57. Then we will discuss these figures and the other figures in further detail.

Figure 47:
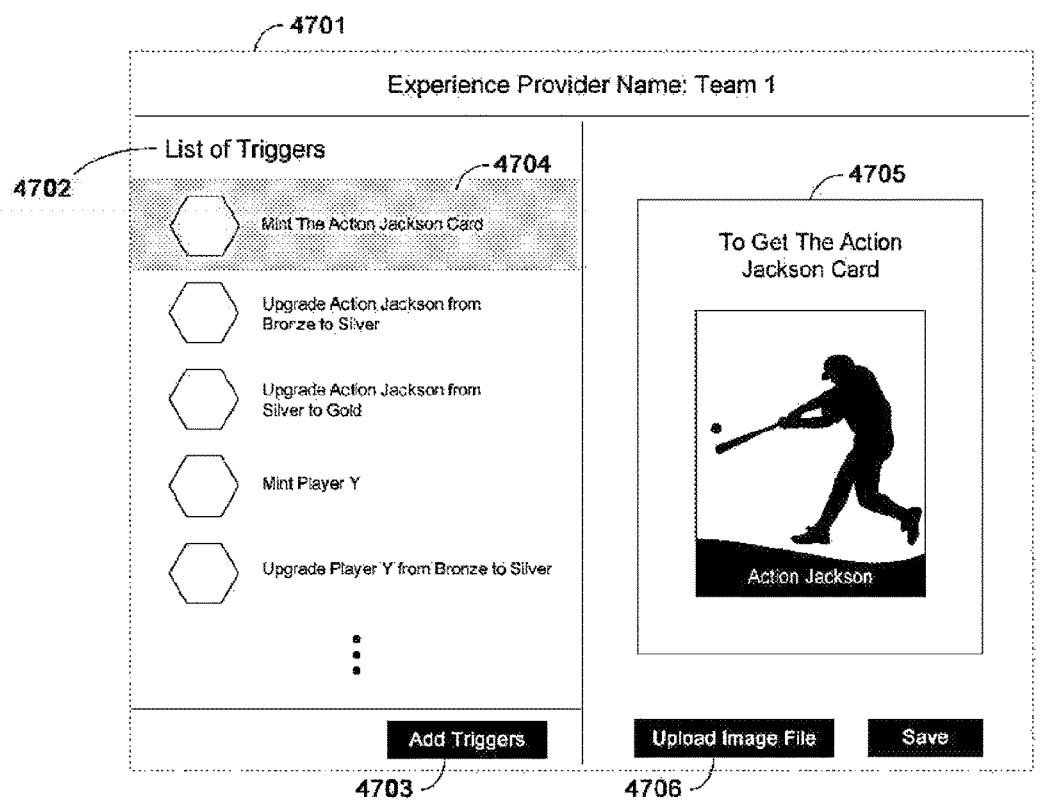
FIG. 47 illustrates an interface, in accordance with an embodiment of the present invention, for programming by the audience provider Team 1, which in this example is acting as an experience provider.
Figure 48:
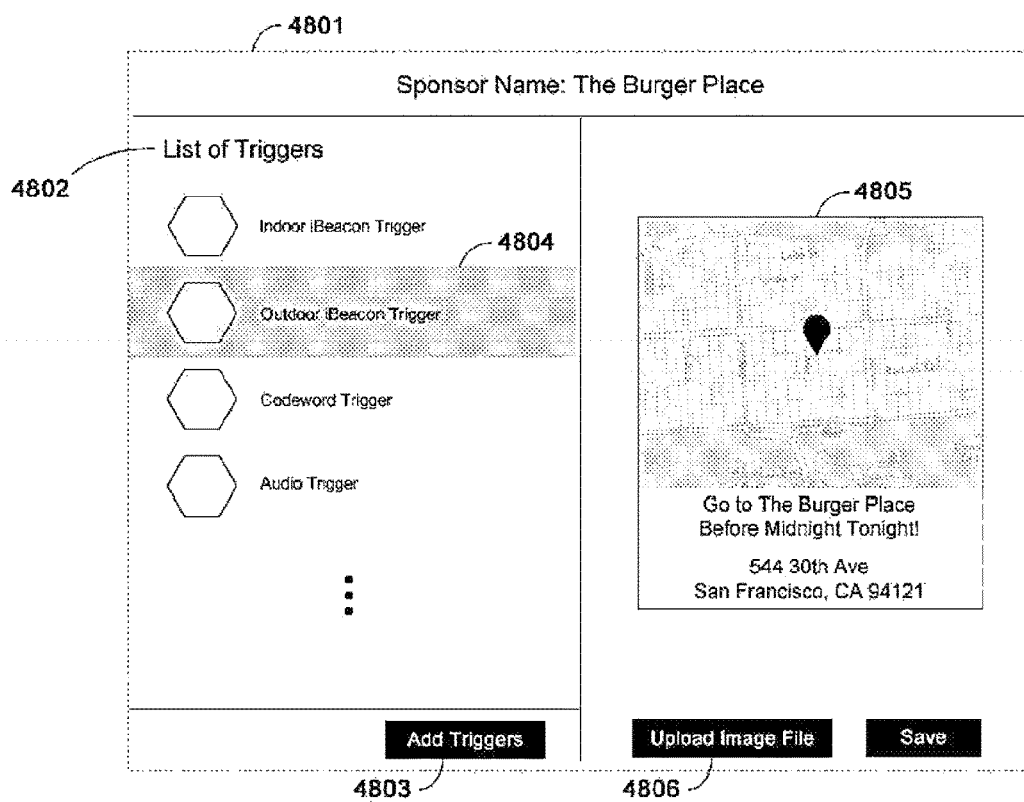
FIG. 48 illustrates a corresponding interface, in accordance with an embodiment of the present invention, for the sponsoring brand to define a trigger associated with foot traffic into a retail location of the sponsoring brand or some other similar end user activity.

FIG. 47 illustrates an interface for programming by the audience provider Team 1, which in this example is acting as an experience provider, using an embodiment of the present invention to define a trigger wherein the reward is a digital playing card for the baseball player Action Jackson on Team 1. FIG. 48 illustrates a corresponding interface for the sponsoring brand to define a trigger associated with foot traffic into a retail location of the sponsoring brand or some other similar end user activity. After sets of triggers are defined by the experience providers, on the one hand, and by the sponsoring brands, on the other hand, mappings are defined in the Sponsorship Junction illustrated in FIG. 53. This figure shows the experience provider triggers in the upper portion of the figure and the sponsoring brand triggers in the lower portion of the figure, and therefore the mapping is between the triggers in the upper portion to the triggers in the lower portion. The sponsor selector creates the mapping. In various embodiments, the sponsoring brand is selected by an auction process among potential sponsoring brands. The auction among potential sponsoring brands is for the purpose of linking to a set of triggers offered by a particular experience provider. We will see how the bidding can target specific subgroups (e.g. based on demographics) within the general population of end-users so that the same triggers can be linked differently for each user based on the subgroup to which that end-user belongs.

Figure 55:
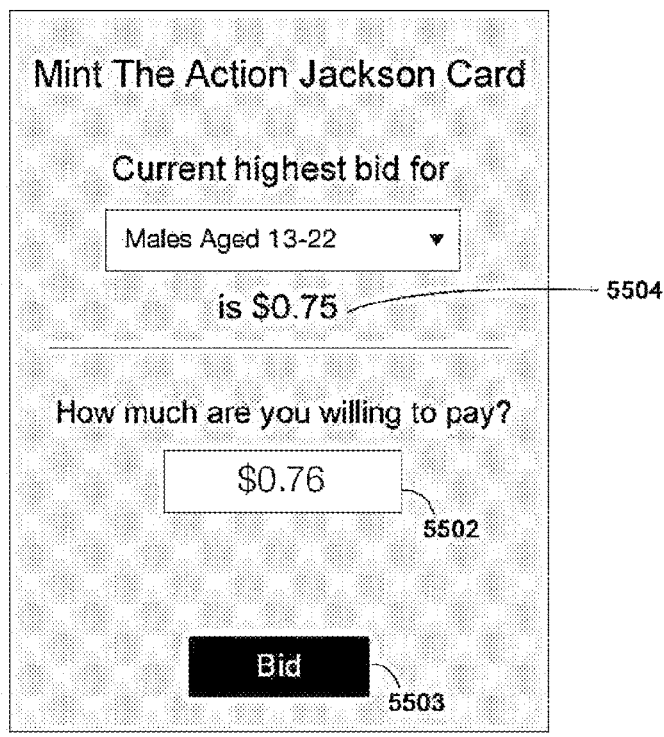
FIG. 55 shows the sponsor's bidding interface in accordance with an embodiment of the present invention.

FIG. 55 is a representation of a bid by a potential sponsoring brand. In embodiments of the present invention, a potential sponsoring brand bids to bind an experience provider trigger to a trigger of the potential sponsoring brand. This example demonstrates one particular implementation and should not be considered limiting in any way. In FIG. 55, a trigger of the potential sponsoring brand is linked to a trigger of the experience provider to ensure the trigger can be relayed from the experience provider to the potential sponsoring brand. In practice, other mechanisms than triggers can be implemented for the potential sponsoring brand to receive the relayed trigger from the experience provider. This includes but is not limited to new receiver objects created for the purpose or existing mechanisms on the platform for receiving and responding to triggers.

Figure 57:
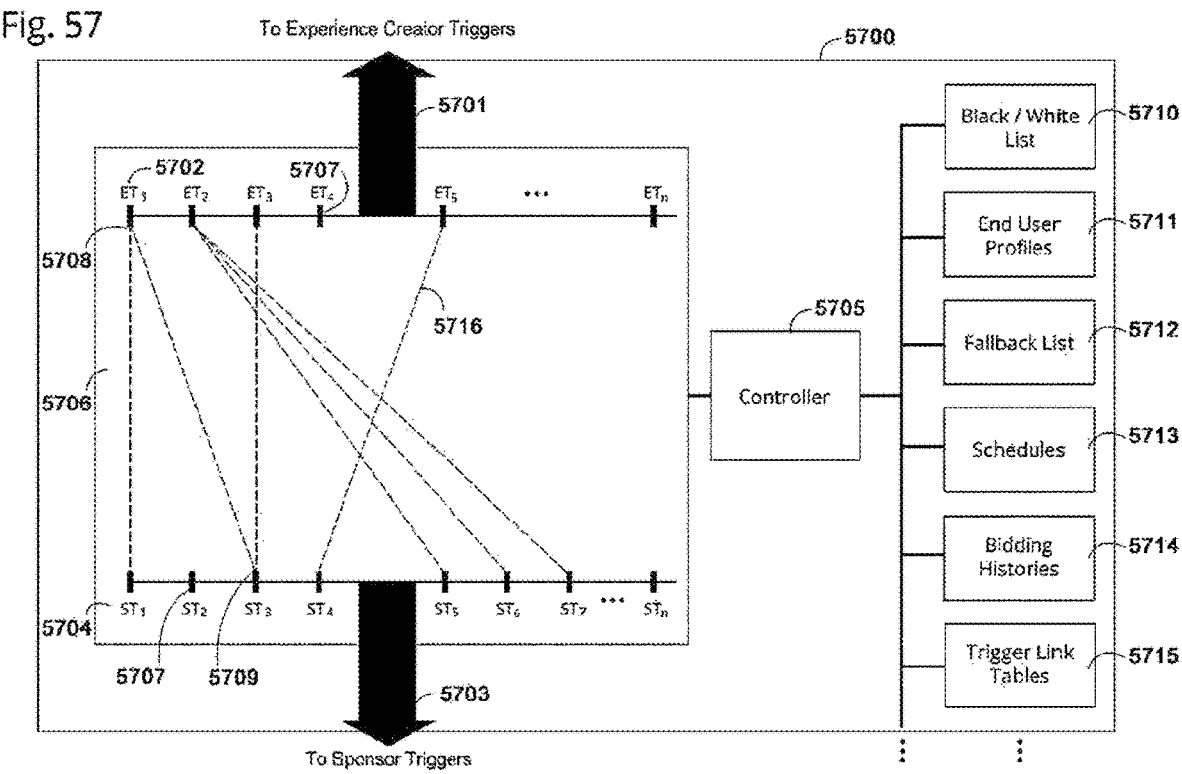
FIG. 57 shows the structure of the Sponsor Selector in accordance with an embodiment of the present invention.

FIG. 57 is an illustrative mapping of experience triggers to sponsor triggers resulting after processing of bids when the sponsoring brands have been selected. It can be seen that the mapping is not necessarily one to one, and can be many to one or vice versa.

As shown in FIG. 47, the team uses trigger description interface 4701 to add triggers for auction within the Sponsorship Junction. Triggers 4702 belonging to Team 1 are added by clicking on button 4703, which opens a standard interface (not shown) containing all of this experience provider's triggers of which some subset can be added or removed as desired. For each trigger up for auction 4702, the experience provider selects it, the highlighted selection being indicated as item 4704, and then supplies a description, which is indicated by item 4705. In this case, descriptions are images uploaded using button 4706, but the description area could just as easily be more sophisticated and include an editor for building the description from atomic pieces such as text boxes, smaller images, HTML, and so on. It is also possible to upload 3D shapes associated with modules in the present innovation. The entire purpose of providing descriptions for the triggers up for auction is to inform the end-user of their value and what they do. In this case, the description informs the end-user that this trigger will give the end user the coveted Action Jackson card.

FIG. 48 is analogous to FIG. 47 and shows a sponsor's corresponding trigger description interface 4801 for describing and publishing its own triggers, in list 4802, which are added using button 4803 as before. In this case, The Burger Place selects one of its triggers, shown as item 4804, and supplies a description 4805 using button 4806. Once again, this description interface can contain an editor, but for the purposes of this exposition, an image is sufficient, and image 4805 will give an end-user clear instructions on where to find the selected trigger 4804.

An automated auction or other means of selecting a sponsoring brand is performed by the Sponsorship Junction and dynamically links the team's triggers to those of its sponsoring brand which won the right to use them, thereby allowing Team 1's trading cards to be dispensed at the sponsoring brand's triggers at its location(s). The relationship between the sponsoring brand and Team 1 as experience provider creates an incentive for the team's fans to visit its sponsoring brand's physical or digital locations and even to make purchases, results that are valuable to the sponsoring brand and for which the latter will pay the team. The details of sponsor selection as well as mechanisms for measuring purchases are described in following sections, but it may be valuable to first illustrate a fan's journey as he/she steps through this experience.

Figure 49:
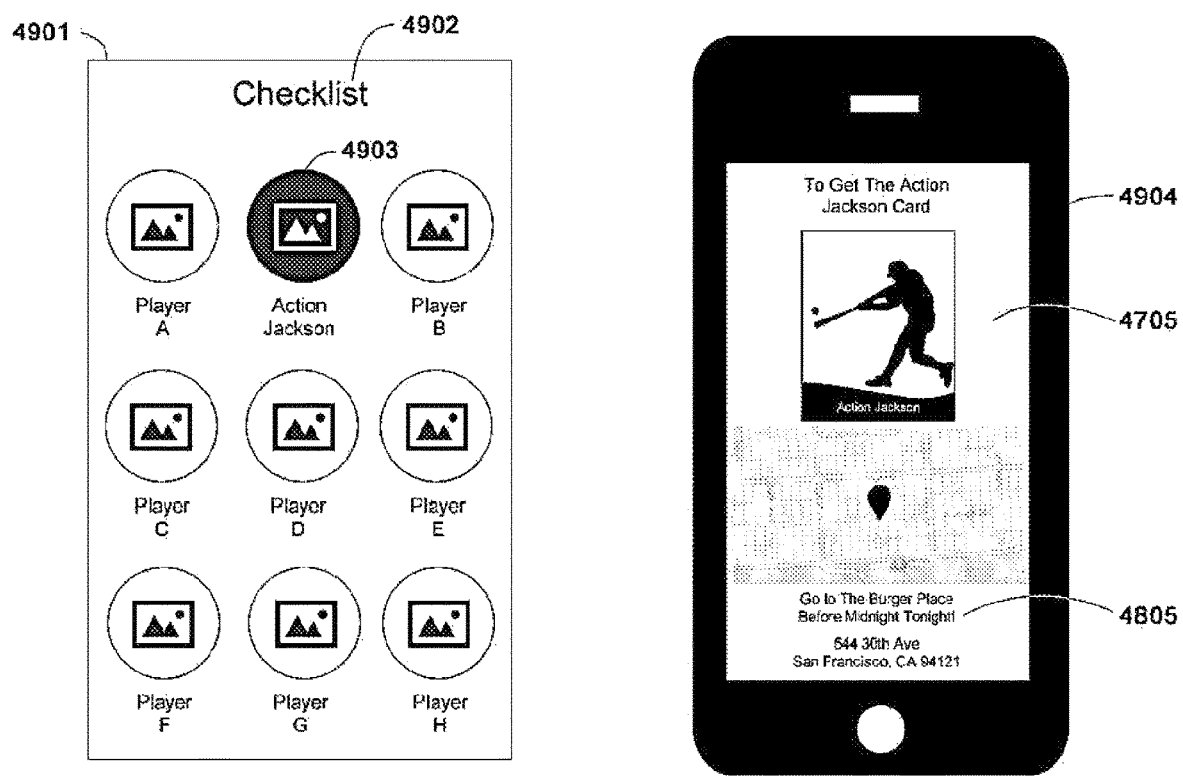
FIG. 49 shows a fan's view of a screen within the app of Team 1 as experience provider, in accordance with an embodiment of the present invention.

The fan's view of a screen within the team's app 4901 is shown in FIG. 49. The trading card experience contains a checklist 4902 showing which cards the fan has already collected. He/she clicks on the icon 4903 representing the card of Team 1's most beloved player, Action Jackson. The fan's selection loads a screen 4904 informing the fan what to do in order to obtain the Action Jackson card. Screen 4904 is created by dynamically combining description 4705, which was entered by the team, with the description 4805 of the sponsor that won the auction, which in this case is The Burger Place. The fan sees this seamless amalgamation of information and understands that he/she must follow the instructions 4805 in order to obtain the card, in this case that he/she must visit The Burger Place before midnight.

Figure 50:
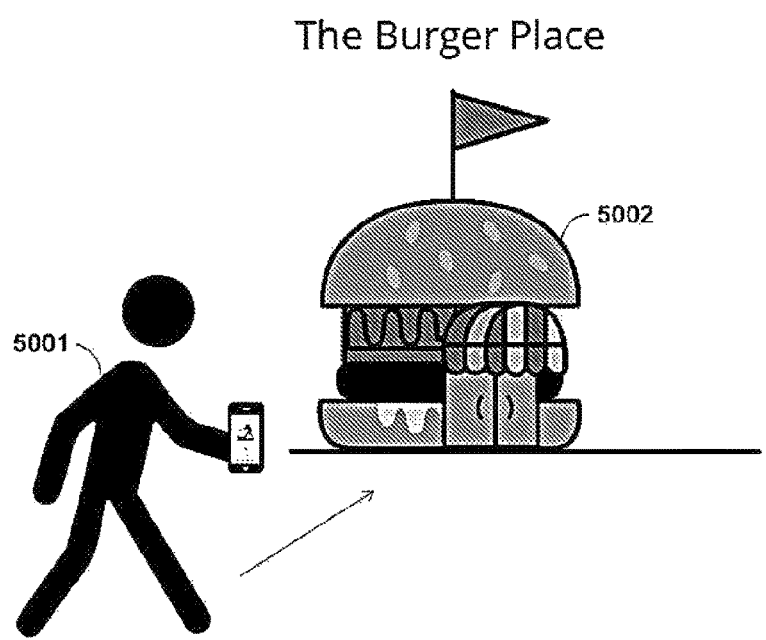
FIG. 50 illustrates the action of the fan in entering into physical proximity of a retail location of the sponsor.
Figure 51:
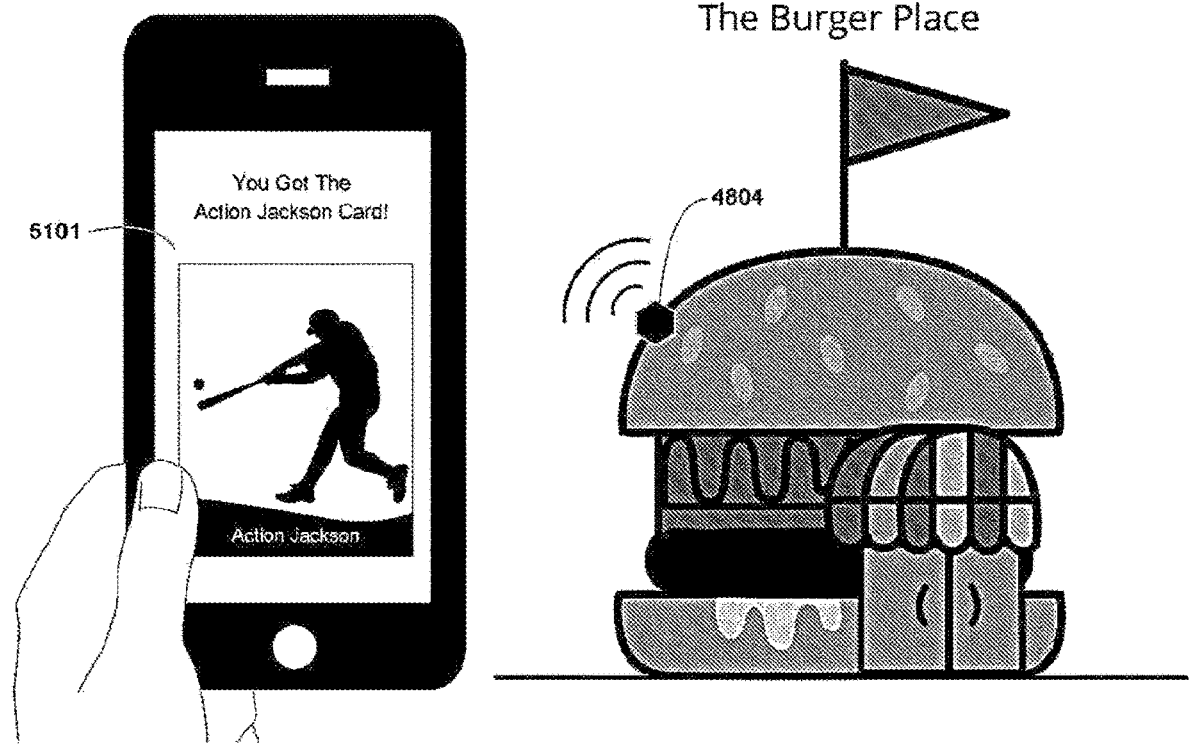
FIG. 51 illustrates the effect, in accordance with an embodiment of the present invention, of the action of the fan in moving with the fan's smartphone within range of the proximity-based trigger 4804.

As shown in FIG. 50, the fan 5001 does precisely this and visits The Burger Place's restaurant 5002, which was shown in screen 4904. As illustrated in FIG. 51, once the fan has walked with his smartphone within range of the proximity-based iBeacon trigger 4804, it fires and performs the programmed action of the trigger 4704 to which it is linked, in this case the minting of the Action Jackson card, shown on the fan's mobile device 5101, and thus fulfilling the promise that was made on screen 4904.

Figure 52:
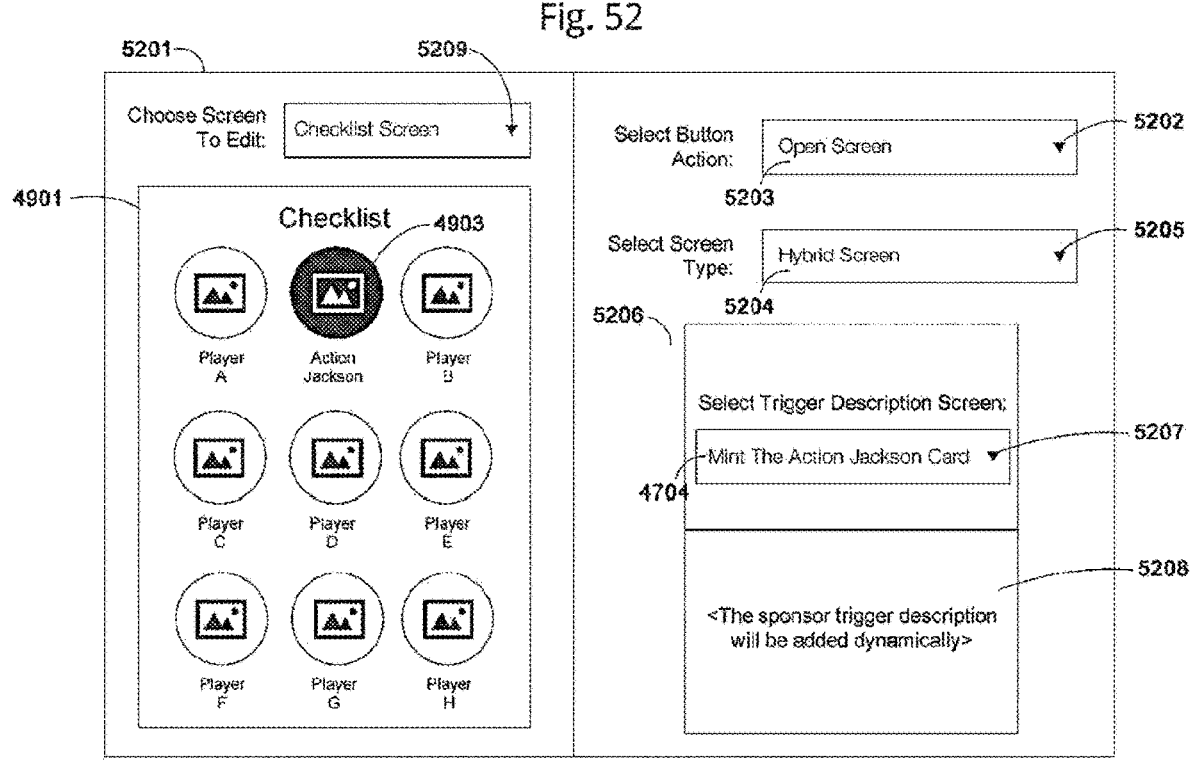
FIG. 52 shows how the creator of the experience used a screen editor 5201 to build a component of the end-user-facing portion of the experience.

FIG. 52 shows how the creator of the experience used a screen editor 5201 to build the end-user-facing portion of the experience. This is done by choosing a screen to edit from dropdown menu 5209, in this case the checklist screen 4901, and then selecting checklist button 4903 and adding an action from dropdown list 5202 instructing it to open a new screen 5203, which in this case is a hybrid-type screen 5204 selected from dropdown list 5205. The hybrid screen 5204 will merge the trigger description 4705 input by the sports team and trigger description 4805 input by the sponsor. The experience creator only has to select the top half of the hybrid screen 5206 and select trigger description 4704 from dropdown 5207, and the system will automatically fill in trigger description 4705 in the top half of the screen and then dynamically choose the lower half 5208 according to which sponsor is linked/bound to it by the junction.

Sponsor Selection

Figure 53:
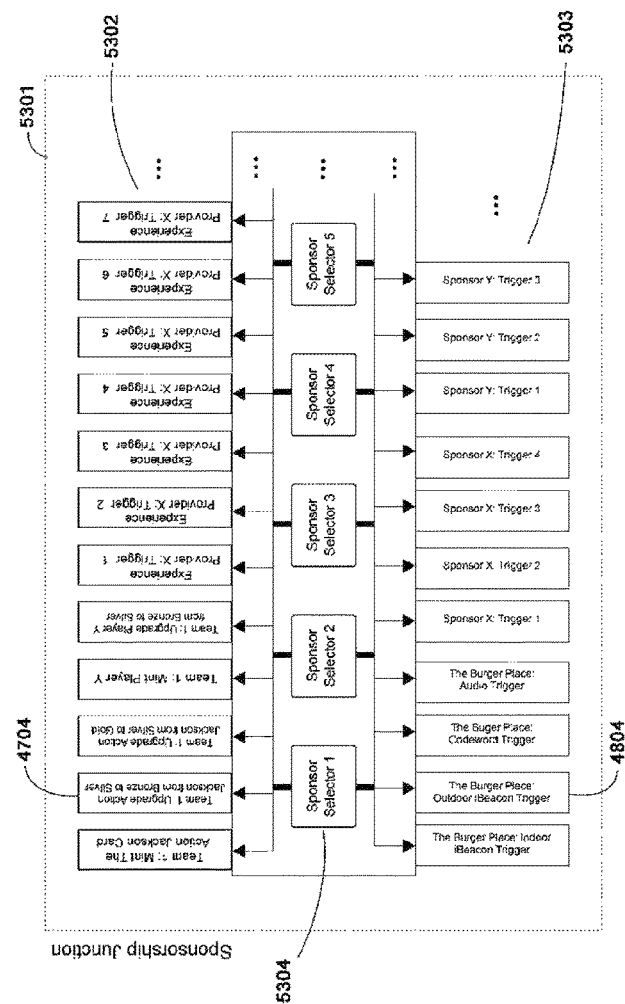
FIG. 53 shows the architecture of the Sponsorship Junction 5301, in accordance with an embodiment of the present invention.

The architecture of the presently-described Sponsorship Junction 5301 is shown in FIG. 53, and it closely resembles the description in FIG. 40. As before, the purpose of the junction is create a dynamic mapping between experience provider triggers 5302 and Sponsor Triggers 5303, which is performed by the Sponsor Selector(s) 5304. Note that the Sponsorship Junction can contain triggers from multiple experience providers as well as sponsors. The number of Sponsor Selectors is itself dynamic, and depends on the granularity of the mapping itself. For instance, if the mapping is designed as a "one size fits all" solution, then a single Sponsor Selector creates a mapping between experience provider triggers and sponsor triggers. The mapping itself can change over time, but the mapping at any time is identical for all end-users. Similarly, an audience may be segmented into different groups with different experiences targeted at these different groups, allowing a sponsor to value members of separate demographics differently with overlaps being resolved algorithmically. For instance, Team 1's audience may be segmented into season ticket holders, males aged 13-22, and "soccer moms", and sponsors may place a different value on members of these different groups. This is solved by having the system dynamically run three separate Sponsor Selectors, one for each audience segment. The mapping for different segments can therefore be different, thereby reflecting how much sponsors value their members over one another, but within each group the mapping is the same for each person. Similarly, targeting can be done on a fine-grained individual basis, in which case the system creates a Sponsor Selector for each end-user.

There are many ways in which the Sponsor Selector(s) 5304 can compute the mapping of experience/audience provider triggers 5302 to those of sponsors 5303. As was shown in FIG. 38A, this selection can be made explicitly by the end-user, but of course the end-user may select more than one sponsor or possibly even whole categories of sponsors such as fast food restaurants. In that example the sponsor was explicitly selected in the context of playing a console video game system, but this should not be construed as limiting, and explicit sponsor selection can just as easily be implemented within Team 1's app above. Similarly, as previously described, sponsor selection can be performed by other simple and obvious means such as a schedule dictating a trigger matching according to date or time.

Another means of matching experience provider and sponsor triggers involves an automated auction of which many types are possible. By way of example, one possible model is analogous to that perfected by Google in which advertisers bid on search terms and then pay on a cost-per-click basis where the cost is determined by an automated auction taking various factors into account. The significant difference between Google's model and that of the presently-described system is that the former is an online system connecting Google's audience to advertisers for the purpose of having them click on links in order to drive traffic to advertiser websites, whereas the embodiments herein are with respect to a system based on triggers which inherently span the realms of both online and physical world. Whereas the former based on hyperlinks and limited to the World Wide Web, the latter is based on triggers and open to the real world, so rather than driving paying customers to a digital website, this system can be used to drive paying customers to real-world locations. Since many trigger types can simply be viewed as clicks in the real world, the cost-per-click model works equally well with the presently-described system as it does for Google. Of course, a mapping doesn't have to be purely based on user selection, a schedule, an auction, or any other single method, but rather can also consist of a combination of any or all of these.

A sponsor can set the maximum price which it will pay for certain triggered experiences using a sponsor auction interface similar to that shown in FIG. 54. In this example, The Burger Place logs into the system and uses the interface 5401 to view the different sets of triggers for each of the experience providers which it sponsors. In this case it sees set 5402 from Team 1, and set 5403 from Experience Provider X. Team 1 is selling several triggers including 4704 which mints the Action Jackson card. The current winning bids are categorized according to demographic groups relevant to this particular experience provider, in this case season ticket holders 5404, males aged 13-22 5405, and soccer moms 5406, making it easy for the sponsor to see at a glance the market rates for these triggers.

Figure 56:
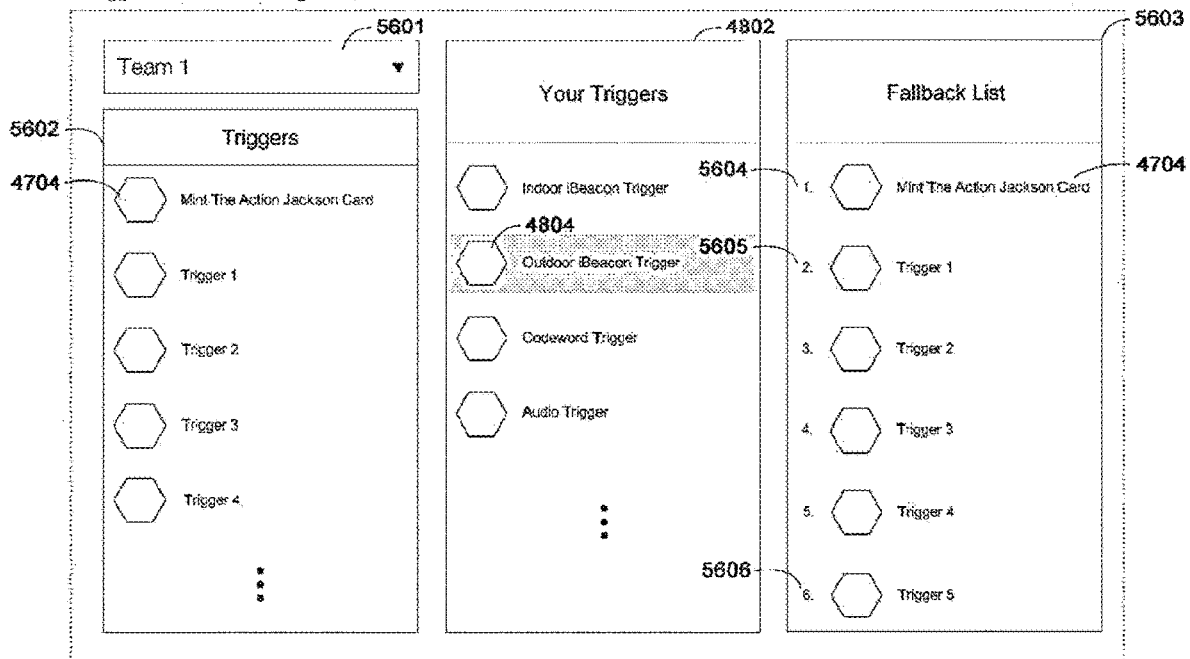
FIG. 56 shows the sponsor's trigger linking interface in accordance with an embodiment of the present invention.

The sponsor wishes to bid on the trigger associated with the Action Jackson card for the audience segment 5405 consisting of males aged 13-22, selects this demographic 5407 containing the current winning bid 5408, and clicks on button 5409 which opens the bidding interface shown in FIG. 55. The Burger Place enters its maximum bid into text box 5502 and presses button 5503. Since this exceeds the previous highest bid 5408, The Burger Place wins the auction and is taken to its Trigger Linking Interface shown in FIG. 56. The Burger Place selects Team 1 from a drop-down list 5601 of experience providers, which populates column 5602 of triggers from Team 1 for which they have won their auctions or are otherwise allowed to use. The next column 4802 shows the triggers owned by The Burger Place. Note that the triggers in the first column are a subset of those previously entered by experience providers using trigger description interface 4701, and the triggers in the second column are precisely those entered by the sponsor using trigger description interface 4801.

The sponsor selects its own trigger, in this case an iBeacon trigger 4804 at its restaurant, which opens a Fallback Interface 5603. The purpose of the Fallback Interface is to select the prioritization order in which experience provider triggers in column 5602 will be linked with trigger 4804. In this implementation, only the highest-priority trigger 5604 is the one which is actively linked with trigger 4804, but it is possible for a sponsor to link more than one experience provider trigger to its own. In this case, another sponsor may become the highest bidder for this trigger, in which case The Burger place will lose the right to link its trigger 4804 with experience provider trigger 4704. In this event, the fallback prioritization 5603 determines what will happen, and in this case trigger 5605 will take its place and become the new highest-priority trigger, and therefore linked to sponsor trigger 4804. The lowest-priority trigger 5606 in the list may be one that the sponsor can never lose, which may be important because it might be desirable for sponsor triggers never to be unlinked. In order to add triggers to this fallback list, the sponsor simply drags and drops a trigger from column 5602 to interface 5604, and can reorder by dragging within this interface.

Note that a sponsor such as The Burger Place can simultaneously link multiple triggers from different experience providers to one of its triggers by repeating the above exercise for several experience providers in drop-down menu 5601, which simply means that many different experience provider apps will have triggers fired when an end-user who has those apps walks interacts with that particular trigger from The Burger Place.

This auction model and corresponding interfaces constitute only one possible implementation and should not be construed as limiting, as many other models are possible. For instance, the current example may imply that linking occurs immediately when a sponsor becomes the highest bidder for a trigger, which isn't necessarily the case. Linking may occur at any point in the process, including at the time of creating a bid. In fact, the implementation described so far may actually be undesirable in certain instances. For example, an end-user is promised the Action Jackson card as shown in FIG. 49, and follows the instructions 4805, setting out for The Burger Place. However, while in transit to that location, a different sponsor outbids The Burger Place, so by the time the end-user arrives, he/she no longer receives the expected card and is disappointed. There are several solutions to this problem: for instance, rather than being linked instantaneously, triggers can switch over to their new "owners" at midnight or some other time when most people are likely to be sleeping. Similarly, time periods can be explicitly be mentioned as a component of each auction, so rather than bidding on triggers, sponsors can bid on them for set periods of time, so in our example, The Burger Place can have the Action Jackson trigger linked to the trigger at its restaurant for, say, a one week period. For the sake of clarity and to avoid any misunderstandings or assumptions, the time duration of the linking can be explicitly surfaced 4805 to the end-user in the instructions.

Similarly, auctions can be performed in real-time as soon as the end-user clicks on the checklist icon 4903 corresponding with a trading card which loads the hybrid screen 4904. In this case, the auction is automatically carried out when the hybrid screen is displayed to the end-user. Another example of a real-time auction is when the auction is performed at the time a trigger is fired. Depending on the type of sponsorship junction involved, the auction will evaluate bids of potential sponsoring brands at that moment to determine what brand becomes the sponsor of that trigger (e.g. in the video game example from earlier), or what reward an end-user will receive in an experience linked to that trigger (e.g. in the Team 1 example discussed more recently).

Real-time auctions such as this lend themselves well to targeting, not just on a generic or demographic level, but even on a custom-tailored/individual basis, and the system can dynamically link a sponsor trigger with the Action Jackson card based on a combination of everything it knows about the end-user together with other information. This can include data such as age, gender, home zip code, personal preferences, past behavior within the system, information about this end-user coming from different experience providers, end-user black lists and white lists, and so on, all in an algorithmic and automated way using standard machine learning techniques designed to maximize the probability that the end-user will interact with the sponsor's trigger. Once this real-time auction is run, the system maintains a trigger link table describing which experience provider triggers are linked to which sponsor triggers, and for how long, and it will control what happens when each individual end-user interacts with any sponsor trigger. This link table of course doesn't have to be edited in real-time, but rather can be computed and built/continually rebuilt as needed ahead of time for all users, so there are many feasible ways to implement individualized targeting.

As previously described, the architecture of our generalized sponsorship junction is shown in FIG. 53. Since the Sponsorship Junction simply links triggers 5302 from an audience provider, to those 5303 of a sponsor, it is completely symmetric and can accommodate any general use case which fits within the paradigm of sponsored, triggered experiences with one or more Sponsor Selectors 5304 determining the linking in a manner similar to that shown previously in FIG. 40. The examples we have given illustrate the general nature and power of the Sponsorship Junction: In the present example, Team 1 provided an audience, namely its fans, whereas The Burger Place played the role of sponsor, whereas in the previous example involving video game sponsorship, it was the video game maker who provided the audience, and Brand 2 was the sponsor. It does not matter that in the sports example, it was the team which used the present system to create the sponsorable experience, whereas in the video game example the sponsorable experience was created independently by a video game maker. Similarly, it does not matter that in one example the trigger-monitorable activity (playing a video game) is associated with the audience provider, whereas in the other (visiting a restaurant), it is associated with the sponsor. This is because the Sponsorship Junction is agnostic to the semantics or details of the experiences and is therefore completely general; it simply links the triggers of the two parties or conveys triggers from one party to the other. It should also be emphasized that either, both, or neither of the experience provider or sponsor must use the presently-described system in order to implement their experiences. For instance, in the above example, Team 1 did use the system to implement the experience, but it can just as easily have been a video game maker building a game for, say, the Xbox platform using traditional means, and having embedded triggers in that game. When the end-user visits the Burger Place, instead of collecting baseball cards, the Sponsorship Junction instead could have relayed triggers to the Xbox game and leveled up the end-user's character in that game.

The act of linking triggers from experiences providers to Sponsors is carried out by one or more Sponsor Selectors 5304 responsible for dynamically creating the mappings between experience creator triggers 5302 and sponsor triggers 5303 for a group or individuals, and a Sponsorship Junction may contain any number of experience creators and sponsors. As previously mentioned, this mapping can be achieved in many different ways, such as an explicit manual selection of one or more sponsors made by an end-user or by an automated auction as described above. One possible implementation of the inner workings of a Sponsor Selector capable of automated auctions is shown in FIG. 57.

Each Sponsor Selector 5700 has a channel 5701 leading to the full set of experience provider triggers from all of the experience providers in the junction and exposes these triggers internally 5702 as $ET_1, ET_2, \ldots, ET_N$. Similarly, the Sponsor Selector has an analogous channel 5703 leading to the full set of sponsor triggers from all sponsors in the junction and exposes these triggers internally 5704 as $ST_1, ST_2, \ldots, ST_M$. It is not necessary that the number of experience provider and sponsor triggers be equal and these quantities are dynamic.

The Sponsor Selector controller 5705 dynamically maps 5706 the set of experience provider triggers to sponsor triggers. It is not necessary that each experience provider trigger be mapped to a sponsor trigger, and similarly it is not necessary that each sponsor trigger have an experience provider trigger mapped to it. For instance, in this example, both $ET_4$ and $ST_2$ are unmapped 5707. It is also possible for an experience provider trigger to map to several sponsor triggers 5708, which simply means that this experience can be triggered using more than one sponsor trigger. Finally, it is possible that a single experience provider trigger can map to sponsor triggers across multiple Sponsor Selectors.

Experience providers can even sell their triggers to multiple different sponsors, for instance, to the top three winning bidders. Finally, it is possible for more than one experience provider trigger to map to a single sponsor trigger 5709, which means that more than one experience will be triggered when the end-user interacts with this sponsor trigger. If these experience provider triggers come from distinct experience providers, then the end-user may need separate apps to interact with them all. Of course, it is also possible for one single experience provider trigger to be mapped to just one single sponsor trigger 5716.

The controller 5705 uses many different sources of information in order to create the Sponsor Selector's mapping. For instance, it can take into account black lists and white lists 5710 for end-users, experience providers, and sponsors. Similarly, it can use end-user profiles and usage history 5711, sponsor fallback lists 5712, schedules 5713, biddings history 5714, trigger link tables 5715, and any other salient signals to determine and if required, constantly re-determine the mapping. It is again worth re-emphasizing that this is merely one means of sponsor selection, and should not be interpreted as limiting since many other solutions are possible. For instance, sponsors can provide a budget and simply ask the system to bid accordingly in order to solve a business problem. In other words, rather than explicitly bidding on experience provider triggers, a sponsor can provide a budget and simply request traffic for its own triggers, and the system then uses all information available to it in order to algorithmically set its bidding in order to maximize that traffic. Similarly, sponsors can bid on groups of triggers rather than individually, or set certain targeting parameters and have the system find the right answer. Many such variations are possible.

Conversion & Redemption Measurement

It is easy to see how the Sponsorship Junction model provides valuable services for sponsors. In the baseball card example, fans are incentivized to visit The Burger Place in order to collect cards as part of the larger experience from Team 1. In driving foot traffic to The Burger Place, Team 1 is providing a valuable service which is completely measurable, and the sponsor will gladly pay for this foot traffic on a cost-per-trigger basis. However, from a sponsor's point of view, there are services even more valuable than driving foot traffic, and the most valuable of all is when a customer makes a purchase. If an experience provider is able to drive conversions rather than (or in addition to) foot traffic, then that is something for which the benefiting sponsor will pay handsomely.

There are many technical solutions to this problem in the context of the presently-described system. One such solution is to add a timer to the triggers used to drive foot traffic so that, for example, when a fan visits The Burger Place, rather than being given the promised trading card immediately, he/she must stand within a certain radius of the trigger for a certain amount of time, say 10 minutes. This will almost certainly increase the likelihood of conversion over an implementation without a timer, and is therefore more valuable, but this solution ultimately suffers from the problem that the exact number of conversions is not measurable within the system.

A far better solution is to measure conversions directly and only then fire the trigger which awards the relevant experience, and again there are many ways in which this can be done. It is important to note that a conversion is not necessarily limited to a financial transaction, and can include many other results which are valuable to different entities such as driving app installs, providing end-user information, consuming content such as watching a video, and so on, all of which are of course trigger-monitorable. In the most general case, a conversion can be entirely sponsor-defined.

One way to measure conversions is to integrate with the cash register using a technology such as NFC or capturing the credit card swipe. These actions can be used to identify the end-user either by credit card information or by a uniquely-identifying token shared via a signal from the phone to the cash register in the case of NFC or other proximity-based technologies. The Internet-connected cash register then sends an appropriate signal containing this uniquely-identifying to the overall system, which in our example mints the trading card for the relevant end-user associated with this token. A similar solution involves the credit card company on its back end identifying the end-user and sending the appropriate signal to the system, which then mints the card. In this case the end-user can be identified by a credit card number or other uniquely-identifying token which the credit card company and presently-described system have shared for the purposes of such identification. This method is not limited to credit card companies and can just as easily apply to payment providers such as Square which have a presence at the point-of-sale, or to stored-value payment providers such as Paypal or Google Wallet (formerly Google Checkout), and in all of these cases, end-user identification on the presently-described system is performed by sending a uniquely-identifying token as described from the payment provider. The device at the point-of-sale also need not belong to a payment provider, but instead can consist of a device coupled with the presently-described system such as an iPad running software which fires a trigger when an end-user interacts with it, for instance by bringing his/her device sufficiently close to it, in which case a proximity-sensing technology such as NFC or Bluetooth determines that the end-user has converted. In this case an identifying token is conveyed from the end-user's device to the iPad and which fires a trigger to the overall system to register the conversion.

Other methods are also possible, such as printing a custom one-time use trigger on the receipt. Unfortunately, these solutions also have their drawbacks, namely the time, expense, cost, and business complexities of cash register or credit card company integration.

The presently-described system can be used to implement a solution to this problem with neither of these drawbacks—namely, a solution that is able to measure conversions/redemptions exactly, and that does not require any cash register or payment provider integration, all just using the previously described trigger types. This can be achieved using one-time use triggers. Below we describe an implementation using visual or code word triggers as an example.

When a sponsor or anyone else who wishes to measure conversions using this system creates its triggers, instead of creating a proximity-based trigger or standard visual trigger containing an image, it creates digital or physical tokens employing a set of one-time use vision or code word triggers. One-time use vision triggers can be implemented using QR codes which are scanned using a digital camera. Each such vision trigger in the set is equal in that they all fire the same trigger, despite the fact that they are all different QR images encoding sufficiently long random strings of letters, so if a fan scans one member of the set, the resulting experience is the same as if they had scanned a different one. However, because they are all different, each time one is used, the system marks that code as used, and if another fan tries to scan that precise one, he/she will receive an error message to the effect that it has already been used. One-time use code word triggers are similar and simply skip the step of creating a visual QR encoding of the one-time code. In this case, the end-user simply types the code rather than scanning it visually. A sponsor then creates a sufficiently large number of these tokens having one-time use triggers and provides them to its cashiers. Whenever a customer makes a purchase satisfying the conditions of the experience, the cashier hands over one of these cheap and easily mass-produced tokens having a one-time use trigger. The end-user scans it, which triggers the linked experience. This token system can be used to give rewards proportional to the amount spent, so for instance, if a fan of Team 1 visits The Burger Place and spends $10, the cashier hands him/her a token with a one-time vision trigger that mints a "normal" card. If he/she spends $20, then he/she receives a token with a one-time vision trigger that mints a "good" (i.e. higher value) card. Finally, if he/she spends at least $30, then he/she receives a token with a one-time trigger minting an "excellent" (i.e., highest value) card. Of course, any one-time use trigger can be submitted to auction just like any other trigger.

If the sponsor starts to run out of these one-time use triggers, then it can simply visit the system's website and print more, so this method has the added benefit of being completely self-serviced, if desired. Note that one-time use visual or code word triggers are simply examples and should not be construed as limiting. All triggers types in the system are capable of employing digital or physical tokens employing one-time use instances of themselves that can be distributed either physically or digitally at the time of conversion, the trigger type and the mode of distribution depending on the nature of the conversion.

Trigger Streams

Another embodiment of a sub-component which can be integrated with the system in a manner similar to that of Sponsorship Junctions and the Loyalty Points Exchange is called "Trigger Streams", and as with all of these embodiments of sub-components can be viewed as an independent invention which can stand alone or be integrated into a similar system. That being said, Trigger Streams similarly add value, power, and functionality to the embodiment of the overall system, so we will describe them in this context. The purpose of Trigger Streams is to provide a means of broadcasting a stream of triggers as well as a means of subscribing to these streams and then reacting to them via receivers as per norm. In one sense, Trigger Streams are similar to a form of machine-readable Twitter, only instead of individuals broadcasting a stream of short, human-readable messages to which other people can subscribe, Trigger Streams allow any individual, entity, or piece of Internet-connected technology to broadcast a stream of machine-readable triggers to which other entities such as brands can subscribe, all using the present system.

Figure 44:
FIG. 44 illustrates one example of an end-user's experience of receiving an event from the system's Trigger Stream and includes a representation of a display presenting a mobile user interface for that purpose, in accordance with an embodiment of the present invention that may be implemented in the embodiment of FIG. 2 using a Trigger Stream system.

For instance, FIG. 44 illustrates one example of an end-user's experience of receiving an event from the system's Trigger Stream and includes a representation of a display presenting a mobile user interface for that purpose, in accordance with an embodiment of the present invention that may be implemented in the embodiment of FIG. 2 using a Trigger Stream system. In this example, a weather information service called the "Weather Hotline" has become a Trigger Stream provider with the present system. Whenever the weather changes anywhere, it broadcasts a trigger to that effect, along with geolocation data describing where that weather change happened. In this example, it has broadcast a trigger indicating that it has started to rain in the vicinity of San Jose, Calif. Meanwhile, a store called "XYZ" has used the embodiment of the present system to add functionality to its mobile app which can respond to weather change events. XYZ has used the present system to subscribe to the Weather Hotline's Trigger Stream, and to send discounts for umbrellas to its end-users if it starts to rain. One such end-user who has XYZ's app installed on his mobile phone 910 happens to be in San Jose, and the system therefore routs the rain announcement trigger to his app via a push notification. His phone buzzes 3831, letting him know that a new message has been received. XYZ's app received the notification, so he opens it, and sees a message 4400 jointly coming from the Weather Hotline as well as XYZ informing him that it is about to rain and that he has received a coupon for an umbrella which he can redeem at one of XYZ's nearby stores. He clicks on the related action button 4401 to accept the coupon.

Of course, this is a very specific example, and as such, it should not be interpreted as limiting, since the Trigger Stream producers, subscribers, and consumers can come from the nearly infinite list of sources that are compatible with the embodiment of the present system.

Figure 45:
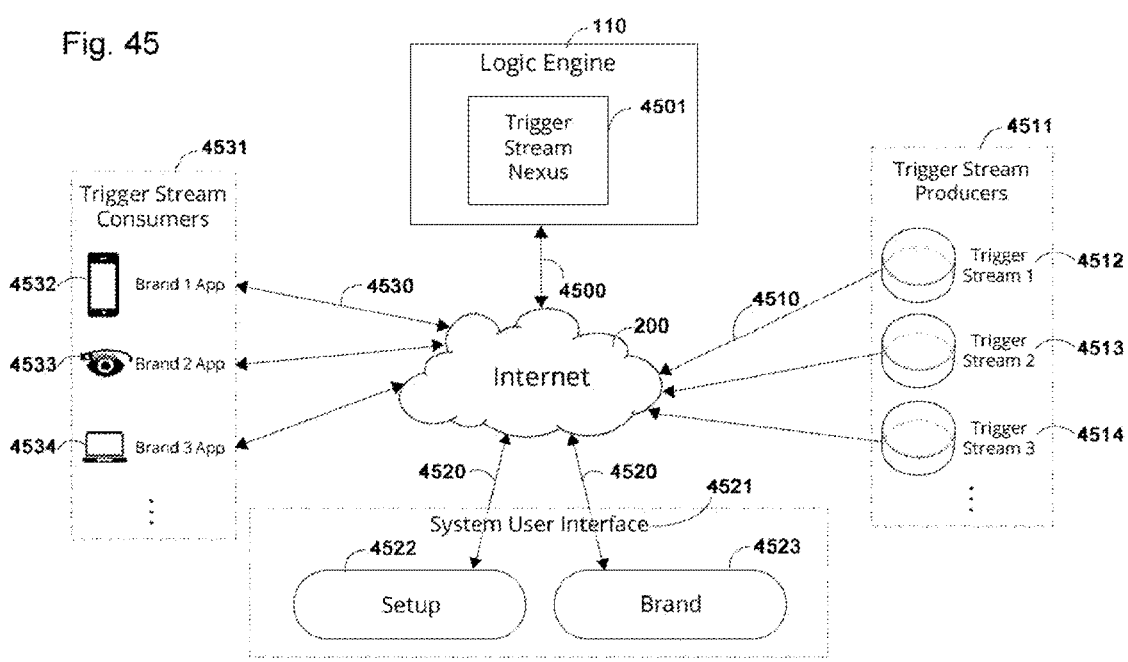
FIG. 45 is a block diagram illustrating how the Trigger Stream system is integrated into the overall architecture of the embodiment of FIG. 2, in accordance with an embodiment of the present invention.

FIG. 45 is a block diagram illustrating how the Trigger Stream system is integrated into the overall architecture of the embodiment of FIG. 2, in accordance with an embodiment of the present invention. The main component of the Trigger Stream system is the Trigger Stream Nexus 4501 which is located in the Logic Engine 110. A series of Trigger Stream producers 4511 are connected via communication channel 4510, the Internet 200, and communication channel 4500 to the Trigger Stream Nexus. These producers broadcast Trigger Streams 1, 2, 3, and so on (respectively 4512, 4513, 4514) along this communication channel using the system's API or simple HTTP POST messages to the Nexus, where they are processed and relayed via channel 4500, the Internet 200, and channel 4530 to Trigger Stream consumers such as, but not limited to mobile devices 4532, wearable computers 4533, laptops 4534, and so on which modify modules created using the present system that are represented on these devices. The Trigger Stream system has a user interface 4521 accessible through a web browser or standalone app which is connected to the Trigger Stream Nexus via communication channel 4500, the Internet 200, and channel 4520. Trigger Stream producers use interface 4522 to set up their streams within the system, whereas Trigger Stream subscribers use interface 4523 to choose which Trigger Streams to which they wish to subscribe. It is worth noting that there is nothing in the system barring a brand from subscribing to its own Trigger Stream, and a Trigger Stream producer and subscriber may in fact be the same entity. In addition, Trigger Stream subscribers use this interface to adjust further settings defining how triggers within the streams are filtered and routed to end-users, for instance, by matching the geolocation metadata in the triggers to the geolocations of the end-users. Another piece of functionality controlled by the user interface is pricing. Trigger Stream producers have the ability to charge subscribers for their subscription, and can also charge on the basis of triggers fired. Trigger Stream subscribers can also place bids on subscriptions or triggers and then wait to see if the producers accept their bids. One final piece of functionality provided by the user interfaces is a series of analytics screens which show both producers and subscribers charts, heat maps, graphs, and so on describing how their streams are performing and being used by end-users.

Figure 46:
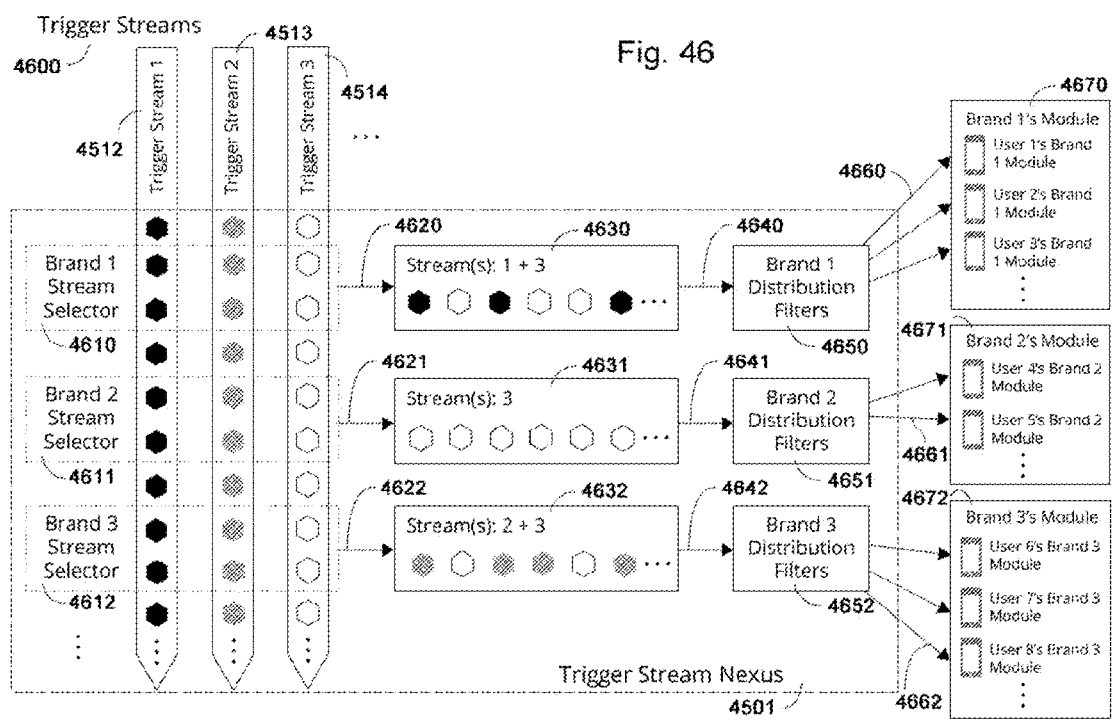
FIG. 46 is a block diagram showing the inner logical structure of the system's Trigger Stream Nexus.

FIG. 46 is a block diagram showing the inner logical structure of the system's Trigger Stream Nexus, which is the heart of the Trigger Stream system. This diagram depicts several Trigger Streams 4600 which originated from the Trigger Stream Producers 4511 in FIG. 45 as they enter the Trigger Stream Nexus 4501. Trigger Stream 1 is labeled 4512 and contains a stream of triggers which are depicted as black hexagons. Trigger Stream 2 is labeled 4513 and contains a stream of triggers which are depicted as grey hexagons. Similarly, Trigger Stream 3 is labeled 4514 and contains a stream of triggers shown as white hexagons. The Trigger Stream Nexus can handle an arbitrary number of Trigger Streams, but for illustrative purposes, three will suffice.

Inside the Trigger Stream Nexus, each brand (or other entity) has its own stream selector. In our example, Brand 1 has stream selector 4610, Brand 2 has stream selector 4611, and Brand 3 has stream selector 4612. This of course scales to any arbitrary number of brands or entities, but again for illustrative purposes, three will suffice. As previously described, each brand previously used the system's user interface 4523 in FIG. 45 to subscribe to one or more incoming Trigger Streams. In this example, Brand 1 has subscribed to streams 1 and 3, so its stream selector picks the triggers from streams 1 and 3 as they come into the system, and via 4620 copies them into a new stream 4630 which is a union of those two streams, with the black hexagonal triggers coming from stream 1, and the white hexagonal triggers coming from stream 3 in the order that they were received by Brand 1's stream selector. Similarly, Brand 2 is only subscribed to Trigger Stream 3, so its stream selector 4611 only picks out the white hexagonal triggers from stream 3 via 4621 to create the new stream 4631. Finally, Brand 3 is subscribed to streams 2 and 3, so its stream selector picks out and copies the grey hexagonal triggers from stream 2 and the white hexagonal triggers from stream 3, merging them via 4622 into stream 4632.

Each of these streams is then sent to the brand distribution filters, whose job it is to select which triggers should be sent to which end-users' modules. The reason for this is that it would be inefficient for the system to simply send every trigger to every module, even after we have culled the total population of triggers to only the brands' subscribed streams. In our example, Brand 1's unified stream 4630 is sent via 4640 to its distribution filters 4650, which sorts the triggers according to their data and metadata and then relays the filtered triggers via 4660 to Brand 1's modules 4670 which have receivers for those triggers, but only if the individual end-users meet all of the filter criteria. For instance, in our example from FIG. 44, the Weather Hotline sent out a stream of weather triggers, and store XYZ subscribed to this stream. This stream of triggers is therefore relevant to anyone who has the XYZ app installed. However, the weather triggers are dependent on geolocation, and if XYZ is a national brand, then the weather in, say, New York might be very different than in San Jose. XYZ's distribution filter is therefore responsible for not only sending weather change triggers to anyone who has a relevant module, but it must also filter for geolocation so that it doesn't send weather triggers from the New York area to end-users in San Jose, or vice versa. This additional filtering isn't done based only on geolocation, but can be performed based on any metadata associated with the trigger. For instance, Major League Baseball may broadcast a Trigger Stream for every time a player hits a home run in one of its games, but different teams might have their own fan apps, so although all of these fan apps might subscribe to this Trigger Stream, only a small subset of them (namely the ones associated with their own team) might be relevant to their own apps. So for example, the Distribution Filter for team X may filter out home run triggers from team Y so as not to waste the bandwidth of team X's end-users.

The Trigger Streams for Brands 2 and 3 are processed in a manner similar to that of Brand 1. In the case of Brand 2, stream 4631 is sent via 4641 to Brand 2's distribution filters 4651, which filter and distribute those triggers via 4661 to Brand 2's end-users' modules 4671. Similarly, in the case of Brand 3, stream 4632 is sent via 4642 to Brand 3's distribution filters 4652, which filter and distribute those triggers via 4662 to Brand 3's end-users' modules 4672. Of course, the distribution filters are not strictly necessary for the system to function, so they can be omitted, but they do make it more efficient, so it is probably worth including them.

The triggers which make it through the filtering process arrive at the relevant modules and are processed just as any triggers would by the system's Module Processor 3340 within its Logic Engine 110, as previously described in FIGS. 33-36.

In the example above of a baseball team providing an Action Jackson card to a user when the user visits Burger Place, the baseball team can be viewed as "owning" the audience member/user as a customer, and Burger Place can be viewed as "owning" the trigger by which the user's physical presence at Burger Place is confirmed. Burger Place is willing to pay for access to the team's audience members/users and therefore Burger Place uses the sponsorship junction to bid for such access and also to establish the proper linkages between its trigger and the team's promotion. In this context, Burger Place can be viewed as being both the creator of the trigger and also the consumer of the same trigger for use by Burger Place as a sponsor. When a customer of the baseball team enters the Burger Place, the Burger Place trigger is fired, and the resulting trigger message allows the customer to be rewarded with the Action Jackson card. Burger Place is a consumer of the trigger, because Burger Place is using the trigger for its own benefit as a sponsor, specifically in this example to drive baseball team's customers to Burger Place. This is the normal situation described above.

However, the creator and consumer of a trigger need not be the same entity. If creation and consumption of a trigger are separated, the sponsorship junction must be able to handle this separation. In general, a company cannot become a consumer of a trigger unless the trigger already exists. In the case of the Burger Place, the trigger will not exist until it has been created by the Burger Place. The Burger Place is unlikely to create a trigger unless it intends to be a consumer of its trigger as a sponsor. On the other hand, once the Burger Place creates and consumes its trigger, it can also make the trigger available for use by others. Additionally, other types of triggers, such as weather triggers (see paragraph 261), can be generated in advance without any immediately associated sponsor to consume the trigger. (It could be argued, however, that these other types of triggers are not really different in operation from the baseball team's Action Jackson digital card campaign triggers, because in each case the experience provider had to create the environment and its trigger before it could be consumed by a sponsor.)

Because creation and consumption of a trigger does not have to be performed by the same entity, then in order to handle this circumstance, the sponsorship junction design is not a simple 2-row matrix, with sponsors on one side and experience providers on the other side, as in the case of FIG. 53 described above. In the 2-row matrix of FIG. 53, there can be any number of junctions between any given sponsor and any give experience provider. In the situation of an expanded sponsorship junction, however, each entity (which we will call a "dual purpose" entity) that creates a trigger and that does not merely consume the trigger, is in effect both a sponsor on the sponsor side of the matrix and an experience provider on the other side of the matrix. Among other things, this configuration allows the dual purpose entity to offer its triggers to other sponsors even though the dual purpose entity is also a consumer of its own triggers. Thus, an entity can be both a sponsor in one context and an experience provider in another context with regard to the same trigger.

For example, with reference again to the example of the baseball team and Burger Place, Burger Place wants access to the baseball team's audience members/users and therefore is willing to pay on a per-trigger basis for the baseball team to drive the team's audience members/users to Burger Place. However, Burger Place is also an experience provider making its triggers available to other sponsors. For example, a particular sponsor (such as a candy store next to Burger Place) might want access to anyone who visits Burger Place in order to provide incentives for Burger Place patrons to visit the candy store (or, alternatively, Burger Place might want to provide a reward to its customers that includes driving customers to the candy store). Thus, the candy store may bid for access to Burger Place's triggers, some of which may be driven by the baseball team's Action Jackson card promotion. Thus, there can be a "multiplier" effect, where the Burger Place pays for access to the baseball team's audience members/users in order to increase foot traffic to Burger Place (and in so doing creates triggers to reward those users who go to Burger Place) and also is paid by the candy store for access to those same triggers. In this example, Burger Place has increased the value of its triggers by using the sponsorship junction to incentivize the same users to patronize the candy store and to obtain revenue offsetting its own sponsorship payments to the baseball team. Because the users have this additional incentive, the Burger Place may also increase the amount of foot traffic to its location.

Figure 58:
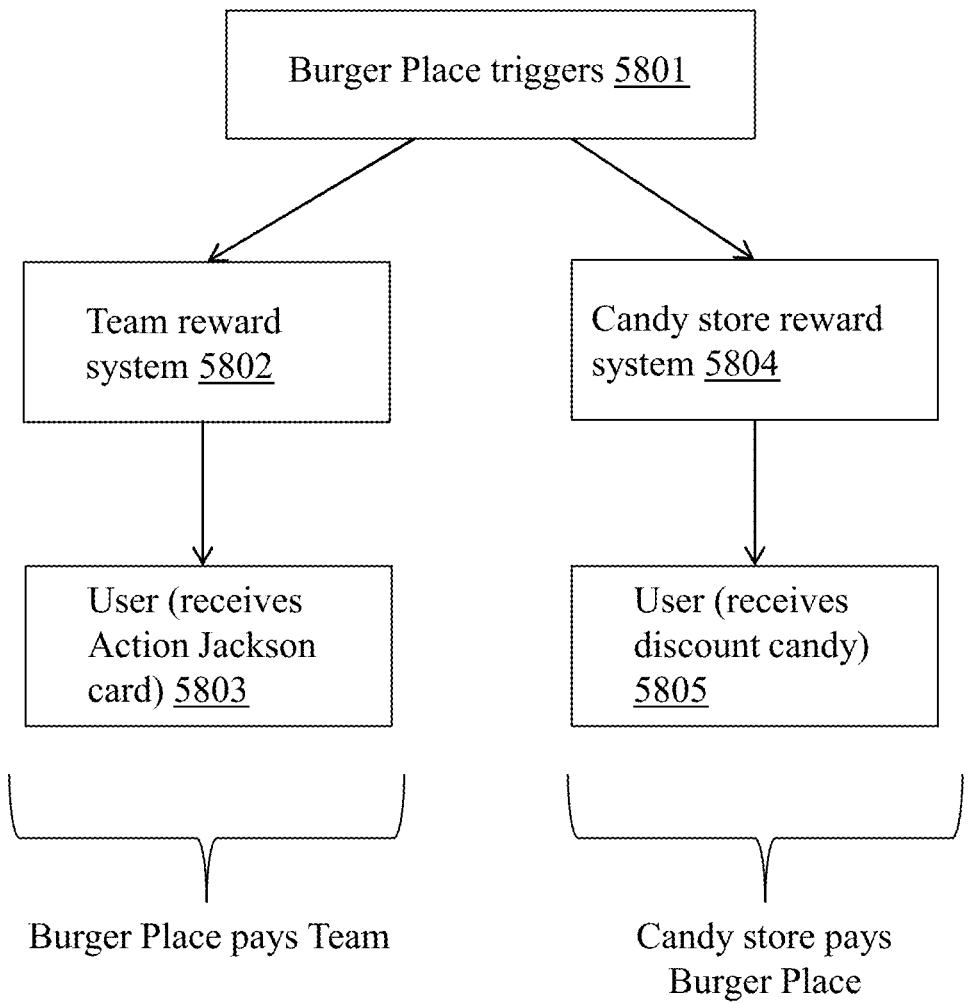
FIG. 58 is a block diagram demonstrating the flow of triggers according to a multiplier effect using a single Sponsor Selector, in accordance with one exemplary embodiment.

FIG. 58 is a block diagram demonstrating the flow of triggers according to a multiplier effect with a dual purpose entity as described in the previous paragraphs, in accordance with one exemplary embodiment, which is part of an expanded system along the lines of the matrix of FIG. 53. Using the above example of the baseball team, Burger Place, and candy store, assuming that bids from the Burger Place and from the candy store have been successful in an auction (in a manner discussed generally above in connection with FIG. 54), then the trigger stream 5801 from user visits to the Burger Place is forwarded for use by the baseball team 5802 in fulfilling the Action Jackson card promotion, so that the user 5803 is transmitted the digital Action Jackson card. The Burger Place triggers are also used by the Burger Place itself in providing the candy store benefit, so that when a user visits the candy store 5804 and makes a discounted purchase using this benefit, the user 5805 has the discounted candy, and the candy store sends its corresponding trigger back to the Burger Place, to account for the purchase, The Burger Place triggers 5801 can be operative not only for any user who has received and acted on the Action Jackson card promotion but also for any other user whom the Burger Place may have targeted with the candy store promotion who has acted on the candy store promotion. In each case the trigger gates the corresponding reward.

Figure 59:
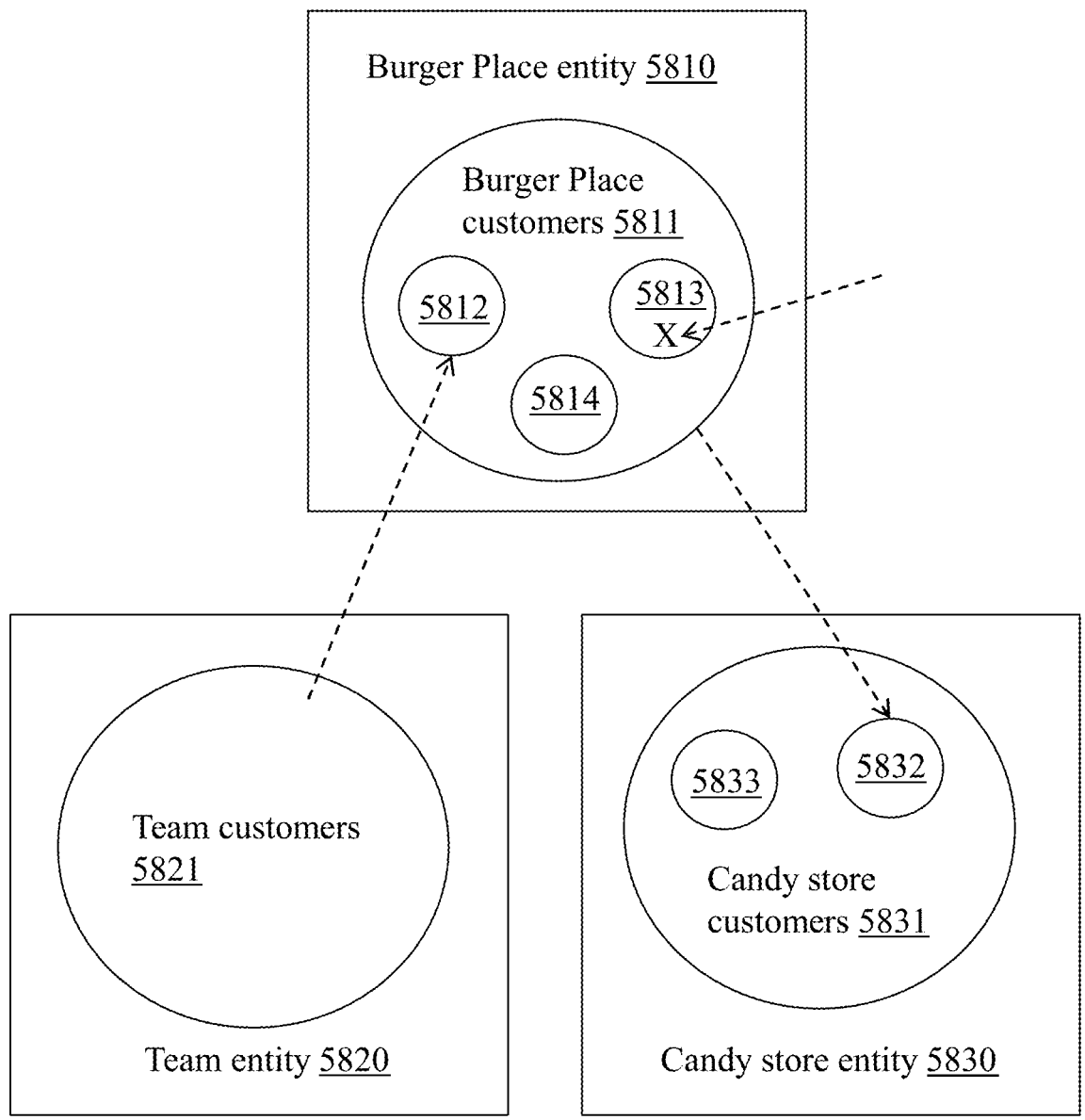
FIG. 59 is a block diagram showing set-based representations of the multiplier effect, in accordance with one exemplary embodiment.

FIG. 59 is a block diagram showing set-based representations of operation of the dual purpose entity in use of triggers to achieve the multiplier effect, in accordance with one exemplary embodiment. Again, using the above example of the baseball team, Burger Place, and candy store, a set of the baseball team's members/users 5821 is incentivized to go to Burger Place 5810 as part of the Action Jackson promotion. The baseball team's members/users from the set 5821 who actually visit Burger Place 5810 in a manner responsive to the incentive are a subset of the set of visitors 5811 to Burger Place (and the team is notified of such visitors via trigger messages), where the set of visitors 5811 to Burger Place also may include typical walk-in patrons 5814 and possibly also visitors driven from other promotions (represented by the subset X 5813). Some or all of Burger Place's users from the set of visitors 5811 can become part of the candy store promotion such that, when any of such Burger Place's users visit the candy store, the Burger Place is notified of such visitors via trigger messages. Thus, the baseball team's Action Jackson card promotion can increase the number of visitors to Burger Place, which in turn can increase the number of Burger Place users who are offered the candy store promotion. Similarly, Burger Place's members/users from the set 5811 who actually visit the candy store can become a subset of the set of visitors 5831 to the candy store, which may include additional visitors (represented by the subset 5833).

In this paradigm, triggers may be made available to entities for use as experience provider triggers and/or sponsor triggers as a particular context might warrant. Generally speaking, the sponsorship value of a particular relationship will depend on who owns or controls the audience members/users and who owns or controls the relevant triggers, and this principle can govern the allocation of payments made for sponsorship achieved through the sponsorship junctions. Generally speaking, money or other benefits will flow from a sponsor to the experience provider, although more complex arrangements can be created between entities, where one entity might be the experience provider for certain triggers while being a sponsor for other triggers.

The system described above in fact can be generalized. As we have shown, creating and consuming a trigger do not have to be accomplished by the same entity, such as the Burger Place. Accordingly, a sponsor can decide to provide a reward to the audience members of any entity that offers a set of triggers of any kind, and the sponsorship junction can be employed as the mechanism by which the sponsor is matched with the audience provider. In one variation, it is the sponsor making bids for a specific audience provider and an auction determines the winner of the bidding. Alternatively, the sponsor, such as the Burger Place, might have a standing offer (e.g., $0.50) for any user who is sensed as present at the Burger Place as a result of a program of any audience provider, and in that fashion, any number of audience providers can be linked to the Burger Place through a sponsorship junction, by accepting the standing offer, and can receive payment for any of the audience provider's users who visit the Burger Place. For example, as a counterpoint to the baseball team example above, rather than the Burger Place's winning a bid for access to the baseball team's users, here the Burger Place can create a standing offer through the sponsorship junction, and the baseball team can incentivize its users to interact with the Burger Place's trigger and thereby can receive compensation from the Burger Place as sponsor, through the sponsorship junction, based on the standing offer. Similarly, other audience providers in addition to the baseball team can take advantage of the same standing offer. Thus, in this example, another audience provider may be involved, such as Pokemon Go, to incentivize its game-playing users to patronize the Burger Place in its own promotion. For example, every time the company offering Pokemon Go gets a user to interact with the Burger Place's trigger, the Burger Place as sponsor pays $0.50, and the revenue from these payments can be shared between the platform provider and the Pokemon Go company. (Additionally, in this example, as discussed previously in the context of the Candy Store, the Burger Place has both created and consumed a first trigger associated with presence of a user on the premises of the Burger Place.)

In this generalized configuration, the sponsorship junction can turn a whole city (and, for that matter, a whole country) into a physical trigger ecosystem, where every sponsor has triggers that can be made available to a wide range of potential audience providers. The sponsors thus can put in bids, for example, saying essentially, "Anyone who can get a user to interact with my trigger will be paid $0.50." Then the platform provides a vast trigger network and auction mechanism to any audience provider that wants to use it.

Although the generalized configuration described above involves an offer generated by the sponsoring brand, providing to the audience providers the possibility of accepting the offer, the system can be run in a different manner—namely one wherein the brand receives offers from the audience providers, and the brand decides which offers to accept from the audience providers.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A non-transitory computer-readable medium that, when executed on a server, establishes processes for providing a brand sponsorship environment, the processes comprising:
   a. providing a computer-implemented platform establishing a sponsorship junction involving a first set of trigger-monitorable activities defined by a set of sponsoring brands, the platform implementing processes including:
      for each sponsoring brand of the set of sponsoring brands, serving over a network, by the server, the server coupled to a storage system and coupled to the network, data defining a screen on a client computer of such sponsoring brand representative by which the sponsoring brand representative can specify at least a specified subset of the first set of trigger-monitorable activities and a corresponding offer, the specified subset being monitored by corresponding triggers; and
      receiving over the network and storing by the server data, from the client computer of such sponsoring brand representative, defining the specified subset of trigger-monitorable activities and the corresponding offer;
      wherein at least one of all of the trigger-monitorable activities in the specified subset utilizes a Physical Trigger;
      causing display, by the server, over the network, of data characterizing the offer for the trigger-monitorable activity, on client computers of a set of audience provider representatives;
   b. storing, by the server, for each audience provider representative accepting the offer of a given sponsoring brand, an audience provider selection that establishes a set of linkages, each linkage defining a correspondence between at least one member of the specified subset of trigger-monitorable activities and such audience provider, so as to define sponsorship by the given sponsoring brand of such audience provider in the set of audience providers; and
   c. for each audience provider representative accepting the offer of the given sponsoring brand, receiving, by the server, over a period of time, a set of triggers, each trigger applicable to a participating end-user associated with such audience provider, and, responsive to the stored selection by such audience provider, associating, by the server, the set of triggers with the account of the given sponsoring brand and relaying the set of triggers according to instructions provided on behalf of such audience provider.

2. A non-transitory computer-readable medium according to claim 1, wherein, (i) for each audience provider, the reward that can be offered to the participating end user is participation in a specified subset of trigger-monitorable activities defined by such sponsoring brand, and (ii) each linkage defines a correspondence between at least one trigger monitorable activity attributable to a member of the set of audience providers and at least one trigger, attributable to such sponsoring brand, that is a conversion trigger that is fired when the participating end-user performs an action targeted by the sponsorship, the processes further comprising:
   providing to the participating end-user, when and only when the participating end-user shall have performed the targeted action, a token coded uniquely for a one-time use, wherein a reward for the targeted action is conditioned on interaction of the participating end-user's computing device with the token so as to cause sending a conversion trigger message to the server, so that the conversion trigger message is produced only once and only after the targeted action has been performed by the participating end-user.

3. A non-transitory computer-readable medium according to claim 2, wherein the targeted action is visiting by the participating end user of an identified physical location.

4. A non-transitory computer-readable medium according to claim 2, wherein the targeted action is purchasing by the participating end user of an item.

5. A non-transitory computer-readable medium according to claim 3, wherein the token is implemented in a receipt given to the end user for making a purchase.

6. A non-transitory computer-readable medium according to claim 2, wherein the targeted action is visiting by the participating end user to an identified digital location.

7. A non-transitory computer-readable medium according to claim 6, wherein the digital location is identified by a URL.

8. A non-transitory computer-readable medium that, when executed on a server, establishes processes for providing a brand sponsorship environment, the processes comprising:
   a. providing a computer-implemented platform establishing a sponsorship junction involving a trigger-monitorable activity defined by a given sponsoring brand, the platform implementing processes including:

serving over a network, by the server coupled to both a storage system and the network, data defining a screen on a client computer of a sponsoring brand representative by which the sponsoring brand representative can specify the trigger-monitorable activity and a corresponding offer, the specified trigger-monitorable activity being monitored by corresponding triggers; and receiving over the network and storing by the server, data, from the client computer of such sponsoring brand representative, defining the trigger-monitorable activity and the corresponding offer;

wherein the trigger-monitorable activity utilizes a Physical Trigger;

b. causing display, by the server, over the network, of data characterizing the offer for the trigger-monitorable activity, to client computers of a set of audience providers;

c. storing, by the server, for any audience provider accepting the offer, an audience provider selection that establishes a linkage defining a correspondence between the trigger-monitorable activity and such audience provider, so as to define sponsorship by the given sponsoring brand of such audience provider; and d. receiving, by the server, over a period of time, a set of triggers, each trigger applicable to a participating end-user associated with such audience provider, and, responsive to the stored selection by such audience provider subsets of trigger-monitorable activities, associating, by the server, each trigger with the account of the given sponsoring brand and relaying the trigger according to instructions provided on behalf of such audience provider.

9. A non-transitory computer-readable medium according to claim 8, wherein (i) for each audience provider, the reward that can be offered to the participating end user is participation in a specified set of trigger-monitorable activities defined by such sponsoring brand, and (ii) each linkage defines a correspondence between at least one trigger monitorable activity attributable to a member of the set of sponsoring brands and at least one trigger, attributable to a such audience provider, that is a conversion trigger that is fired when the participating end-user performs an action targeted by the sponsorship, the method further comprising:

providing to the participating end-user, when and only when the participating end-user shall have performed the targeted action, a token coded uniquely for a one-time use, wherein a reward for the targeted action is conditioned on interaction of the participating end-user's computing device with the token so as to cause sending a conversion trigger message to the server, so that the conversion trigger message is produced only once and only after the targeted action has been performed by the participating end-user.

10. A non-transitory computer-readable medium according to claim 9, wherein the targeted action is visiting by the participating end user of an identified physical location.

11. A non-transitory computer-readable medium according to claim 9, wherein the targeted action is purchasing by the participating end user of an item.

12. A non-transitory computer-readable medium according to claim 11, wherein the token is implemented in a receipt given to the end user for making a purchase.

13. A non-transitory computer-readable medium according to claim 9, wherein the targeted action is visiting by the participating end user to an identified digital location.

14. A non-transitory computer-readable medium according to claim 13, wherein the digital location is identified by a URL.

* * * * *